(12) United States Patent
Andreev et al.

(10) Patent No.: US 7,062,508 B2
(45) Date of Patent: Jun. 13, 2006

(54) METHOD AND COMPUTER-BASED SYSTEM FOR NON-PROBABILISTIC HYPOTHESIS GENERATION AND VERIFICATION

(76) Inventors: Leonid Andreev, 24217 N. 87th St., Scottsdale, AZ (US) 85255; Michael Andreev, 24217 N. 87th St., Scottsdale, AZ (US) 85255

( * ) Notice: Subject to any disclaimer, the term of this patent is extended or adjusted under 35 U.S.C. 154(b) by 177 days.

(21) Appl. No.: 10/716,325

(22) Filed: Nov. 17, 2003

(65) Prior Publication Data
US 2004/0103108 A1    May 27, 2004

Related U.S. Application Data

(63) Continuation of application No. 10/622,542, filed on Jul. 21, 2003, and a continuation of application No. 09/655,519, filed on Sep. 5, 2000, now Pat. No. 6,640,227.

(51) Int. Cl.
G06F 17/30 (2006.01)

(52) U.S. Cl. .................................................. 707/102

(58) Field of Classification Search ............. 707/1–10, 707/100–104.1, 200–205; 716/1, 18; 715/721; 706/20
See application file for complete search history.

(56) References Cited

U.S. PATENT DOCUMENTS

| | | | |
|---|---|---|---|
| 5,519,608 A | | 5/1996 | Kupiec |
| 5,765,166 A | | 6/1998 | Gotfried et al. |
| 5,870,308 A | * | 2/1999 | Dangelo et al. ............... 716/18 |
| 6,020,883 A | * | 2/2000 | Herz et al. ................... 715/721 |
| 6,216,252 B1 | * | 4/2001 | Dangelo et al. ................ 716/1 |
| 6,304,833 B1 | | 10/2001 | Ferkinhoff et al. |
| 6,314,204 B1 | | 11/2001 | Cham et al. |
| 6,581,048 B1 | | 6/2003 | Werbos |
| 6,640,227 B1 | | 10/2003 | Andreev |
| 2002/0038294 A1 | * | 3/2002 | Matsugu ....................... 706/20 |
| 2004/0205066 A1 | * | 10/2004 | Bhattacharjee et al. ........ 707/8 |

OTHER PUBLICATIONS

Nicholas J. Higham, Algorithm 694: a collection of text matrices in MATLAB, (Sep. 1991), ACM Press, NY, NY, vol. 17, Issue 3, pp. 289-305.*

Fazli Can et al., Concepts and effectiveness of the cover-coefficient-based clustering methodology for text databases, (Dec. 1990), ACM Press, NY, NY, vol. 14, Issue 4, pp. 483-517.*

(Continued)

Primary Examiner—Diane D. Mizrahi

(57) ABSTRACT

The invention provides a method, apparatus and algorithm for data processing that allows for hypothesis generation and the quantitative evaluation of its validity. The core procedure of the method is the construction of a hypothesis-parameter, acting as an "ego" of the non-biological reasoning system. A hypothesis-parameter may be generated either based on totality of general knowledge facts as a global description of data, or by a specially designed "encapsulation" technique providing for generation of hypothesis-parameters in unsupervised automated mode, after which a hypothesis-parameter is examined for concordance with a totality of parameters describing objects under analysis. The hypothesis examination (verification) is done by establishing a number of copies of a hypothesis-parameter that may adequately compensate for the rest of existing parameters so that the clustering could rely on a suggested hypothesis-parameter. The method of this invention is based on the principle of the information thyristor and represents its practical implementation.

14 Claims, 52 Drawing Sheets

A flow diagram of the method of this invention

OTHER PUBLICATIONS

Istvan Jonyer et al., Graph-based hierarchical conceptual clustering, (Mar. 2002), MIT Press, Cambridge, MA, vol. 2, pp. 19-43.*

D. H. Johnson. Hypothesis testing: statistics as pseudoscience. Fifth Annual Conference of the Wildlife Society, Buffalo, New York, Sep. 26, 1998.

D. R. Anderson, K. P. Burnham, W. L. Thompson. Null hypothesis testing: problems, prevalence, and an alternative. Journal of Wildlife Management 64(4):912-923.

W. J. McGuire. Creative hypothesis generating in psychology: some useful heuristics. Annu. Rev. Psychol. 1997. 48:1-30.

S. Russel. Rationality and Intelligence. Artificial Intelligence Journal, 1997, 94 (1-2), pp. 55-57.

A. Gammermam and V. Vovk. Kolmogorov complexity: sources, theory and application. The Computer Journal, 1999, vol. 42, No. 4, pp. 252-255.

S. Nanavati, M. Thieme, R. Nanavati. Biometrics. Identity Verification in a Networked World. John Wiley & Sons, Inc., New York, 2002, pp. 1-7.

M. S. Nixon, J. N. Carter, M. G. Grant, L. Gordon, J. B. Hayfron-Acquah. Automatic recognition by gait: progress and prospects. Sensor Review, 2003, v. 23, No. 4, pp. 323-331.

M. Hallahan. The hazards of mechanical hypothesis testing. Psycoloquy: 1999, 10, #1 Social Bias (13).

R. S. Michalski. Inferential theory of learning and inductive databases. The UQAM Summer Institute in Cognitive Sciences, Montreal, 2003. http://www.mli.gmu.edu/pubs.html.

R. Landauer. Irreversibility and heat generation in the computing process. IBM Journal, Jul. 1961, pp. 183-191.

M. B. Plenio, And V. Vitelli. The physics of forgetting: Landauer's erasure principle and information theory. E-Print, arXiv:quant-ph/0103108 v 1 Mar. 19, 2001.

* cited by examiner

A flow diagram of MeaningFinder™ algorithmic architecture

A flow diagram of the method of this invention

A plot showing changes in plausibility number $-\ln M$

Relationship between $ln\ M_{ab}$ values for 245 cities of 50 states of the U.S.A. (reference object San Diego, CA)

Relationship between $ln\,M_{ab}$ values for 245 cities of 50 states of the U.S.A. (reference objects San Diego, CA, and Charleston, SC)

3D-diagram of grouping of 80 countries (51 demographic parameters) based on implausibility numbers ($ln\ M$)

3D-diagram of grouping of 80 countries, using 51 demographic parameters and based on implausibility numbers ($ln M$).

3D-diagram of grouping of 74 countries, using 51 demographic parameters and based on implausibility numbers ($\ln M$).

Clustering by evolutionary transformation of a similarity matrix based on 4 different multiplication number values

| 1.1.1.<br>Hong Kong<br><br>1.1.2.<br>China<br>Macau S.A.R.<br>Singapore<br>Taiwan. | 1.2.1.<br>Austria<br>Belgium<br>Denmark<br>Germany<br>Greece<br>Norway<br>Sweden<br>Switzerland<br>UK.<br><br>1.2.2.<br>Finland<br>France<br>Italy<br>Luxembourg<br>Netherlands<br>Portugal<br>Spain. | 2.1.<br>India | 2.2.1.<br>Algeria<br>Bahrain<br>Egypt<br>Libya<br>Morocco<br><br>2.2.2.<br>Djibouti<br>Iraq<br>Jordan<br>Kuwait<br>Oman<br>Qatar<br>Saudi Arabia<br>Syria<br>United Arab Emir.<br>West Bank<br>Yemen |
|---|---|---|---|

FIG. 13

A plot showing the relationship between multiplication numbers M(2) and M(3) computed for 17 countries described by 34 parameters based on population pyramids.

A plot-map of 220 countries, based on 34 parameters of population pyramids, using Russia and Saudi Arabia as reference objects Schematic image of a human body referred to in the example on HyGV application in image and gait recognition 42 out of 75 artificially generated images of human body poses used in the example of HyGV application in image recognition The result of search (among 75 images) for closest analogs of a human body lying on the stomach Relationship between similarity coefficients $S_a$ and $S_{ab}$ computed by equation 6 for a human body pose shown in FIG. 24

Demonstration of additivity of multiplication number values

| Pose number in FIG. 17 | Number of multiplications (capsule of clones for a query illustrated in FIG. 18-23) | | | | | | | |
|---|---|---|---|---|---|---|---|---|
| | Whole figure[1,2] | Left side[3] | Right side[4] | Torso center[5] | Left calf | Right calf | Left fingers, forearm and hand | Right fingers, forearm and hand |
| 1 | 121/121 | 50 | 47 | 24 | 14 | 13 | 5 | 4 |
| 2 | 139/139 | 59 | 56 | 24 | 14 | 13 | 14 | 13 |
| 3 | 133/133 | 59 | 49 | 25 | 14 | 13 | 6 | 16 |
| 4 | 139/139 | 64 | 51 | 24 | 14 | 13 | 20 | 7 |
| 5 | 141/141 | 63 | 54 | 24 | 14 | 13 | 19 | 10 |
| 6 | 139/139 | 55 | 59 | 25 | 14 | 13 | 12 | 16 |
| 7 | 117/116 | 47 | 45 | 24 | 14 | 13 | 3 | 3 |
| 8 | 122/121 | 48 | 49 | 24 | 14 | 8 | 6 | 16 |
| 9 | 130/131 | 64 | 43 | 24 | 14 | 8 | 19 | 10 |
| 10 | 141/141 | 60 | 57 | 24 | 14 | 13 | 17 | 14 |
| 11 | 145/145 | 68 | 53 | 24 | 14 | 13 | 26 | 9 |
| 12 | 130/130 | 60 | 49 | 21 | 13 | 12 | 20 | 8 |
| 13 | 99/99 | 25 | 41 | 33 | 9 | 13 | 3 | 3 |
| 14 | 99/99 | 34 | 41 | 24 | 9 | 13 | 3 | 3 |

[1] described by 18 parameters.
[2] first number in each pair indicates an experimentally established number of multiplications, second number is a total of multiplications for "left half", "right half" and "torso center".
[3] described by 7 parameters
[4] described by 7 parameters
[5] described by 4 parameters

*FIG. 26*

45 artificially generated schematic images ("frames") of a human figure in the process of walking, referred to in the example of HyGV application in gait recognition A plot showing the multiplication number (M) changes in accordance with the walking motion frames shown in FIG. 27

A plot showing the multiplication number (M) changes in accordance with the walking motion frames shown in FIG. 27

A table for computation of a hybrid similarity matrix and identification of a target string in a sequence of $n$-elements

| | | Parameters | | | | |
|---|---|---|---|---|---|---|
| | | 1 | 2 | 3 | ... | f |
| Objects | 1 | $e_1$ | $e_2$ | $e_3$ | ... | $e_f$ |
| | 2 | $e_2$ | $e_3$ | $e_4$ | ... | $e_{f+1}$ |
| | 3 | $e_3$ | $e_4$ | $e_5$ | ... | $e_{f+2}$ |
| | . | . | . | . | .... | . |
| | . | . | . | . | .... | . |
| | k | $e_k$ | $e_{k+1}$ | $e_{k+2}$ | ... | $e_{k+f-1}$ |
| | CC(k) | $CC_k$ | $CC_{k+1}$ | $CC_{k+2}$ | ... | $CC_{k+f-1}$ |
| | . | . | . | . | .... | . |
| | . | . | . | . | .... | . |
| | k+f-1 | $e_{k+f-1}$ | $e_{k+f}$ | $e_{k+f+1}$ | ... | $e_{k+2f-2}$ |
| | . | . | . | . | .... | . |
| | . | . | . | . | .... | . |
| | n-f+1 | $e_{n-f+1}$ | $e_{n-f+2}$ | $e_{n-f+3}$ | ... | $e_n$ |

*FIG. 30*

Result of sequence A (FIG. 31) recognition by method of this invention

Result of sequence B (FIG. 31) recognition by method of this invention

Relationship between the identification uncertainty computed for sequence B and the deviation from the value of the signal at time-point 83

Artificially generated binary sequence. The section in bold is a reference string

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20 | 1 | 0 | 0 | 1 | 1 | 0 | 0 | 0 | 1 | 0 | 1 | 0 | 0 | 0 | 1 | 0 | 1 | 1 | 1 | 1 |
| 40 | 1 | 0 | 0 | 0 | 1 | 1 | 0 | 1 | 1 | 0 | 1 | 1 | 0 | 0 | 1 | 1 | 1 | 1 | 1 | 1 |
| 60 | 0 | 0 | 1 | 0 | 0 | 0 | 1 | 0 | 1 | 1 | 0 | 1 | 0 | 1 | 0 | 0 | 1 | 0 | 1 | 0 |
| 80 | 1 | 0 | 0 | 1 | 1 | 1 | 1 | 1 | 1 | 0 | 1 | 0 | 0 | 0 | 0 | 1 | 0 | 1 | 0 | 1 |
| 100 | 0 | 0 | 1 | 0 | 1 | 1 | 0 | 1 | 0 | 0 | 0 | 0 | 0 | 1 | 0 | 1 | 0 | 0 | 1 | 0 |
| 120 | 0 | 1 | 0 | 1 | 0 | 0 | 0 | 0 | 1 | 0 | 1 | 0 | 1 | 0 | 0 | 1 | 1 | 0 | 0 | 1 |
| 140 | 0 | 0 | 1 | 0 | 0 | 1 | 0 | 0 | 0 | 1 | 1 | 1 | 1 | 0 | 1 | 0 | 0 | 0 | 0 | 0 |
| 160 | 1 | 0 | 1 | 1 | 1 | 1 | 0 | 0 | 1 | 1 | 1 | 0 | 0 | 1 | 1 | 1 | 1 | 0 | 0 | 0 |
| 180 | 0 | 0 | 0 | 0 | 1 | 0 | 0 | 0 | 0 | 0 | 0 | 0 | 0 | 0 | 1 | 1 | 1 | 1 | 0 | 0 |

FIG. 35

A table for computation of a similarity matrix used in binary sequence recognition

| Object name | Value in HyPa | M* | Parameters | | | | | | | | | |
|---|---|---|---|---|---|---|---|---|---|---|---|---|
| | | | 31 | 32 | 33 | 34 | 35 | 36 | 37 | 38 | 39 | 40 |
| Element 30 | 0.0 | 293 | 0.000 | 1.000 | 1.000 | 0.000 | 0.000 | 1.000 | 1.000 | 1.000 | 1.000 | 1.000 |
| Element 31 | 0.0 | 243 | 1.000 | 1.000 | 0.000 | 0.000 | 1.000 | 1.000 | 1.000 | 1.000 | 1.000 | 1.000 |
| Element 32 | 0.0 | 194 | 1.000 | 0.000 | 0.000 | 1.000 | 1.000 | 1.000 | 1.000 | 1.000 | 1.000 | 0.000 |
| Element 33 | 0.0 | 244 | 0.000 | 0.000 | 1.000 | 1.000 | 1.000 | 1.000 | 1.000 | 1.000 | 0.000 | 0.000 |
| Element 34 | 0.0 | 194 | 0.000 | 1.000 | 1.000 | 1.000 | 1.000 | 1.000 | 1.000 | 0.000 | 0.000 | 1.000 |
| Element 35 | 0.0 | 1 | 1.000 | 1.000 | 1.000 | 1.000 | 1.000 | 1.000 | 0.000 | 0.000 | 1.000 | 0.000 |
| Element 35, Clone 1 | 0.1 | – | 1.005 | 1.005 | 1.005 | 1.005 | 1.005 | 1.005 | 0.005 | 0.005 | 1.005 | 0.005 |
| Element 35, Clone 2 | 0.2 | – | 1.010 | 1.010 | 1.010 | 1.010 | 1.010 | 1.010 | 0.010 | 0.010 | 1.010 | 0.010 |
| Element 35, Clone 3 | 0.2 | – | 1.015 | 1.015 | 1.015 | 1.015 | 1.015 | 1.015 | 0.015 | 0.015 | 1.015 | 0.015 |
| Element 35, Clone 4 | 0.3 | – | 1.020 | 1.020 | 1.020 | 1.020 | 1.020 | 1.020 | 0.020 | 0.020 | 1.020 | 0.020 |
| Element 35, Clone 5 | 0.3 | – | 1.025 | 1.025 | 1.025 | 1.025 | 1.025 | 1.025 | 0.025 | 0.025 | 1.025 | 0.025 |
| Element 35, Clone 6 | 0.4 | – | 1.030 | 1.030 | 1.030 | 1.030 | 1.030 | 1.030 | 0.030 | 0.030 | 1.030 | 0.030 |
| Element 35, Clone 7 | 0.8 | – | 1.035 | 1.035 | 1.035 | 1.035 | 1.035 | 1.035 | 0.035 | 0.035 | 1.035 | 0.035 |
| Element 35, Clone 8 | 0.8 | – | 1.040 | 1.040 | 1.040 | 1.040 | 1.040 | 1.040 | 0.040 | 0.040 | 1.040 | 0.040 |
| Element 35, Clone 9 | 1.0 | – | 1.045 | 1.045 | 1.045 | 1.045 | 1.045 | 1.045 | 0.045 | 0.045 | 1.045 | 0.045 |
| Element 35,Clone10 | 1.0 | – | 1.050 | 1.050 | 1.050 | 1.050 | 1.050 | 1.050 | 0.050 | 0.050 | 1.050 | 0.050 |
| Element 36 | 0.0 | 194 | 1.000 | 1.000 | 1.000 | 1.000 | 1.000 | 0.000 | 0.000 | 1.000 | 0.000 | 1.000 |
| Element 37 | 0.0 | 146 | 1.000 | 1.000 | 1.000 | 1.000 | 0.000 | 0.000 | 1.000 | 0.000 | 1.000 | 0.000 |
| Element 38 | 0.0 | 244 | 1.000 | 1.000 | 1.000 | 0.000 | 0.000 | 1.000 | 0.000 | 1.000 | 0.000 | 1.000 |

* Multiplication Number

FIG. 36

A plot showing the changes in multiplication numbers as the screening frame in the form of the binary string (see FIG. 36) is moving along the binary sequence shown in FIG. 35.

Cluster trees showing the changes in the way of clustering that occur upon the addition of 1's to a natural sequence of numbers from 1 to 24.

HyPa self-evolution induced by consecutive addition of duplicates of analyzed objects to the capsule of clones Search for image analogs by emphasizing certain parameters and shows the locations of analogs of the query pose (see FIG. 21) after the "R-Toe" parameter was emphasized by a 10-fold increase

METHOD AND COMPUTER-BASED SYSTEM FOR NON-PROBABILISTIC HYPOTHESIS GENERATION AND VERIFICATION

CROSS REFERENCE TO RELATED APPLICATIONS

The present invention is a continuation of and claims priority from copending application Ser. No. 09/655,519, filed Sep. 5, 2000 by Leonid Andreev, and entitled "Unsupervised automated hierarchical data clustering based on simulation of a similarity matrix evolution", which is now U.S. Pat. No. 6,640,227, issued Oct. 28, 2003; and Ser. No. 10/622,542, filed Jul. 21, 2003 by Leonid Andreev, and entitled "High-dimensional data clustering with the use of hybrid similarity matrices"; the disclosures of which are herein incorporated in their entirety by reference.

STATEMENT REGARDING FEDERALLY SPONSORED RESEARCH OR DEVELOPMENT

Not Applicable

REFERENCE TO A MICROFICHE APPENDIX

Not Applicable
Current U.S. Class: 706/6, 706/10, 706/12, 706/45, 706/61; 707/3, 707/6, 707/100, 707/102, 707/104.1; 382/155, 382/159, 382/181, 382/190, 382/225, 382/276; 702/190, 702/194

BACKGROUND OF THE INVENTION

1. Field of the Invention

The present invention relates generally to the field of data processing and, more particularly, to a method for hypothesis generation and verification (HyGV-method), allowing for intelligent decision-making, image and sequence recognition and machine-learning.

2. Description of the Background 2.1. Hypothesis Testing in Mathematical Statistics The subject of this invention pertains to such a vast area of human cognitive activities that an exhaustive analysis of the background of this invention would take an analytical description of the state of the art in a too diverse domain, including many humanitarian and exact sciences. The bulk of the works in this area deal with statistical hypothesis testing, and, regretfully, there has been much less interest in the matter of testing of truly scientific hypothesis by applying the approaches proposed by scientists who either attempted to tackle the problem from the supra-science (i.e. philosophical) positions—for instance, K. R. Popper's theory of hypothesis falsification—or encountered statistical analysis problems of such complexity (for instance, in biology, including and especially, ecology) that primitive mathematical approximation could be of no use in the understanding of principles of interrelations between variables that determine a real diversity of objects and phenomena.

The foundation of modern hypothesis testing, being the central issue of modern mathematical statistics, was laid by R. A. Fisher; later works by J. Neyman and E. S. Pearson instated certain modifications that gave it the generally accepted form. The probabilistic principles of setting forth and testing a hypothesis have been described in numerous works and constitute an essential part of the modern inference statistics. In a nutshell (i.e. aside from the abundance of all the methods, approaches, techniques, and interpretations of mathematical statistics as presented in numerous textbooks and used as the basis for numerous statistical software products), hypothesis testing is all about comparison between a null hypothesis and an alternative hypothesis. The former is to reflect the absence of differences between population parameters, whereas the latter is to state the opposite. An alternative hypothesis is accepted if/when the null is rejected. The two hypotheses are compared based on normal curves of probability distributions, and, therefore, none of them can be conclusively proven or rejected, but one is eventually stated to be more probable based on its higher probability degree.

It would be hard to put it better than D. H. Johnson did in *Hypothesis Testing: Statistics as Pseudoscience* (presented at the Fifth Annual Conference of the Wildlife Society, Buffalo, N.Y., 26 Sep. 1998; published electronically on www.npwrc.usgs.gov), "I contend that the general acceptance of statistical hypothesis testing is one of the most unfortunate aspects of $20^{th}$ century applied science. Tests for the identity of population distributions, for equality of treatment needs, for presence of interactions, for the nullity of a correlation coefficient, and so on, have been responsible for much bad science, much lazy science, much silly science. A good scientist can manage with, and will not be misled by, parameter estimates and their associated standard errors or confidence limits. A theory dealing with the statistical behavior of populations should be supported by rational argument as well as data. In such cases, accurate statistical evaluation of the data is hindered by null hypothesis testing. The scientist must always give due thought to the statistical analysis, but must never let statistical analysis be a substitute for thinking! If instead of developing theories, a researcher is involved in such practical issues as selecting the best treatment(s), then the researcher is probably confronting a complex decision problem involving inter alia economic considerations. Once again, analyses such as null hypothesis testing and multiple comparison procedures are of no benefit."

Statistical hypothesis testing has been heretofore viewed as the only scientific approach to information processing. It determines both the process of data processing and, to a greater extent, the approach to setting up experiments and data selection (probability/nonprobability sampling). However, as mentioned by Anderson et al. (Anderson, D. R., Burnham, K. P., and Thompson, W. L. Null hypothesis testing: problems, prevalence, and an alternative. Journal of Wildlife Management 64(4): 912–923), "over 300 references now exist in the scientific literature that warn of the limitations of statistical null hypothesis testing". The number of such works had been exponentially increasing in the period of the 40's to 90's of the past century.

This invention provides a method for hypothesis generation and verification (HyGV) that involves principles fundamentally different from those employed in the statistical hypothesis testing methods; it is free from the flaws of probabilistic approaches, can be applied in processing of any type of information, and it is exceptionally simple in use. The method is based on the principle of the information thyristor designed by us and described in Detailed Description of this invention.

2.2. Hypothesis Generation and Verification

Hypothesis generation and verification is the basis of logical thinking and of a well-grounded decision making. "Decision making" is one of the most frequently occurring terms in AI. Unless on each occasion of its use, an explanation is provided on what exactly is implied by it in a given case, its general meaning is as fuzzy as it gets, up to a total lack of meaning. If what is meant by the term is an independent, adequate and reproducible response to a change in a set of alternative courses of actions, then any reliable measuring instrument (hyperbolically speaking, even a thermometer) should qualify as a decision-making method and apparatus. Or, if the implied responsibilities involve relieving the operator (a human-being) from the necessity of screening and discarding false or unverified information and to be able to advise a human-being on how to act in a particular situation, then it is more of reference book. If a decision-making system is supposed to be a "quick-learner", then the question arises: what to learn and how? If the instruction/training is to be provided by the human instructor, then such a device cannot be an independent thinker/decision-maker—it will remain a thermometer, however sophisticated it may be, or a reference book, however regularly it is updated. There is no learning part in such "training". One and the same decision applied to particular situations that are same in general, however, different in slight but important details may result in opposite outcomes, and, therefore, the user's failure to provide proper control over its "decision-making" artificial assistant may end poorly for the user.

Acceptance of a decision is based on acceptance of a hypothesis that provides an explanation regarding a certain phenomenon of an event, object, or person, as well as non-antagonistic alternatives thereof. A hypothesis is a verifiable statement which may include predictions. A prediction is nothing else but a continuum of analogs of a given phenomenon—even if the latter in reality may be a unique one. Value of a prediction depends on how correctly it can rank those analogs in accordance with the probability of their occurrence depending on circumstances.

Decision making involves several different stages, including the following most important ones:

(1) recognition and understanding of a problem on which a decision has to be made, or formulation of an objective of a decision-making task;

(2) hypothesis generation, i.e. construction of a series of variants of potentially applicable decisions supposedly including an optimal one;

(3) search for information that may be used for hypothesis verification;

(4) hypothesis verification.

As this invention provides a method and system for unsupervised hypothesis generation and verification, in this context it is important to elaborate on the matter of which of the stages of the computerized decision-making process can in principle be implemented as an unsupervised operation. Such an analysis of the decision-making stages will facilitate the generation of a hypothesis on the issue of why computers are still unable to make decisions on their own, and whether there may be any solutions for this problem.

We will start with the last of the aforesaid basic stages of decision making—i.e. hypothesis verification. There exist many different viewpoints regarding this part of the decision-making process; for instance, Popper's opinion that it is all about creative intuition which cannot be governed by logic, or, quite a polar view on a hypothesis as an expression of the relationship between two (or more) variables (McGuire, W. J. (1997) Creative hypothesis generating in psychology: some useful heuristics. Annual Review of Psychology, v. 48, pp. 1–30). If hypothesis verification can be brought to comparison of values of different variables, then this task is well within computer's competence. Same is true for the third stage—information search—which, by definition, is the area where computers outperform humans in speed and efficiency. The second stage—hypothesis generation—is closely connected with the first step in decision making, i.e. the understanding and formulation of an objective, and therefore is extremely difficult for computerized implementation. Nevertheless, there are many factors to support the feasibility of that task. See, for example, McGuire's discussion of creative hypothesis generation on strategic and tactical levels and the description of 49 heuristics, including 5 types and 13 subtypes, that are used by psychologists and can be taught (Ibid). In the following disclosure of this invention, we will show that not only is computer-based hypothesizing possible, but it is also possible to develop a computer-implemented imitation of approaches used in human way of thinking. As far as the first stage of the decision-making process is concerned, it involves that very unique function that can be performed only by humans and (at least as of today) not by computers. Apparently, this is the key aspect that has to be explored before taking the challenge of the "thinking computer" idea. One of the many issues involved in this problem is pivotal in the context of this invention, which, in its turn, has been conceived as a logical result of the developments presented in the related patent and copending application.

As is well-known, different individuals can (and, more often than not, do) make different decisions regarding one and the same situation. When two experts express two different or opposite to each other's opinions on a same matter, a person seeking an expert opinion and familiar with the individual styles of each of the experts' performance will only gain from the obtained results. For instance, one of the experts may be too conservative and cautious in judgments, whereas another may be overly categorical. A common feature of both of them is individuality, i.e. each of them has a unique and specific way of a psycho-physiological response, philosophical view on phenomena under study, preferences in logical approaches, etc.—all of which can be taken into account and used in making a final decision. A bad expert's opinion may appear to be no less useful if such expert's style is reproducible. Contrarily, a computer does not have the individuality, and its "brain"—the software—is a composite product of the humankind and is developed by large groups of programmers.

Individuality or "ego" can be interpreted in different ways. For instance, computers manufactured by a perfectly same technology may still have slight differences, each of its own, and, therefore, can be viewed as "individualities"—if non-individuality is understood only as sharing exactly same set of properties of objects. However, there is also another understanding of individuality, as, for instance, applied to a human-being taking a road of his own and capable of independent thinking and judgment; and in the context of individuality it does not matter whether or not the thinking, judgments and decisions are correct. We imply this interpretation of individuality when stating that a computer does not have it.

2.3. What it takes to "Raise" the AI

Many AI terms that have been around for decades by now still lack clear and explicit definitions of what exactly is implied by a given term—which is not surprising as the whole domain of AI is about imitation of something which itself has not yet been fully explored by the science. Thus, from its very onset, the AI research has been oriented toward the effect rather than the cause, toward the imitation of the brain's unique abilities without the understanding of their nature. And, of course, the AI is expected to work independently, i.e. relieving the human operator from the necessity to control the AI's every step. This cocktail, made of materialism and Cartesian ideas, has been served to several generations of AI student, although everybody in the field understands by now that the modern use of the term "artificial intelligence" is more marketing than scientific. In general, all what computer science has so far come up with on the issue of imitating the human or animal brain processes is a vocabulary. Take, for instance, artificial neural network (ANN) systems after the McCulloch-Pitts model of the neuron based on an intuitive view of how charge accumulation occurs on a cell membrane and how it influences synapse strengths. Not only readers of popular scientific literature, but also many researchers in artificial neural network are convinced that ANN is indeed the imitation of the work of brain neurons. Leaving alone the fact that the whole concept is purely a product of computer programming and mathematics and that the word "neuron" in this context is just a symbol of a future goal and by no means an assertion of any real achievement, there is yet another problem: even if computer engineering can describe and simulate the synapse formation and transmission, how can it describe and simulate what is still unknown to neuroscience: how is specific information communicated from one neuron to another?

With all its obvious interest in biological terminology, computer science omits to focus on really important features of autonomous self-referent biological systems as the mammalian brain, while it is well-known that many of those features play the key roles in the functioning of living systems. There is an undeniable truth about the human brain activity, and failure to realize or remember that truth inevitably results in failure in fulfilling the task of the realistic simulation of the human brain activity. That truth is so simple and trivial on the surface that it does not catch the attention of the computer science community whose hope for creation of artificial intelligence—be it through computation speed breakthrough, computer memory expansion, or advances in programming art (for instance, products of the artificial neural network concept)—never dies. However, it is obvious that there is nothing yet in the computer science field that could give hope for development of a computer system that would be able to make independent decisions on what is right and what is wrong. Even the strong believers in the future of artificial intelligence realize that the computing power in the fifth or sixth generation cannot, by itself, guarantee a breakthrough in the AI field.

The simple and trivial truth, referred to above, consists in the fact that any living system—including, of course, the brain as the most complex domain in the system of the living substance—has a highly cooperative infrastructure. Cognition is a biological phenomenon, and it can be understood only as such. Consciousness cannot be explained by merely making a list of all its properties. Metabolic systems of living organisms involve lots of biochemical processes whose performances are ultimately coordinated. Even a small failure in a minor "department" of a metabolic system ("minor" from a biochemist's anthropomorphic viewpoint) may become a debilitating or lethal factor for a system. No computer program attempting to imitate the processes occurring in living organisms and, especially, in the brains, the most complex part of them, can provide for that level of coordination, and it is clear why. The human brain has mysterious properties, and no less mysterious are those of the human body infrastructures that support the brain functioning—for instance, the haematoencephalic barrier whose role is not to allow certain substances that can damage the brain work to penetrate the nerve cells. A computer program that can at any point sustain artificially made commands without a complete loss of its functionality will never be able to imitate the brain properties. Should it ever happen that a computer program with the functionality similar to that of human brain is created, it will consist of a set of algorithms that provides a continuous metabolic cycle with the highest level of cooperation and coordination between its constituent parts.

Complex computer programs are developed in a programming style that to a large extent corresponds to what could be defined by an eclectic notion of "compromise logic". As software developers' key priority is the achievement of a technical objective rather than maintaining a certain wholesome logic, it often happens that starting with the very early stages of a computer program development, a unified algorithmic core can no longer be maintained and breaks into a multitude of artificially joined individual algorithms. Execution results provided by individual algorithms are further either used, or ignored, or rejected, depending on how well they work towards the solution of tactical and strategic tasks in the context of a given computer program. Thus developed a computer program can be compared to music without melody; its individual components often become mutually antagonistic, and to eliminate the antagonism, developers resort to "premature mathematization" (Russel, S. [1997] Rationality and intelligence. Artificial Intelligence Journal, 94 (1–2) 57–77). The latter, while resolving particular local problems, inevitably creates new problems, and swiftly fills up the whole space of a program where logical continuity of its components is missing. Thus, the attempts to cope with the growing complexity of computer programs lead to creation of more complex programs.

Full cooperation between all of the algorithms of a computer program is an extremely difficult task, and without its implementation, no program that can qualify for the role of the brain's artificial counterpart. A truly cooperative system of algorithms does not tolerate commands that are alien to its environment, however important their execution may be in the context of a program's performance or in the view of its designer. Simply put, an algorithm that effectively imitates the brain can be emulated by no other algorithm but itself. In general, this constitutes that truth which is so trivial that it remains simply ignored.

Another simple but important truth, relevant in the issue of the efficiency of computer-implemented learning, consists in the fact that cognition is a product of interaction between deduction and induction. Over two thousand years of experience and knowledge generated by the mankind's best think-tanks testify to the fact that these two oppositely directed processes underlie the actual process of cognition. However intensely has this issue been investigated throughout the past centuries, we have yet to understand how these two fundamental mechanisms interact in the brain. But the fact of the matter is that there is spontaneous interaction between deduction and induction, and they are inseparable.

2.4. Algorithmic Foundation of this Invention

Our research and development in AI, or—using a more correct but less common term—non-biological intelligence, NBI (see more information on the related work on http://www.matrixreasoning.com), has been based on the understanding of the fact that without the implementation of two aforementioned features of the brain—functionality cooperation and organic spontaneity of the relationship between deductive and inductive processes (or—speaking in computer science language—without an algorithmically holistic approach)—no imitation of the brain activity is possible. This ideology led us to development of a system of interrelated algorithms for identification, differentiation and classification objects described in a high-dimensional space of attributes, which further has been used as the underlying methodology in this invention. The said methodology, comprising the evolutionary transformation of similarity matrices (U.S. Pat. No. 6,640,227, October 2003, by L. Andreev) as a new universal and holistic clustering approach that provides a solution to most complex clustering problems, is based on quite a simple algorithm that can be defined by a commonly known principle of "the golden mean".

The method for evolutionary transformation of similarity matrices consists in the processing, in one and the same fashion, of each cell of a similarity matrix so that a similarity coefficient between each pair of objects in a data set is replaced by a ratio of a similarity coefficient between each of objects in a pair and a mean value of similarities between each of two objects whose replacement similarity coefficient is under computation and all other objects of a matrix. The algorithm of the process of evolutionary transformation of a similarity matrix is based on the following formula:

$$S_{A,B}^T = \left( \prod_{i=1}^{n} \frac{\min(S_{i(A)}^{T-1}, S_{i(B)}^{T-1})}{\max(S_{i(A)}^{T-1}, S_{i(B)}^{T-1})} \right)^{\frac{1}{n}}, \quad (1)$$

where $S^T_{AB}$ is a binary similarity coefficient after transformation No. T; "n" is a number of objects associated with a matrix; A, B, and i are objects associated with a matrix; "min" and "max" mean that a ratio of $S^T_{i(A)}$ to $S^T_{i(B)}$ are normalized to 1. The algorithm for such transformation is repetitively applied to a similarity matrix till each of similarities between objects within each of the clusters reaches 100% and no longer changes. the end, the process of successive transformations results in convergent evolution of a similarity matrix. First, the least different objects are grouped into sub-clusters; then, major sub-clusters are merged as necessary, and, finally, all objects appear to be distributed among the two main sub-clusters, which automatically ends the process. Similarities between objects within each of the main sub-clusters equal 100%, and similarities between objects of different sub-clusters equal a constant value which is less than 100%. The entire process of transformation may occur in such a way that while similarities within one sub-cluster reach the value of 100% and stop transforming, another sub-cluster still continues undergoing the convergent changes and take a considerable number of transformations (in which the objects of another sub-cluster are no longer involved). Only after the convergent transformation of the second sub-cluster is complete, i.e. when similarities between its objects reach 100%, and similarities between objects of the two sub-clusters clusters is less than 100%, an entire process of evolutionary transformation of a similarity matrix is over. In the described process, there is no alternative to the sub-division of all objects of a data set into two distinctive sub-clusters. Any object that may represent a "noise point" for any of the major groups of objects in a data set of any degree of dimensionality gets allocated to one of sub-clusters.

Conversely, the above described convergent evolution may also be represented as divergent evolution and reflected in the form of a hierarchical tree. However, the mechanism of the algorithm for evolutionary transformation involves the most organic combination of the convergent and divergent evolution (or deduction and induction based on input information about objects under analysis). For that purpose, each of the sub-clusters formed upon completion of the first cycle of transformation is individually subjected to transformation, which results in their division into two further sub-clusters, respectively, as above described; then, each of the newly formed four sub-clusters undergoes a new transformation, and so on. This process, referred to as 'transformation-division-transformation' (or TDT) provides for the most rational combination of the convergent (transformation) and divergent (division) forms of the evolution process, in the result of which an entire database undergoes multiple processing through a number of processes going in opposite directions. The said combination of processes is not regulated and is fully automated, autonomous and unsupervised; it depends on and is determined by only the properties of a target similarity matrix under analysis, i.e. by input data and an applied technique of computation of similarity-dissimilarity matrices. In other words, the ETMS algorithm is based on "uncompromising" logic that cannot be manipulated by arbitrarily introduced commands, which results in the fact that the efficiency of the ETMS-method greatly depends on how adequate and scientifically well-grounded are the techniques used in presentation of input data (i.e. computation of similarity matrices). Thus, for the evolutionary transformation method to be independent from the operator's will and truly unsupervised, the similarity matrix computation must be based on a procedure that does not depend on the type of input data.

Some of the approaches applied in many of the widely used applications for the purpose of establishing similarity-dissimilarity of objects described in high-dimensional space of attributes clearly represent a forced solution used for the lack of proper techniques and are simply nonsensical. For instance, there is a widely known notion of the "curse of dimensionality" which refers to a dramatic dependency of parameterization of distances between attributes on their dimensionality. Understandably, this dependency catastrophically increases in a super-space, resulting in a situation when the most that can be done about similarities-dissimilarities is the standardization of conditions for comparison of similarities on a presumption that "objects in a set have otherwise equal status", which by definition cannot be considered as an acceptable methodological platform. For instance, it is customary to use Euclidean distances to determine similarities (between objects) as vectors in n-dimensional spaces of parameters even if they are described by different dimensions—despite the elementary truth that this is grossly unscientific. This inadmissible compromise further creates multitude of problems, starting with the "curse of dimensionality" and up to the necessity of entering special constraints for a computer program to avoid the use of Euclidean distances where it is absurd.

In the meantime, there is quite a simple solution that effectively and completely takes care of the problem of unsupervised automated computation of similarity matrices for objects described by any number of parameters. The solution, described by us in a copending patent application entitled "High-dimensional data clustering with the use of hybrid similarity matrices", consists in the following. So-called monomer similarity matrices according to each of parameters describing a given set of objects are computed for a set of objects, after which the monomer matrices (whose total number corresponds to a total number of parameters) are hybridized. If we have a set of monomer similarity matrices (M) where each of the matrices is calculated based on one of the parameters, i.e.

$$M(a), a \in \{1, 2, \ldots, n\} \quad (2),$$

then, hybridization of the matrices is performed by the formula:

$$Hij = \left( \prod_{a=1}^{n} M(a)_{ij} \right)^{1/n}, \quad (3)$$

where Hij is a value of hybrid similarity between objects i and j. Thus, the computations in both the ETSM algorithm and the above-referred procedure for preparing hybrid similarity matrices for the ETSM-method are based on a simple operation of calculation of mean values. Hybridization of matrices leads to the natural fusion of object patterns in terms of their variables' values. Clearly, hybridization can be done on similarity matrices that have been computed based on any type of attributes (categorical, binary, or numerical). Since attributes converted into units of a monomer similarity matrix no longer have any dimensionality, the above referred procedure for hybridization of monomer similarity matrices can be used as a methodological basis for comparison of attributes of any kind and nature.

As a result of development of monomer similarity matrices hybridization technique, it has become possible to add to a hybrid matrix any numbers of copies of individual parameters, thus to find out weights of individual parameters in a totality of all parameters that describe a given set of objects. The parameter multiplication method described in a copending application by L. Andreev ("High-dimensional data clustering with the use of hybrid similarity matrices") has provided the grounds for the method of this invention.

The final issue that ought to be discussed in the context of the background of this invention is the technique for monomer similarity matrix computation. As monomer matrix computation is based on a single parameter, it causes, for instance, a Euclidean distance automatically transform into the city-block metric. The copending application by L. Andreev "High-dimensional data clustering with the use of hybrid similarity matrices" provides two types of metrics to be used in computation of monomer similarity matrices—the R- and XR-metrics. The R-metric ("R" for "ratio") is calculated by the formula:

$$R_{ij} = \min(V_i, V_j) / \max(V_i, V_j) \quad (4),$$

where $V_i$ and $V_j$ are values of parameter V for objects i and j. Here, similarity values are calculated as the ratio of the lower value to the higher value of a parameter of each of the two objects. Thus, values of the R similarity coefficient vary from 0 to 1.

The XR-metric ("XR" stands for "exponential ratio") is calculated by the formula:

$$XR_{ij} = B^{-|v_i - v_j|} \quad (5),$$

where $V_i$ and $V_j$ are values of parameter V for objects i and j, and B (which stands for "base") is a constant higher than 1. Values of the XR similarity coefficient also vary from 0 to 1.

R-metric is optimal for description truly or quasi-equilibrium systems where attributes reflect a signal strength, concentration, power, or other intensiveness characteristics. XP-metric is optimal for description of non-equilibrium systems where attributes reflect a system shape for operations in spatial databases, a distance between individual points within a system, or other extensiveness characteristics.

SUMMARY OF THE INVENTION

The present invention provides a novel method for hypothesis generation and verification (HyGV-method) to be applied in data processing as a universal solution for problems of computerized decision-making, machine learning, as well as a wide range of image and pattern recognition problems—starting with a search for any type of sequences, up to robotic vision problems. One of the most important advantages of the method of this invention lies in the fact that, along with the exact recognition of a query object, it provides analog ranking in a manner that considerably simplifies the approach to such complex problems as intelligent data understanding and machine learning. The proposed method allows for the optimization of a decision making process and for automated evaluation of decision validity. This invention can also be used in search engines and related tasks, e.g. retrieval of documents, etc.

The main concept that underlies the present invention consists in the generating of a certain estimation scale for objects under investigation—in the form of a hypothesis that, once generated, serves as an additional parameter and, therefore, will be hereunder referred to as "hypothesis-parameter" (HyPa) which represents an abstract reflection, in a digital form, of regularities existing in a set of objects described in a high dimensional space of parameters. HyPa may either result from a preliminary analysis of a given set (e.g. a clustering result), general knowledge, a "wild guess", etc., or it may be automatically generated for a single object in a set of objects. In the latter case, it consists in construction of a so-called "capsule of clones" of a reference object (here and further in this specification, a "reference object", or a "query object" is an object to be located and identified; and a "target object" is an object under scrutiny at a given moment of a database analysis, i.e. an object that is checked and investigated in order to establish whether or not it may appear to be the "reference object" or one of its closest analogs)—i.e. an artificially generated hypothetical set of similar objects—clones of a reference object—whose parameter values differ, according to a certain principle, from those of a reference object. A "capsule" may include any number of analogs of a reference object; however, an optimal capsule usually including up to 5–7 analogs. A "capsule" is created for construction of HyPa for a singular reference object, with the further use of a created HyPa as a digital parameter, along with other parameters describing a given object.

The central procedure of the method of this invention is the establishing of a number of copies of a "hypothesis-parameter" to be added, during clustering by method for similarity matrix evolutionary transformation (U.S. Pat. No. 6,640,227, October 2003, by L. Andreev), to an initial pool of parameters to neutralize the effect of a totality of initial parameters so as a clustering result is the same as it would be if based on just one parameter, i.e. HyPa. The higher is the number of required HyPa multiple copies (multiplication number M), the less is its resemblance to a reference object. Natural logarithm of an HyPa multiplication number (M) is referred to as implausibility number. A ln M value equals 0 when an analyzed object and an object whose HyPa is used for comparison are identical in terms of given parameters.

The ln M, being a sort of dissimilarity criterion, allows for outlining a space of close analogs and thus makes machine-learning process easier. Implausibility number is an exceptionally sensitive criterion in search for analogs of a query object, and it nonlinearly increases in case of objects whose parameter values differ from those of a reference object.

The HyGV-method presented by this invention is based on the principle of the information thyristor, hereunder referred to as "infothyristor", and described below in the Detailed Description section of this specification.

The examples provided in this disclosure demonstrate a peculiar manner in which a reference object's analogs are selected according to the method of this invention—very much similar to the human brain's natural manner to select from a diversity of objects and phenomena and keep in memory those that deserve remembering. However, in machine learning, such registering of information is necessary but insufficient. There has be a certain mechanism to ensure a proper process of analog selection based on required degree of similarities between objects to be selected as analogs and a standard chosen by us as a focus of learning and provided with an expert opinion.

The realization of the method of the present invention has become possible as a result of development of two earlier inventions by L. Andreev: "Unsupervised automated hierarchical data clustering based on simulation of a similarity matrix evolution" (U.S. Pat. No. 6,640,227, October 2003), and a copending application titled "High-dimensional data clustering with the use of hybrid similarity matrices". The objective autonomous and unsupervised automated generation of HyPa for individual objects is based on the method for evolutionary transformation of similarity matrices (ETSM). HyPa multiplication numbers required for compensation of an entire pool of initial parameters can only be established with the use of the procedure for hybrid matrix computation and involve the use of the metrics proposed in the same invention. According to the method for matrix hybridization, a similarity matrix for a set of objects described in a high-dimensional space of parameters is computed as a product of hybridization of monomer similarity matrices each of which is computed based on one parameter and is dimensionless—which is why any number of copies of object's individual parameter may be introduced into a hybrid matrix.

This invention can be effectively applied to data processing and intelligent data understanding tasks in virtually any research and practical area. The detailed description of this invention provides examples of the application of the HyGV-method in demographic studies, climate research, biometrics, and image recognition. The method of this invention allows for analysis of objects described by any number of parameters: for instance, the example of demographic analysis provided below deals with the data on 220 countries, each described by 51 parameters; the climatic data analysis illustrated below deals with the data on 245 U.S. cities and locations in 50 states, described by 108 parameters. Processing time per object is practically constant.

In this disclosure, it is demonstrated that the ETSM-method (according to copending application), used as an engine for the HyGV-method of this invention, and the HyGV-method itself correlate with each other as intuition and reasoning, thus providing a platform for development of a working model of non-biological intelligence and the mechanisms of deductive and inductive machine self-learning.

All of the techniques contained in this invention are easy in realization, and their computer-based implementation is done on a regular PC system. It is also important that the algorithms underlying the method of this invention are based on iterative uniform computational operations and, therefore, are multiprocessor-friendly, thus making this method efficient in real-time complex data processing.

BRIEF DESCRIPTION OF THE DRAWINGS

The foregoing and other aspects and advantages of the present invention will be better understood from the following detailed description of the invention with reference to the drawings in which:

In FIG. 2C, the subcluster notations include (numbers in brackets) examples of values assigned to respective subclusters in the HyPa.

FIG. 13 shows the results of clustering by evolutionary transformation of a similarity matrix computed based on four different values of multiplication numbers corresponding to particular countries in the hypothesis-parameter: a=12 (Saudi Arabia), ba=5 (Israel), bb=2 (Russia), and bb=3 (Italy). Hypothesis generation was performed by the HyGV-ID method described in this specification (see also FIGS. 10–11), the similarity matrix was computed using the R-metric (equation 4 of this specification).

FIG. 26 is a table demonstrating the additivity of multiplication number values computed by the HyGV-method for human body poses No.1–14 shown in FIG. 18. The capsule of clones was made for the reference object shown as a query in FIG. 23. Out of 18 points used as parameters (see FIG. 17) of the artificially generated human body images, 7 referred to the left half of the body; 7, to the right half, and 4, to the torso center.

FIG. 30 illustrates an example of a table used for computation of a hybrid similarity matrix and identification of a certain string in a sequence of n-number of elements (e). Here, "f" is a length of a target string; "k" is the No. of an element of the sequence that is the first element of a target string; and CC(k) is a capsule of clones for the string of "k+f–1" elements. The data in the table are changing as the "frame" is moving along the sequence under analysis.

FIG. 35 shows an artificially generated binary sequence. The section in bold is a reference string.

FIG. 36 is a table for computation of a similarity matrix used in binary sequence recognition.

FIGS. 38A, 38C and 38E show the ln M values obtained with the reference object being Saudi Arabia. FIGS. 38B, 38D and 38F show the ln M values obtained with the reference object being Russia. The ln M values were computed with the use of 34 demographic parameters. FIGS. 38A and 38B demonstrate the ln M correlation with the percentage of the male populations of the age group of 00–04; FIGS. 38C and 38D, with male populations, age group of 20–24; and FIGS. 38E and 38F, with male populations, age group of 75–79.

In FIGS. 42B–42F, duplicates of different objects (countries) were added to the same capsule of clones. In all cases, the duplicates were assigned the HyPa value of 1.

DETAILED DESCRIPTION OF THE INVENTION

Figure 1:
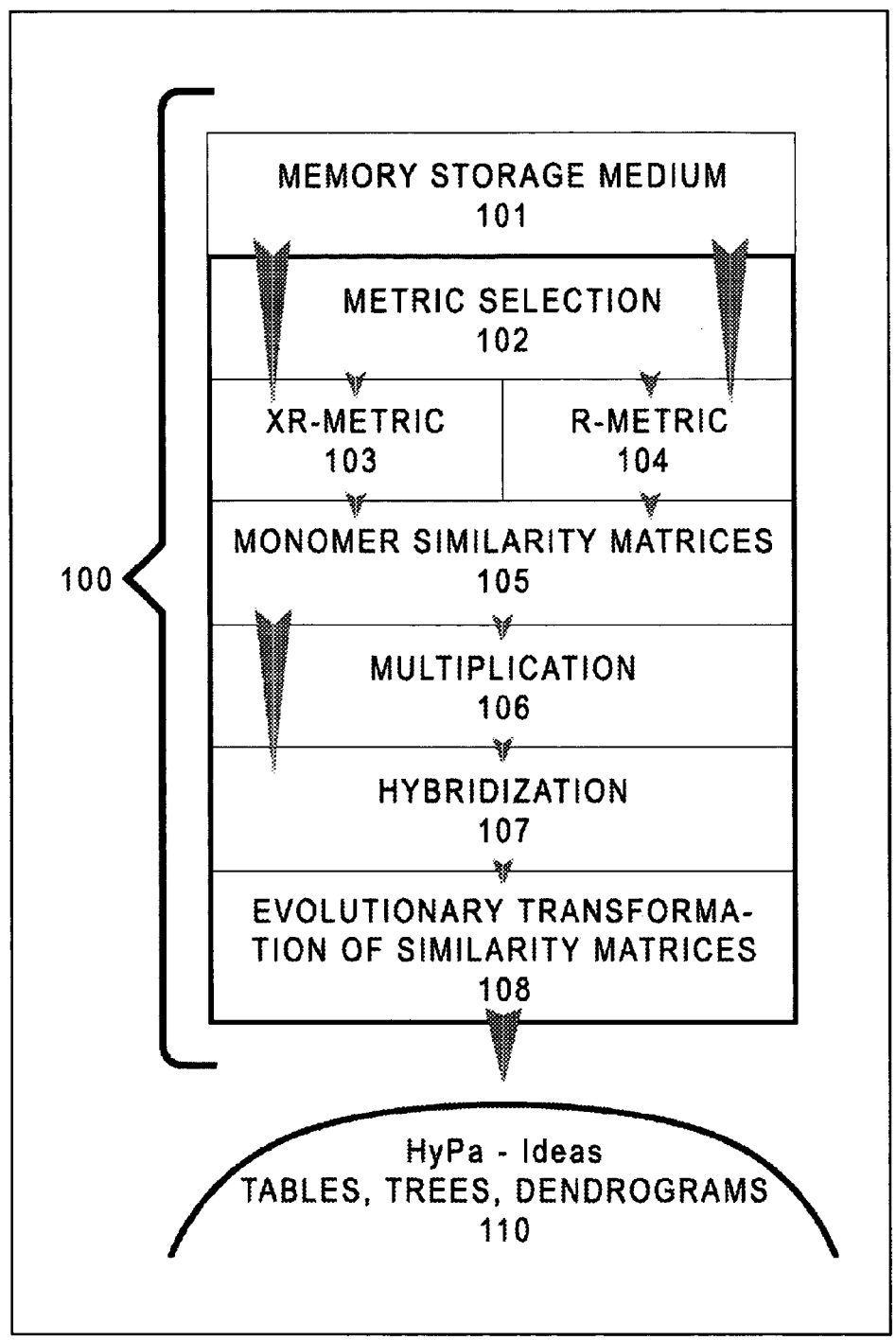
FIG. 1 is a flow diagram showing the algorithmic architecture of MeaningFinder™ computer program as the implementation of this invention. Steps 103 through 108 are covered by U.S. Pat. No. 6,640,227 "Unsupervised automated hierarchical data clustering based on simulation of a similarity matrix evolution" by Leonid Andreev, and a copending application "High-dimensional data clustering with the use of hybrid similarity matrices" by Leonid Andreev.

1. Introduction
2. HyGV-method: generation and verification of hypotheses in the form of "hypothesis-parameters"Information thyristor
3. Infothyristor as a means for measurement of conventional complexity
4. Example of application of HyGV-method in clustering of scattered data points
5. HyGV-method in processing of climatic data
6. HyGV-method in processing of demographic data
7. HyGV-method in image recognition
8. HyGV-method in gait recognition
9. HyGV-method in sequence recognition
10. HyGV-method in identification of target strings in binary sequences
11. HyGV-method and mathematical statistics
12. The interrelation between. HyGV and ETSM methods
13. Machine self-learning
14. Conclusions
1. Introduction FIG. 1 shows a schematic diagram of the architecture of an engine that provides basis for the preferred embodiments of this invention. This engine, under a conventional name of MeaningFinder™ ("MF"), represents a cooperative system wherein all of its elements are closely interrelated. The functioning of the individual modules of the MF system is explained above in the section "Background of the Invention". In those cases when it is clear which of the two metrics—R or XR—must be used for computation of a monomer similarity matrix, the MF system provides for fully unsupervised hierarchical clustering of objects under study. In the method of this invention, the MF system works as a clustering detector, or information thyristor, that automatically and irrespectively of a data set volume identifies differences across a hierarchy of a community of objects under analysis.

The main concept underlying this invention is the establishing of quantitative relationship between a hypothesis and facts. In this context, a hypothesis is an idea—a priori existing or otherwise generated—on a possible relational organization of a given set of objects; and facts are a set of any number of variables (parameters) describing objects of a respective set of objects. In order to evaluate the appropriateness and quality of an idea, we propose expressing it in the form of a hypothesis-parameter, hereunder referred to as HyPa. As this invention may be applied to any set of quantitatively or semi-quantitatively described objects or phenomena, for the illustration purpose we provide several examples pertaining to: clustering of scattered data points, meteorological data processing, demographics, image recognition, and sequence recognition. Image recognition has been chosen for visuality considerations, and also because a human body (and its various poses) represents a continuum, practically with no gaps and hiatuses, in which case the identification, classification and machine learning are extremely difficult. As for demographics objects, they present interest based on many considerations: 1) input data that are collected in a responsible and professional way represent what can be referred to as a high-dimensional data space; 2) data are largely available for public and research use; 3) the information presents general societal interest; 4) analysis results are a convincing demonstration of a high commercial potential of the proposed method that provides solutions to various problems involving demographic specifics of particular localities; and 5) discoveries on demographic specifics of populations of the world always lead to interesting associations (geographical, ethnographical, religious, economical, historical, etc.) which, in their turn, can be a source of heuristic ideas. In the examples demonstrated below, we intentionally present average (non-optimized) results to emphasize the fact that what demonstrated here is not some carefully selected and polished case studies for textbooks or marketing presentations, but a real-life working method available for a regular PC user. However, it was not the practical or theoretical value criteria that determined the choice of the examples presented in this disclosure. In the foregoing section on the background of this invention, we have suggested that, certain conditions provided (algorithmic integrity, cooperativeness, and rational combination of the deductive and inductive in the approach to data processing), a computer program can display the abilities of an expert with an individual "system of values" and individual perspective of objects and phenomena, i.e. can have an "ego". Obviously, to demonstrate that this invention provides for reaching the above-formulated goal, it would not be enough to provide a couple of examples. In order to prove that a certain computer program has its own "outlook", one has to produce a special kind of evidence of the achievement of the goal: as a minimum, a very wide range of objects of application. Also, as we will show in the following description, the no less important point is the demonstration, on the examples of diverse problems, that a system does have individuality in "perception" and assessment of problems, just as humans do.

2. HyGV-method: Generation and Verification of Hypotheses in the Form of "Hypothesis-Parameters". Information Thyristor A "hypothesis-parameter" ("HyPa") is generated in one or another way and represents a digitally expressed idea on how objects or phenomena under analysis are interrelated. The principle of digitalization is simple: objects within an HyPa can be assigned such digital values which upon clustering of those objects based on the HyPa as the only parameter will provide the same result (a tree of clusters) as the one based on all available parameters in the absence of an HyPa.

Figures 2A, 2B, 2C:
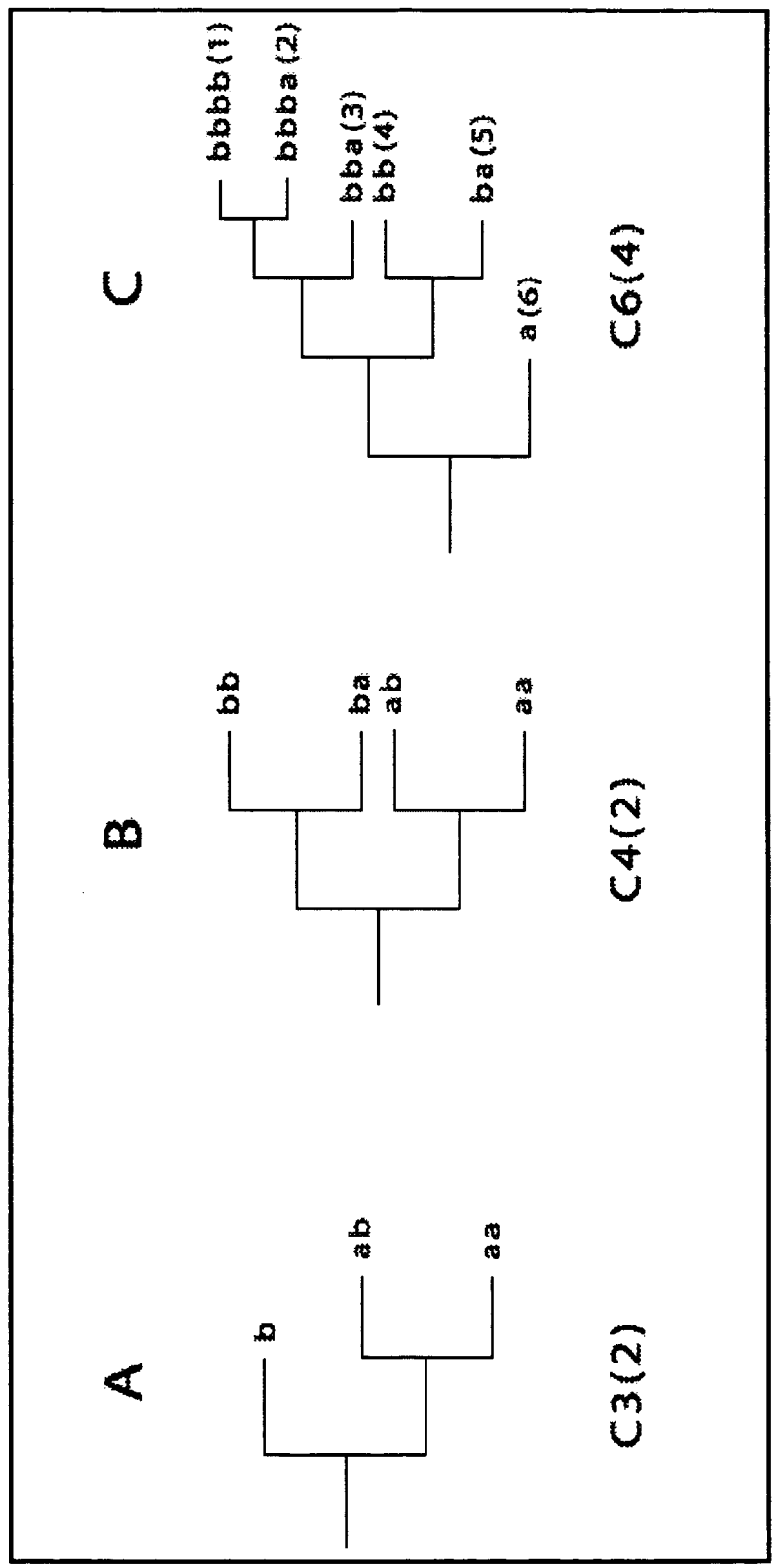
FIGS. 2A–2C show the examples of hypothesis-parameter (HyPa) clustering trees. In the notations, the first numbers stand for numbers of subclusters formed out of the HyPa: thus, tree A (FIG. 2A) has 3 subclusters; tree B (FIG. 2B), 4 subclusters; and tree C (FIG. 2C), 6 subclusters. The numbers in brackets correspond to numbers of nodes in the clustering trees.

Human assessment of similarities between objects or phenomena is mostly of planar nature, unlike, for instance, the way situations are assessed in chess analysis. Indeed, the assessment scale used by humans for evaluation of objects and phenomena is not very detailed, and it has its adequate verbal reflection in the form of evaluative words, such as: extremely poor, poor, satisfactory, good, very good, excellent, etc. Respectively, such an evaluation space can be presented on a scale, for instance, from 0 to 5, where "extremely poor" corresponds to 0, and "excellent", to 5. A narrow range and quasi-superficiality of such a scale are, in fact, very important for reasoning dynamics and for the optimal ratio between induction and deduction. In the method of this invention, an HyPa is evaluated through ETMS-based clustering, and for the consideration of the above-noted peculiarity of human assessments, clustering is done based, mainly, on two nodes (FIGS. 2A and 2B). HyPa can also be designed so that clustering of objects described by HyPa as a single parameter provides a multi-node similarity tree. For instance, the examples demonstrated in this and in the following sub-sections "Example of application of HyGV-method in clustering of scattered data points" and "Demographic data processing" show the clustering based on four or more node trees. However, as demonstrated by various other examples presented in this disclosure, similarity on a two-node level provides both sufficient and optimal solution of extremely complex tasks.

Figure 3:
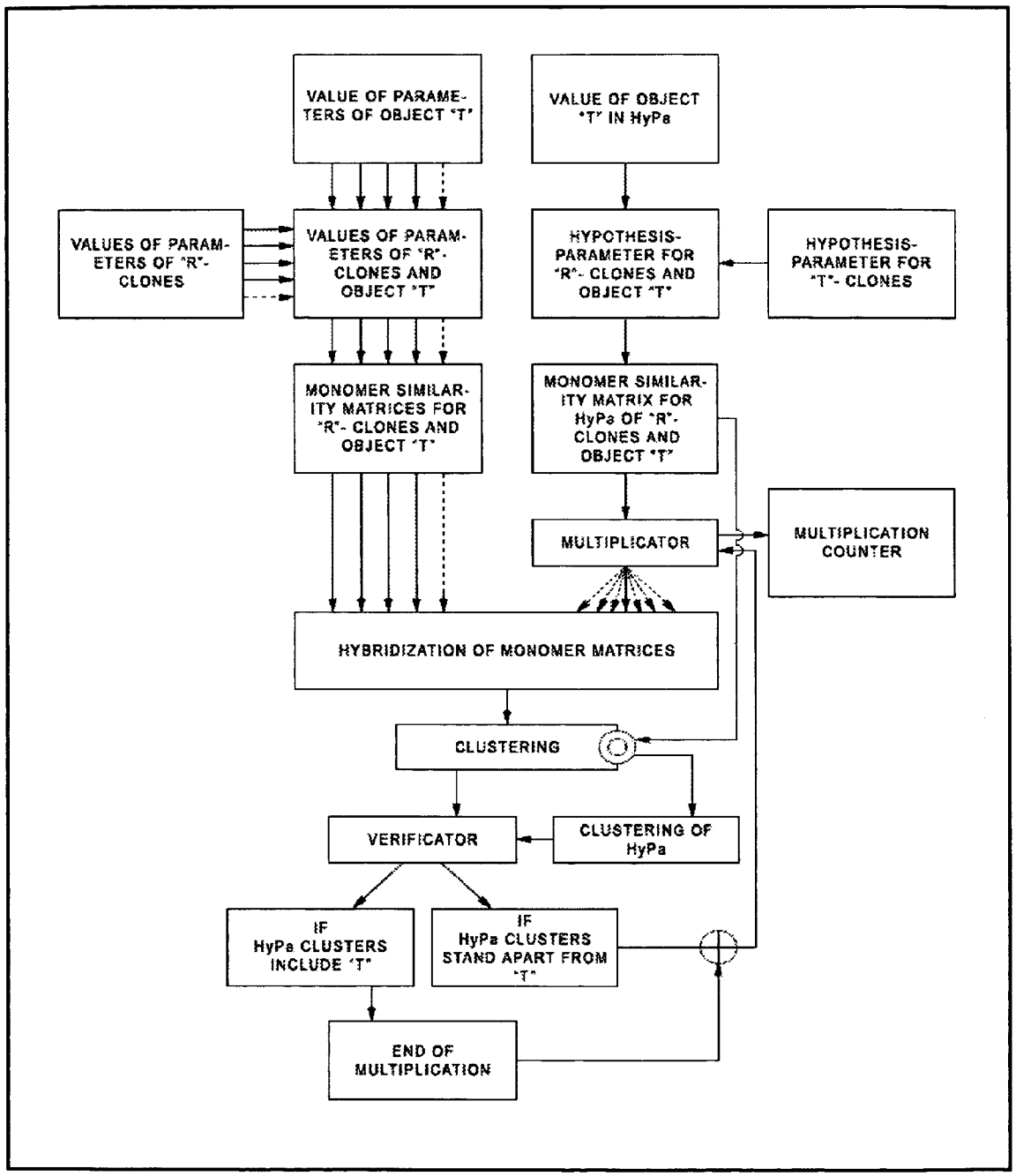
FIG. 3 is a flow diagram showing the principles of functioning of the method of this invention. Explanations are provided in the detailed description.

To verify a hypothesis, an HyPa, along with other parameters that describe a given set of objects, is introduced into MF (FIG. 1) which must determine what number of HyPa multiplications (M) is enough to inhibit the effect of the rest of parameters and to produce a clustering result that would be the same as in the case when only one HyPa is used instead of all the parameters. The process of determining a multiplication number is illustrated in the block-diagram in FIG. 3.

Natural logarithm of number of HyPa multiplication, M, is the so-called implausibility number, lnM, representing a dissimilarity degree; accordingly, −lnM is the plausibility number and represents a similarity degree. If a hypothesis fully agrees with the totality of the available information (i.e. provided by all other parameters), M equals 1, and the implausibility number equals 0. The lnM values of 5–6 or higher indicate that a given hypothesis fails to reflect the reality of a respective set of data; 2 to 3 corresponds to a "good" mark, and 1 to 0 means a very high degree of correspondence ("very good" to "excellent").

HyPa may be created: (a) for a single object (HyGV-CC-method); (b) for a group of objects (HyGV-GR-method) whose interrelations have been established through any kind of data analysis; and (c) based on a priori existing idea about objects' relationships in a given set of objects (HyGV-ID-method). A single-object HyPa is used when it is necessary to locate analogs of a reference object in a set of unknown objects. A group HyPa (GR) is used when some information on objects under analysis is available, e.g. a preliminary clustering result, and the investigation purpose is to find out whether a classification assumption is valid, or whether among the objects that have not been analyzed there may be others that are close to any of the established groups, etc. The ID-method is applied when an analysis of a set of objects is approached from the standpoint of a sheer hypothesis based on various kinds of information, including experience, impression, and guessing. In practice, different HyPa methods may be combined.

To generate an HyPa of the first type (a single-object HyPa), a so-called "capsule of clones" ("CC") of a reference object is created. A capsule of clones is built of a number of artificially created, according to a certain deliberately chosen principle, objects-analogs of a reference object, for instance, by changing—increasing or decreasing (or, e.g., alternating increase/decrease in even/odd cells)—all or part of a reference object's parameter values by a certain coefficient. Thus created clones of a reference object form a certain shell (capsule) within which the clones are numerically labeled. It can be assumed that the greater is the difference between the clones in a capsule, the wider is a capsule, and the higher is the probability that it contains objects that are too dissimilar to a target object. However, in reality it appears that a capsule's "width" is not as critical as it may seem to be. This is due to a very high selectivity of the quantitative assessment provided by the method of this invention, and because of the fact that formation of a capsule is only a part of the HyPa generation procedure. This issue will be discussed in more details below in the sub-section "HyGV-method in processing of demographic data".

The mechanism of performance of a capsule of clones can be best explained on the following example. Assume that we have an image of a human figure standing upright, facing the observer, legs are positioned straight and parallel, arms are at the sides. In an ideal case, images of an identical and maximally similar poses could be located in the process of screening and sorting operations applied to a database of various human body poses. Now assume that we have created a capsule of clones of the reference image, which includes images that differ from the reference figure by the angle of the position of the right hand, varying from "down" to "up". If we construct an HyPa covering the series of clones with different angles of the right hand position, the number of images extracted from the database will expand due to variations in the position of the right hand. A capsule of clones is a tool for making a reference object less definitive and creating an "impression about the target object". It provides a sort of associative bridge between analogs by making their capsules overlapping and thus imitating the elements of associative reasoning.

The next step in HyPa generation is the clustering and digitalization of clones in a reference object's capsule. Since, as mentioned above, in most cases, we apply a 2-node clustering (FIGS. 2A and 2B), the resulting grouping provides either three or four subclusters, i.e. either only one of the two primary clusters undergoes further division into two subclusters, or each of the two primary clusters is further subdivided into two subclusters. In the first case, it is aa, ab, and b, i.e. CC3(2) (see FIG. 2A), whereas in the second case, the four subclusters are designated as: aa, ab, ba, and bb, i.e. CC4(2), where "2" is a number of nodes in a capsule (see FIG. 2B). In principle, a capsule may contain any number of clones, although in optimum, 5 to 7 clones suffice to make an efficient capsule. As a rule, clones that belong to a same subcluster are marked with one and the same number (an HyPa value).

After a capsule of clones is constructed and digitalized, the so-called initial number of multiplications ($M_0$) should be established for it. In case of a correctly designed HyPa, $M_0$ for a reference object equals 1, i.e. the designed HyPa used as the only parameter produces the same clustering as the totality of all other parameters of the objects covered by the hypothesis-parameter. Although it is desirable that $M_0=1$, this is not a mandatory condition (below we will demonstrate that the number of multiplications represents an additive value wherein actual M-values are added to $M_0$-values). FIGS. 4A and 4B are illustrations of trees resulting from clustering of C3(2) capsule of clones. The tree in FIG. 4A corresponds to clustering based on HyPa only; and the tree shown in FIG. 4B is a result of clustering based on the rest of parameters describing the clones within the capsule, excluding the HyPa. Despite the differences in the branch lengths, the trees are identical as graphs, and the $M_0$ value in this case is 1. FIGS. 4C and 4D show the cluster trees obtained, respectively, using the HyPa only and using all of the rest parameters (excluding the HyPa) but after adding the object "R" (i.e. a reference object in the likeness of which the capsule of clones was created) to the capsule of clones. The "R" object was given the same value as subcluster "ba". As is seen, the addition of the reference object "R"—based on which the capsule of clones was constructed—to the capsule of clones does not, in principle, change the clustering tree graph.

Figure 4:
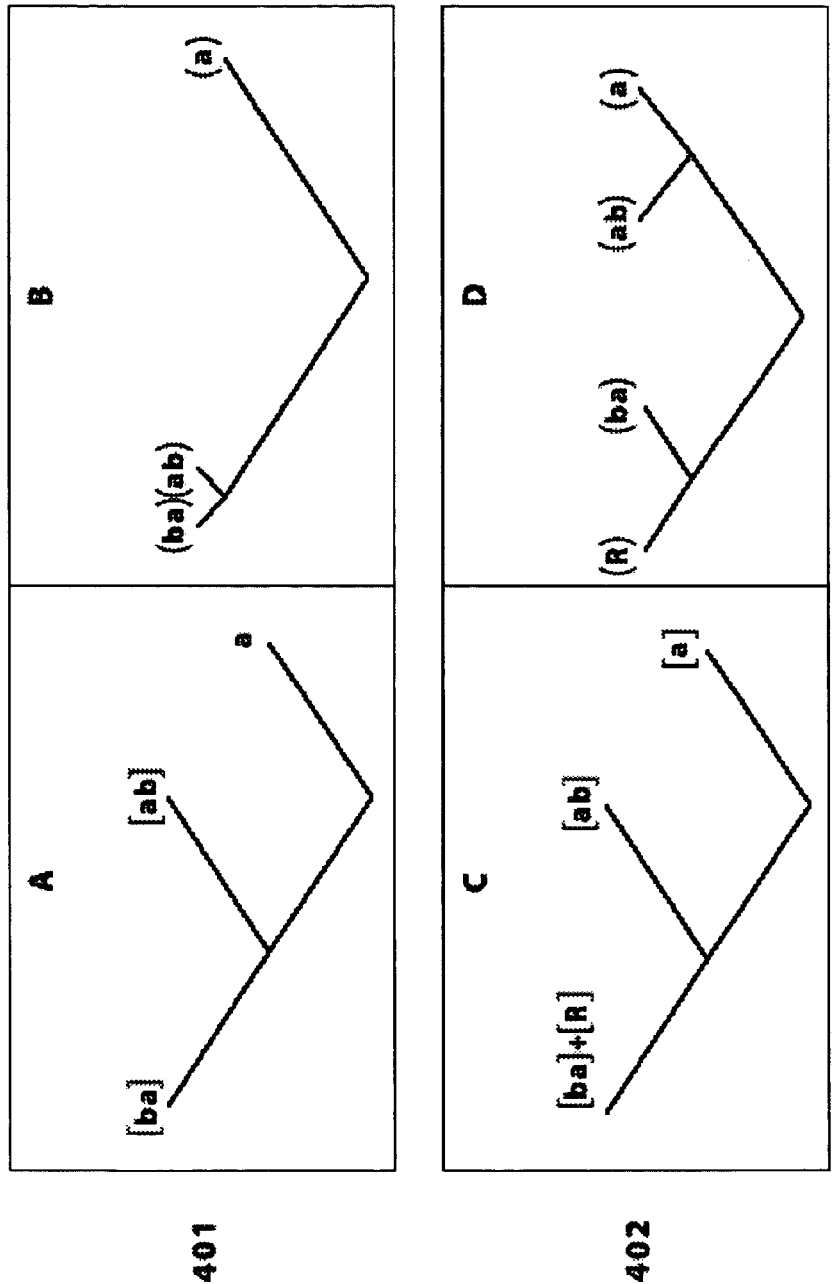
FIG. 4 is an illustration of various kinds of trees resulting from clustering of: a hypothesis-parameter in the form of a capsule of clones of a reference object (block 401); the hypothesis-parameter after the addition of reference object "R" (block 402). Trees A and C were obtained by clustering of the hypothesis-parameter as the only parameter; and trees B and D were produced by clustering involving all parameters and excluding the hypothesis-parameter (cluster notations are shown in square brackets).
Figure 5:
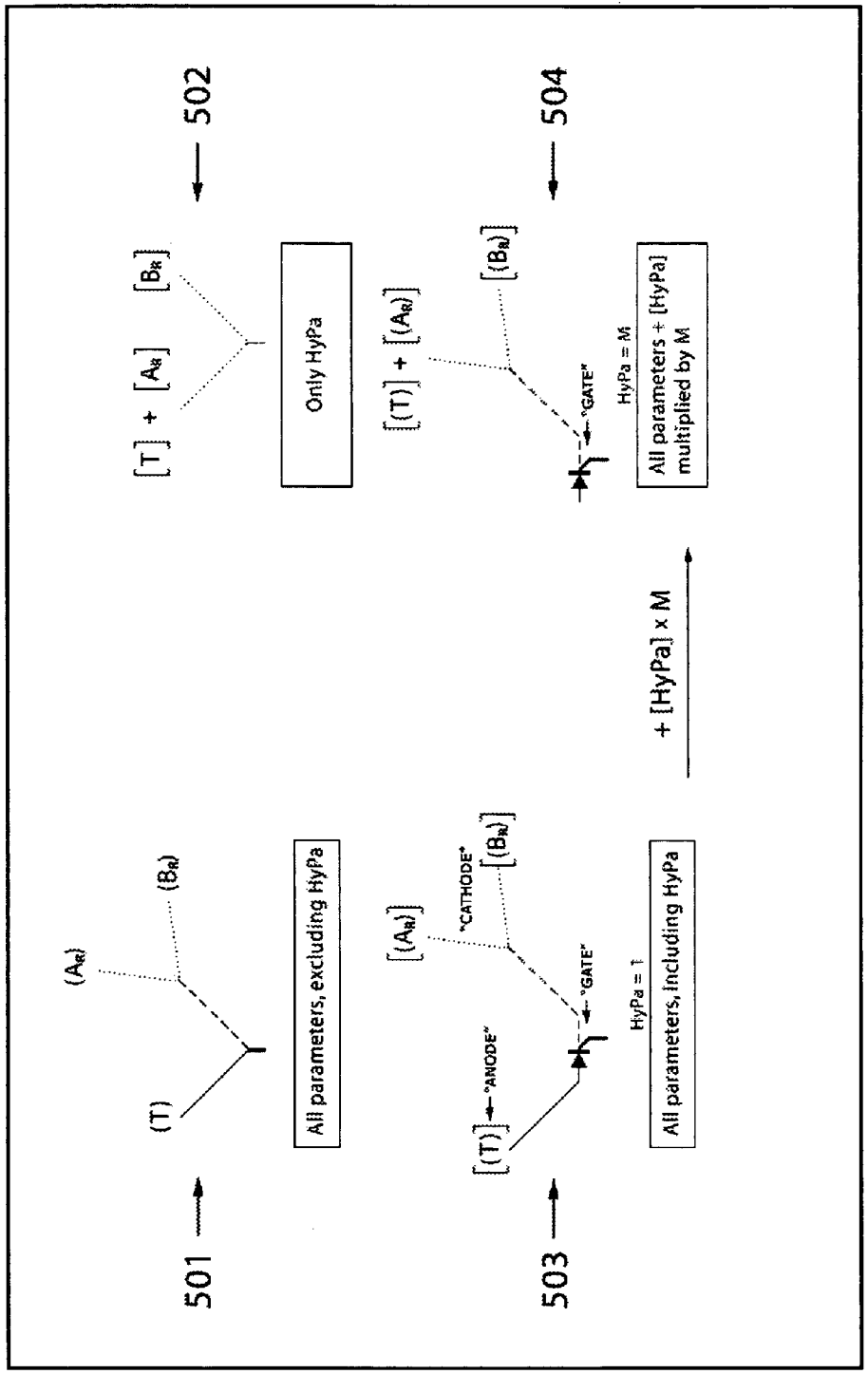
FIG. 5 is a schematic diagram showing the operation of the HyGV-method as information thyristor. The notations in square brackets indicate the subclusters obtained by clustering based on all parameters except for the hypothesis-parameter; while those in parentheses indicate the subclusters based on the use of only the hypothesis-parameter. The subclusters shown in double brackets (square and round) are the result of the use of all parameters and the HyPa. "T" is a target object; "$A_R$" and "$B_R$" are components of the capsule of clones created for the reference object "R"; and "M" is the multiplication number.

FIG. 5 illustrates a case when the HyPa multiplication number appears to be higher than 1—i.e. when the trees—the one based on the HyPa only, and the one based on the use of all parameters—are incongruent. Blocks 501 and 502 show the clustering schemes for analyses: with the use of all parameters, but not the HyPa, and with the use of the HyPa only. Here, "T" is an object under analysis (i.e. a target object), and "$A_R$" and "$B_R$" are, schematically, two fractions of the capsule of clones constructed based on the reference object "R". The value assigned to "T"-object was the same as that of subcluster "$A_R$". As is seen, unlike the case when only the HyPa is used as a basis for clustering (see block 502), the use of all parameters, except for HyPa, results in "T"-object being allocated in a subcluster apart from the "$A_R$" capsule of clones, even though both have the same value within the HyPa. Now, if we add a certain ("M") number of HyPa extra copies to the parameters used in clustering, "T"-object will move to the same cluster as "$A_R$" (see block 504). The "M"-number depends on how different the objects "T" and "R" are. Thus, FIGS. 4 and 5 provide a visual demonstration of the principles that underlie the HyPa-method.

It is obvious that the above-described case demonstrates a paradox: the input of extra copies of absolutely identical information (information quanta) in addition to existing information results in the output of qualitatively new information—on the degree of similarity between "T" and "R" objects. The schemes shown in blocks 503 and 504 in FIG. 5 demonstrate that this invention is, in reality, the implementation of the principle of thyristor in information technology. In this implementation, "GATE", i.e. bifurcation point, separates "ANODE" ("T"-object) from "CATODE"

(capsule of clones). When an adequate volume of additional information stream in the form of extra copies of an HyPa is supplied to "GATE", it turns the "GATE" valve on, letting the "ANODE" information flow to "CATODE", thus moving a "T"-object into a capsule of clones. By changing the HyPa format—i.e. changing the NBI-system's "ego"—we can regulate the volume of the information signal sent to "GATE" so that it is sufficient in order to turn the "GATE" valve on.

3. Infothyristor as a Means for Measurement of Conventional Complexity

Despite the seeming complexity of the implementation of the HyGV-method technology, its principle is, in fact, as simple as the thyristor principle. The discovery of the opportunity for practical implementation of the information thyristor (hereunder referred to as "infothyristor", provides new perspectives of many aspects—including the least explained—the functioning of brain cells. In particular, it provides a method for information processing wherein information is used for processing information. The above-said indicates that the infothyristor provides for measurement of conventional complexity of object "T" in relation to object "R" within the range from 1, corresponding to zero complexity, to infinity. When the measurement unit is expressed (by the operator or computer) in the form of an HyPa, giving it a certain qualitative essence, conditional complexity can be quantitatively and highly accurately measured by the infothyristor.

The role of complexity is paramount in the context of information technology. One of the most widely cited criteria for information assurance, along with Shannon's information entropy, is the Kolmogorov complexity criterion (cf. A. Gammerman and V. Vovk, The Computer Journal, 1999, 42, No. 4, p. 252–255). According to A. N. Kolmogorov, complexity can be measured by the length of the shortest program for a universal Turing machine that can accurately reproduce the observed data. However elegant, this approach to non-probabilistic description of complexity has a major flaw: the Kolmogorov complexity cannot be computed, as "the shortest program" notion is only relative, and there is no way to establish with certainty whether or not a particular program is indeed the possibly shortest one. Another problem with the Kolmogorov complexity as a criterion for complexity is the fact that a universal Turing machine, by definition, can have a variety of implementations, and each of them will have its own "shortest" program. Certainly, one can go around this problem—mathematically—by assuming that complexities as per different Turing machines should differ from each other by certain additive constants. Nonetheless, it is apparent that the practical applicability of the Kolmogorov complexity is seriously hampered by those two factors.

The above-said should help to appreciate the simplicity and rationality of the infothyristor proposed by this invention. The infothyristor, in pari causa, provides a signal, as good as conventional complexity, however, devoid of the above indicated flaws of the Kolomogorov complexity. Firstly, it allows for establishing a precise minimal value of "information current" that is needed to be supplied to the GATE in order to trigger its turning on. For simplicity and visuality considerations, further in the description, we operate with multiplication numbers computed at an accuracy of ±1; however, in reality, the threshold for the GATE switch-on can be reliably established, in terms of the multiplication number, at an accuracy of up to the decimals and hundredths. A value of such threshold for a given set of input data and a given HyPa does not depend on characteristics of a computer. Secondly, one and the same HyPa allows for evaluation of a relationship between an indefinite number of objects by using a response measured in the same dimensionality.

In fact, the above defined evaluation method can ideally serve the purpose of artificial imitation of the brain cognitive activity. Indeed, a combination of an artificial "ego", in the form of an "implanted" HyPa, and information processing scheme of the type of the infothyristor relieves the artificial (or non-biological) intelligence from the necessity of self-identification when performing the object identification job. The HyGV-method allows for discovery of information, pertaining to any set of objects, in a certain homogenous dimensionless space that ultimately facilitates the comparison of even most different objects to each other. Being able to create and utilize such a type of a unified information space is vitally important for any apparatus imitating the biological intelligence. In fact, it looks as if it must be important not only to apparatuses—in other words, it may well be the way the biological brain does information processing. The following examples, illustrating the work of the method of this invention, demonstrate that information processing by the HyGV-method displays a certain peculiarity that strongly resembles the human way of thinking.

4. Example of Application of HyGV-Method in Clustering of Scattered Data Points

Figure 6:
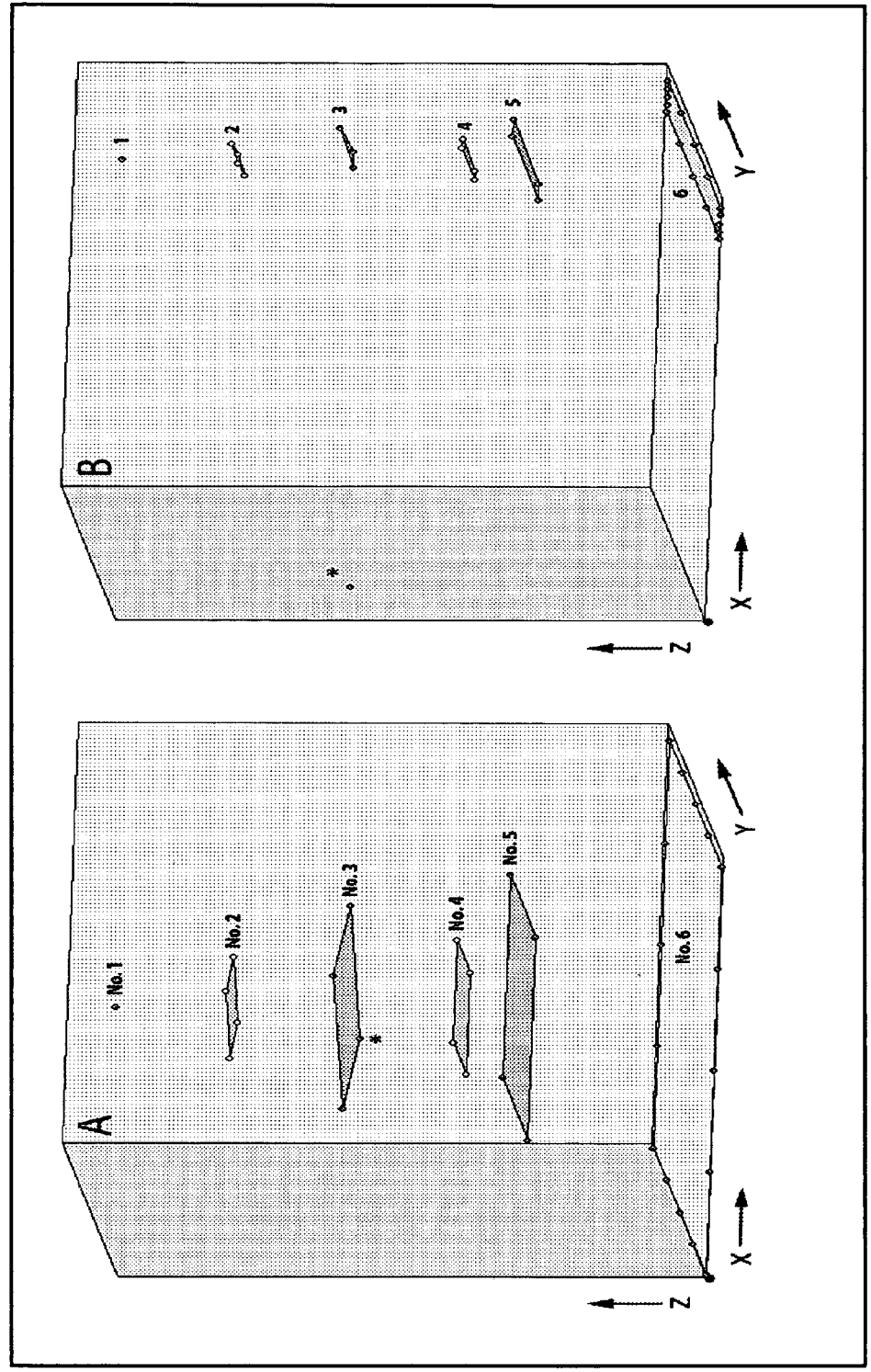
FIG. 6 shows 3D-diagrams of subclusters produced by clustering of 33 scattered points. A is the initial diagram. B is the diagram where the X-ordinate value of the asterisked point has been decreased by 500%. Enumeration of subclusters shown in the diagrams was used in construction of the HyPa (see FIG. 2C).

FIG. 6A illustrates the result of clustering, by the ETSM-method, of 33 scattered points described in X, Y, and Z coordinates. The applied metric is the XR-metric, at B=1.50 (Equation 5). As is seen, the clustering produces 6 groups of points at 6 different levels, marked as No. 1 through 6: group No. 1 consists of one point; groups No.2–5, of 4 points each; and group No. 6 includes 16 points. Based on such grouping, we construct a hypothesis-parameter of the GR-type, so that it includes all 33 points, and label each point within the HyPa in accordance with the number of the group it belongs to, as shown in FIG. 6A. (The result will be the same if the labeling is done in a reverse order.) The clustering based on the HyPa as the only parameter of the 33 points produces the tree which is illustrated in FIG. 2C. When we compare the HyPa with the values of the X, Y and Z parameters of the whole set of points, it appears that the $M_0$ value equals 1.

Figure 7:
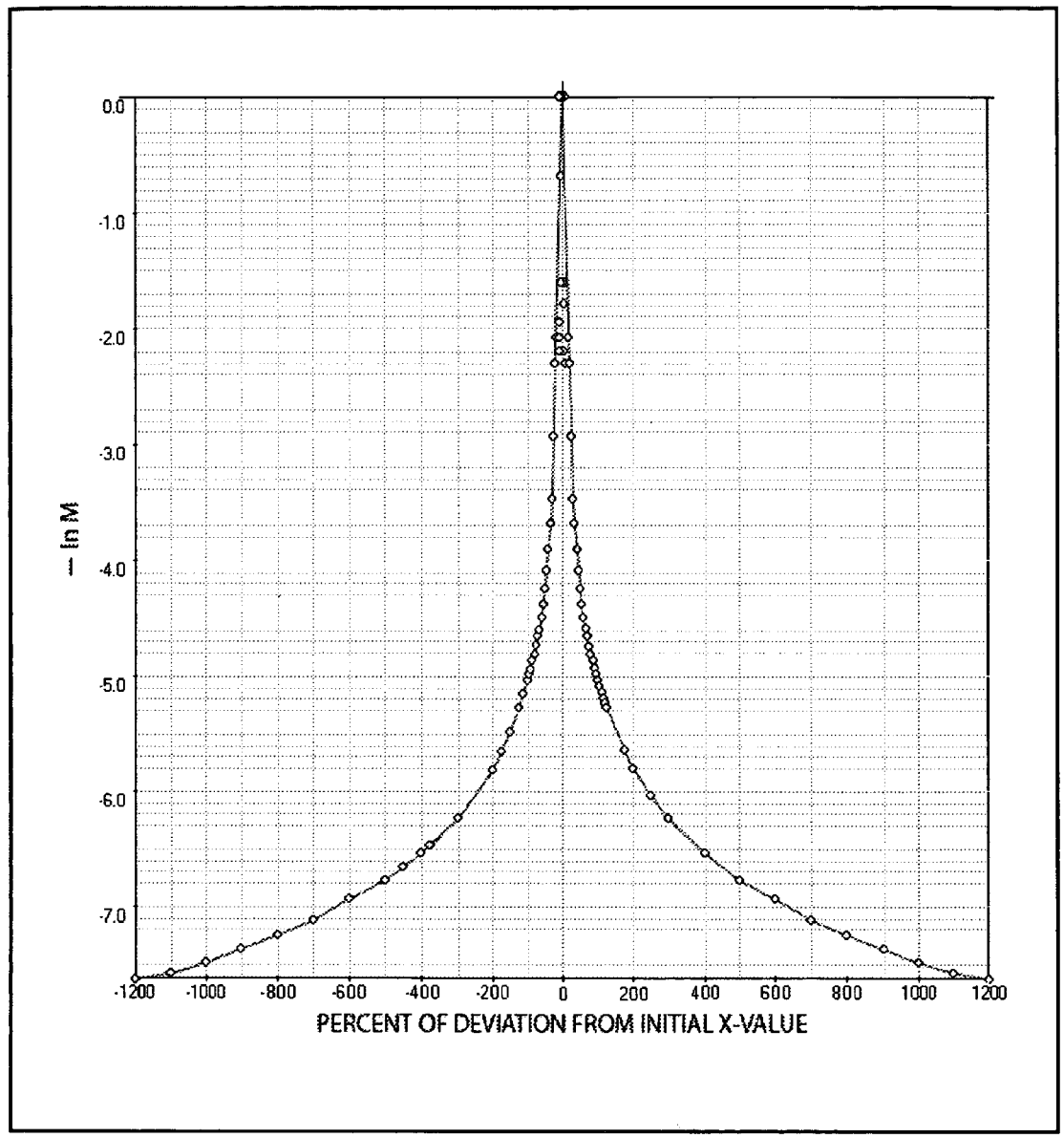
FIG. 7 is a plot showing changes in plausibility number −ln M, where M is multiplication number which depends on percent of deviation from the X-coordinate value for the asterisked point in FIG. 6.

Now we will start changing the value of the X parameter of the point marked with an asterisk in FIG. 6A. In the course of such changes (in both lower and higher value directions), the number of multiplications, M, progressively increases. The plot in FIG. 7 shows how the value of the −ln M criterion (plausibility number) changes depending on the deviation of the asterisked point's X parameter value from its original value for which −ln M was 0. The curve reveals a symmetrical (i.e. corresponding to both increasing and decreasing changes of the X value) monotonous dependence in the range from −1200% to 1200%.

A change of the asterisked point's X value by as little as ±0.5% makes group No. 3 break to two subclusters with 2 points in each. Further variations in the X parameter of the asterisked point cause considerable qualitative changes of the clustering picture, which gets stabilized starting with X±13% further remains in the form shown in FIG. 6B. The asterisked point now forms a subcluster standing apart from other 32 points, while the subcluster to which it previously belonged and which now consists of 3 points, instead of 4, still has the same position level in respect to other subclusters. The clustering result shown in FIG. 6B represents the state of the grouping when the value of the X parameter of the asterisked point was decreased by 500%.

The above-presented example demonstrates very important specifics of the HyGV-method: in this method, clustering is a sort of detector of conflict (whose level is reflected by M values) between a hypothesis-parameter and actual facts contained in a set of variables (parameters) describing the set of objects. The response provided by that detector is continuous, unlike clustering where any changes result in discontinuity. Even though the signal changes in response to the magnitude of deviation from the initial X-coordinate of the asterisked point is close to "sigmoidal" or hyperbolic tangent function, speaking in artificial neural network technology language, we are not inclined to use any biological analogies or to draw a parallel with the synaptic signal. However, it would be hard not to notice that the character of the response variations clearly reveals a highly cooperative nature of the system. Indeed, the above discussed example demonstrates two principally different states: (1) the asterisked point being an organic part of the system of 33 points (FIG. 6A), and (2) the same point representing an autonomous detached cluster, not bound to the system of clusters of the other 32 points (FIG. 6B). This sharp "conformational" switch from a strong-binding state to a weak-binding state, as well as the fact that even after the separation of the asterisked point, the system responds in accordance with a distance between that point and the group of the rest of the points are the evidences of a high cooperativity of the software interface.

5. HyGV-Method in Processing of Climatic Data

This second example of application of the HyGV-method deals with a search for analogs with similar climatic characteristics. The data set includes the following 108 climatic characteristics of 245 cities or locations (such as airports and counties) of 50 states of the U.S.A. (all data are based on multi-year records through 2000): morning and afternoon values of relative humidity, in percent, for each month of the year (the total of 24 parameters), relative cloudiness, in percent, based on multi-year average percentage of clear, partly cloudy and cloudy days per month (the total of 36 parameters), normal daily mean, minimum, and maximum temperatures in degrees of Fahrenheit (the total of 36 parameters), as well as normal monthly precipitation, in inches (the total of 12 parameters). The comparative climatic data are available from National Climatic Data Center: http://lwf.ncdc.noaa.gov. The objective of this example is to demonstrate that the HGV-method can be used for differentiation of climate patterns not only in the north/south direction but also in the west/east direction, hence for establishing the divergence across the climatic gradient, which is of high practical value. For this purpose, we have chosen two cities located on the same latitude: San Diego, Calif., on the west; and Charleston, S.C., on the east. HyPa was constructed by the CC-method: CC4(2) capsules of 8 clones were created for each of the two target cities. HyPa consisted of the following values: aa(1)=1; ab(3)=15; ba(1)=30; and bb(2)=60. The numbers in brackets indicate the clone numbers in the subclusters. The metric used was XR with B=1.50.

Figure 8:
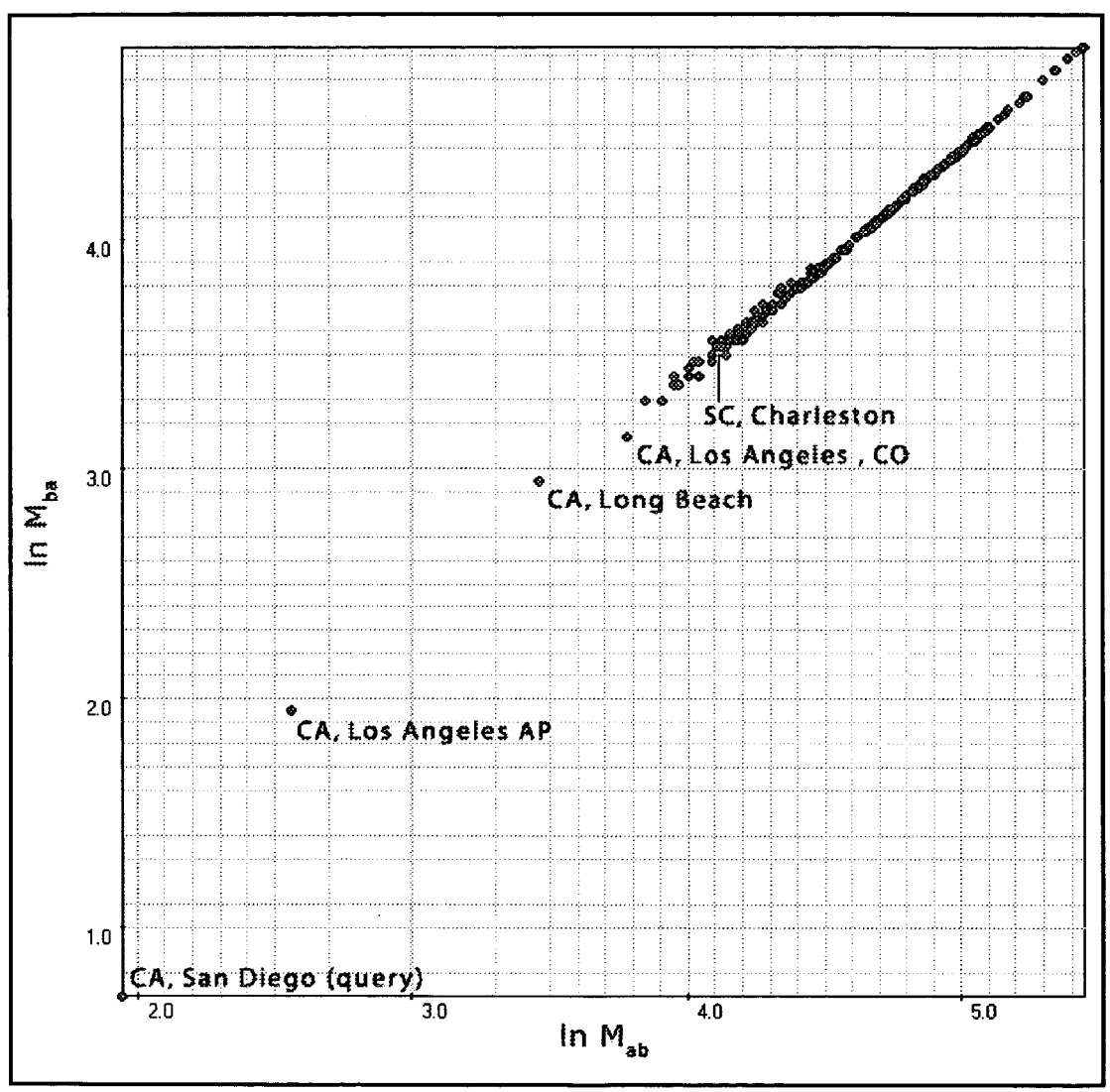
FIG. 8 shows the relationship between ln $M_{ab}$ values computed for 245 cities of 50 states of the U.S.A., by using San Diego, Calif., as a reference object.

FIG. 8 shows the relationship between the ln $M_{ab}$ and ln $M_{ba}$ for San Diego, Calif., demonstrating that the closest climatic analogs of San Diego, Calif., are Los Angeles AP (LAX International Airport), CA, and Long Beach, Calif. All other 242 cities/locations in the database have significantly less similarities with San Diego. It is noteworthy that among those 242 cities/locations, many are located on the oceanside and have a warm climate—including Charleston, S.C., located on the latitude as San Diego and coastal cities in GA, LA, FL, TX, and HI. However, the HyGV-system has selected as San Diego analogs only those that are located on the U.S. southwest Pacific shore. Even Los Angeles County has been identified as a remote analog of San Diego (as it includes cities that are much farther from the oceanside than Los Angeles AP is).

Figure 9:
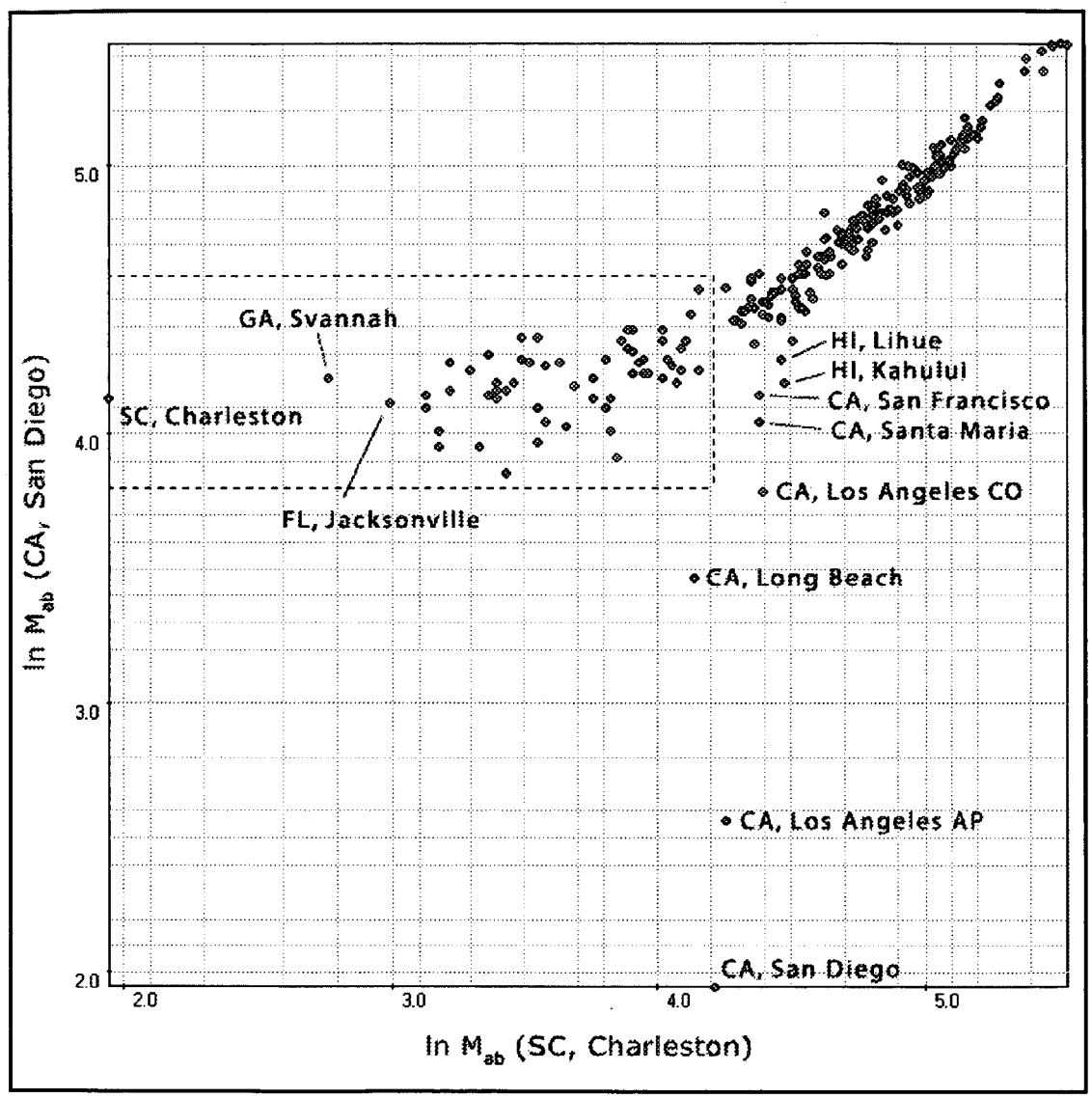
FIG. 9 shows the relationship between ln $M_{ab}$ values computed for 245 cities of 50 states of the U.S.A., by using San Diego, Calif., and Charleston, S.C., as reference objects.

FIG. 9 shows the relationship, for 243 U.S. locations, between the ln $M_{ab}$ values, established using San Diego, Calif., as a reference object, and the ln $M_{ab}$ values established with Charleston, S.C., being a reference object. First of all, it indicates that the closest (climatic) analogs of Charleston, S.C., are Savannah, Ga., and Jacksonville, Fla.,—both located on the East Coast but slightly farther to the south than Charleston. Secondly, it is evident that the data points on the plot are arranged in the form of a Y-shaped bifurcation: the left-side branch of the "fork" includes the points corresponding to the East Coast and Southeast cities; the right-side branch corresponds to the West Coast cities; and the group of points on the line prior to the ramification includes the cities located in Alaska, northern states, and in the arid zone, such as Arizona and Nevada. The first group (inside the dotted-line rectangular, for visualization purposes) includes the cities of the following states (the first numbers in parentheses indicate numbers of cities of a given state that appeared to be in this group, while the second numbers show total numbers of cities of a given state whose climatic data were processed): AL(4/4), AR(2/2), FL(10/11), GA(6/6), LA(4/4), MS(3/3), NC(6/6), OK(2/2), SC(3/3), TN(4/5), TX(13/17), and VA(2/4). If we further take into consideration that the only FL location that the search engine has excluded from this group is Key West, located half-way between Cuba and the southern edge of the Florida peninsula, and that the four TX cities excluded from the same group (Amarillo, El Paso, Lubbock and Midland-Odessa) are located on the border with, or close to, New Mexico and have a close to arid climate, it becomes obvious that the HyGV-method is amazingly effective as a tool for highly selective differentiation between the climatic conditions of the U.S. west and east.

The above-discussed study has demonstrated that the applied HyGV-CC-method allows for finding analogs of any of the 245 cities in the database, and in all of the cases, the analog identification was highly intelligent and accurately reflected the geographic positions, hence climatic peculiarities, of the cities. It is also extremely important that the HyGV-CC method does not need "training". It receives and processes high-volume, distributed and complex data and analyzes them in the same way as a human expert would do.

6. HyGV-method in Processing of Demographic Data

The GR-method of HyPa generation is demonstrated below by the example of processing of demographic data. Earlier (copending application by L. Andreev "High-dimensional data clustering with the use of hybrid similarity matrices"), we showed the ETSM-processing of demographic data on 80 countries, including 41 countries with predominantly Muslim populations; 38 European countries with predominantly Christian populations; and Israel, with the predominantly Judaic population. Each of the countries was described by 51 demographic parameters according to data for the year 2000 (U.S. Census Bureau, International Data Base, IDB Summary Demographic Data, by John Q. Public http://www.census.gov/ipc/www/idbsum.html) including population pyramid sections (total of 34 parameters, reflecting percentages of each age group in the total male and female populations, respectively), birth and death rates, life expectancy at birth, infant deaths, fertility factor, male/female ratios (total of 6 parameters), and dynamics of population growth in various years compared to the year 2000 (total of 11 parameters). All monomer matrices were computed with the use of the R-metric. It was demonstrated that the unsupervised clustering resulted in formation of 4 distinct groups of countries, with no outliers: 1) countries with predominantly Muslim populations; 2) Israel; 3) capitalist European countries with predominantly Christian populations (17 countries); and 4) former socialist European countries with predominantly Christian populations (21 countries). Based on these clustering results, the HyPa was formed on a 4-node basis and including 5 subclusters (C5(4)):

a=5 (Egypt, Kuwait, Morocco, Saudi Arabia);
ba=4 (Israel);
bbaa=3 (Bulgaria, Latvia);
bbab=2 (Croatia, Czech Republic);
bbb=1 (the Netherlands, Norway, Sweden, UK).

This example is not intended to draw any scientific conclusions on demographic peculiarities of the said countries, but to demonstrate more complex than C3(2) and C4(2) schemes (FIG. 2C).

Figure 10:
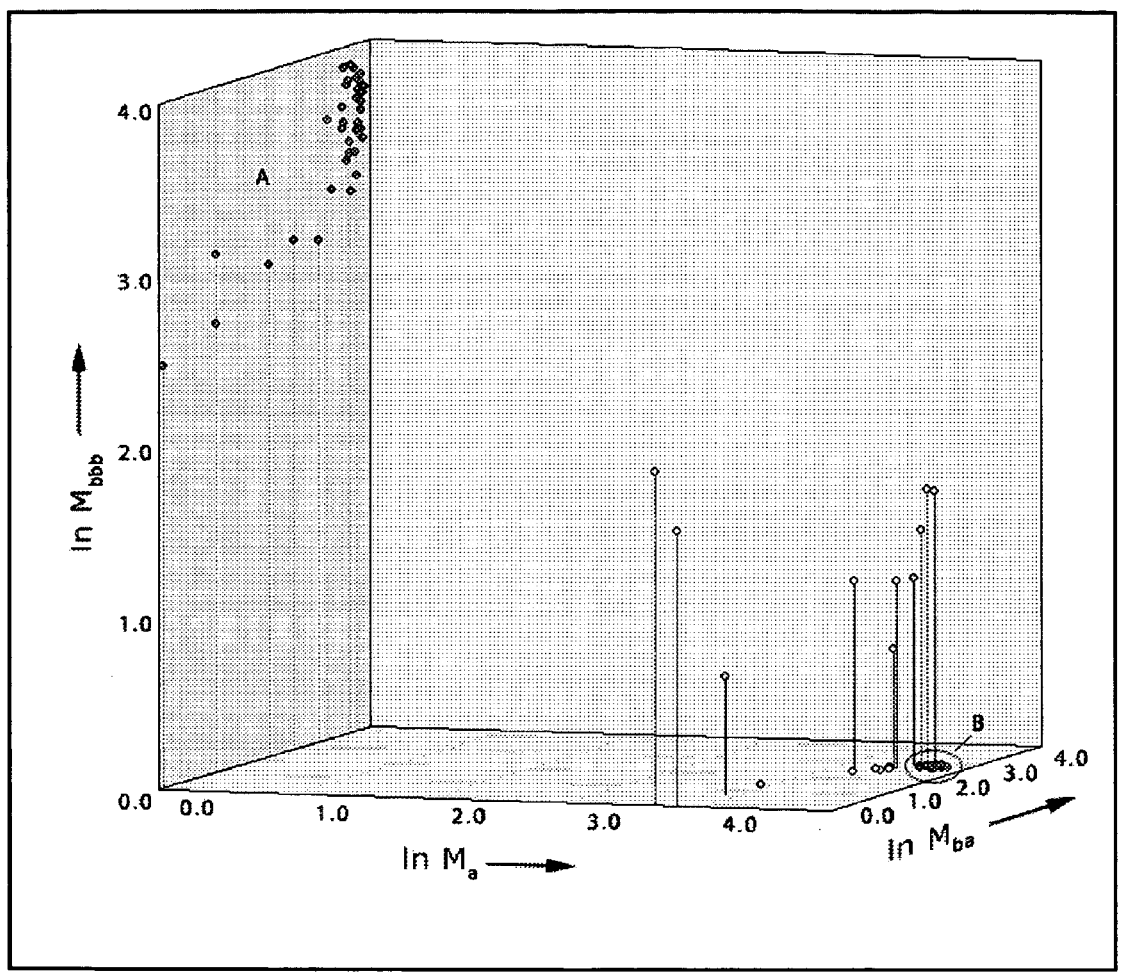
FIG. 10 is a 3D-diagram showing the grouping of 80 countries, using 51 demographic parameters and based on implausibility numbers (ln M). The hypothesis-parameter was constructed based on the results of clustering performed by the ETSM-method. Indices "a", "ba", "bbaa", "bbab", and "bbb" correspond to the following subclusters: "a", Egypt, Kuwait, Morocco, and Saudi Arabia; "ba", Israel; "bbaa", Bulgaria and Latvia; "bbab", Croatia and Czech Republic; and "bbb", The Netherlands, Norway, Sweden, and UK. Subclusters' digitalization in the hypothesis-parameter was as follows: a=5, ba=4, bbaa=3, bbab=2, and bbb=1. Group A consists of 41 countries with predominantly Muslim populations (dark dots); while group B includes 17 capitalist countries with predominantly Christian populations (dark dots), as well as 21 former Soviet bloc countries with predominantly Christian populations (open dots).

The group method HyPa has high plasticity, which is especially important in the extraction of information from large data sets. As is seen in FIG. 10, division of the former socialist countries into two groups provided a compact character of the cluster of capitalist countries (B) located on the X-Y plane of the 3D-diagram. All countries with predominantly Muslim populations distinctly stand among all other countries and are located in the Y-Z plane of the 3D-diagram.

We will now demonstrate the performance of the third of the above described HyPa generation methods (the ID-method). Assume that there is no any kind of preliminary information on how the 80 countries can be grouped based on their demographic characteristics. As is known from history, Judaism emerged as a religion much earlier than Christianity and Islam, and that the latter is a relatively young religion, with the history of certain antagonism to Christianity. Let us then assume that on a certain scale Judaism occupies the median position, with Christianity and Islam on two opposite sides. Let us also assume that former socialist countries with predominantly Christian populations, having been exposed to certain long-term effects of the socialist system, must be somewhat different from the rest of the countries with predominantly Christian populations. To create an HyPa, let us take four countries that are historically associated with the formation and development of the three religions: Israel, Saudi Arabia, Italy, and Russia. Digitalization by the C3(2) scheme provides the following numerical values of HyPa:

a=12 (Saudi Arabia);
ba=5 (Israel);
bb=2–3 (2 for Russia, 3 for Italy).

As was the case with the previous example from demographic data processing (GR-method), this example does not claim to be any sort of scientific conclusions in regional studies—this is purely a demonstration of a technique for generation of the idea-based HyPa.

Figure 11:
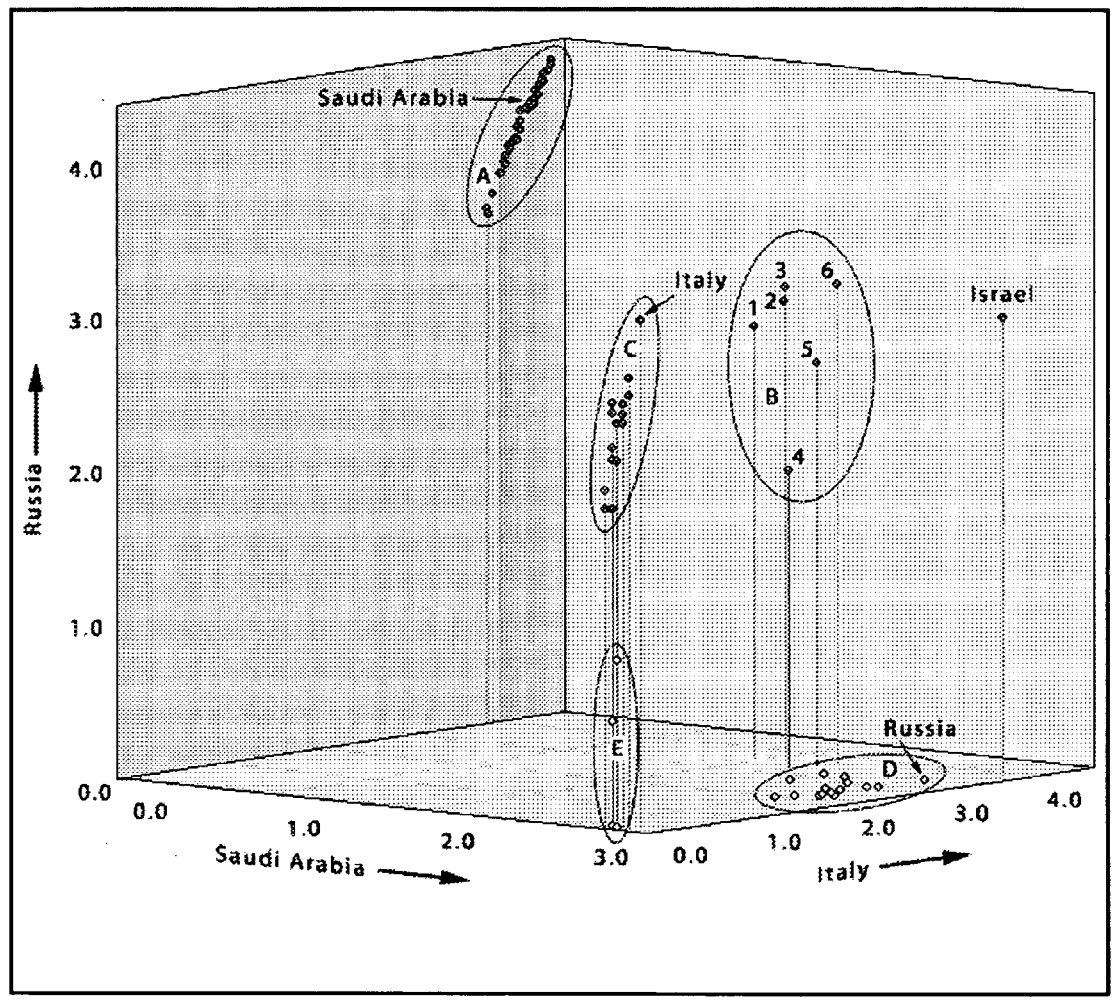
FIG. 11 is a 3D-diagram showing the grouping of 80 countries, using 51 demographic parameters and based on implausibility numbers (ln M). The hypothesis-parameter was constructed based on the concept of predominant religions in the countries under analysis. Group A includes 35 countries with predominantly Muslim populations, excluding those that make group B; group B includes: (1) Azerbaijan, (2) Turkey, (3) Tunisia, (4) Kazakhstan, (5) Albania, and (6) Lebanon. Group C joins together 17 European capitalist countries with predominantly Christian populations. Group D includes 17 former Soviet bloc countries with predominantly Christian populations, excluding those that make group E. Group E consists of Czech Republic, Bulgaria, Slovenia, and Hungary.

FIG. 11 shows a 3D-diagram of distribution of the 80 countries based on demographic characteristics (51 parameters) and by applying an idea-based HyPa. As is seen, the clustering gives straightforward distinction between Christian, Islamic and Judaic countries, and further divides the groups of Islamic and former socialist Christian countries into two subgroups each—A-B and D-E, respectively. Thus, we have obtained six homogenous subclusters by applying the HyGV-method involving an idea-based HyPa.

As far as clusters A, C, D, and the allocation of Israel are concerned, they demonstrate an ideal accord between the underlying data and the generated HyPa. 11 countries (14% of all countries under analysis) fall into subgroups B and E, which obviously points to their certain differences from the respective main clusters. For a professional researcher in demographics, these may well appear as exceptions that confirm the rule. For instance, the 6 countries of subgroup B differ from the rest 35 countries with predominantly Muslim population only according to X ordinate reflecting the similarity with Saudi Arabia. The subgroup includes, for instance, Lebanon, Kazakhstan, and Azerbaijan—with multinational and multi-confessional populations; Albania, which as well as Azerbaijan and Kazakhstan, is a former socialist country; and Turkey, with its distinctly secular state system. Subgroup E includes 5 former socialist countries that stand apart from the rest of the former Soviet bloc countries by relatively high GDP per capita.

Thus, the results shown in FIG. 11 demonstrate that the method of this invention allows for screening of right and false ideas, and when an idea indeed reflects the relationships between objects in a given dataset, the method provides an insightful clustering based on that idea. Here, the idea serves as a basis, if not for concrete values of HyPa, but at least for a general view of quantitative differences between the objects within HyPa. Further, an idea-based HyPa may be used for a wide variety of objects that are not directly associated with the underlying idea.

Figure 12:
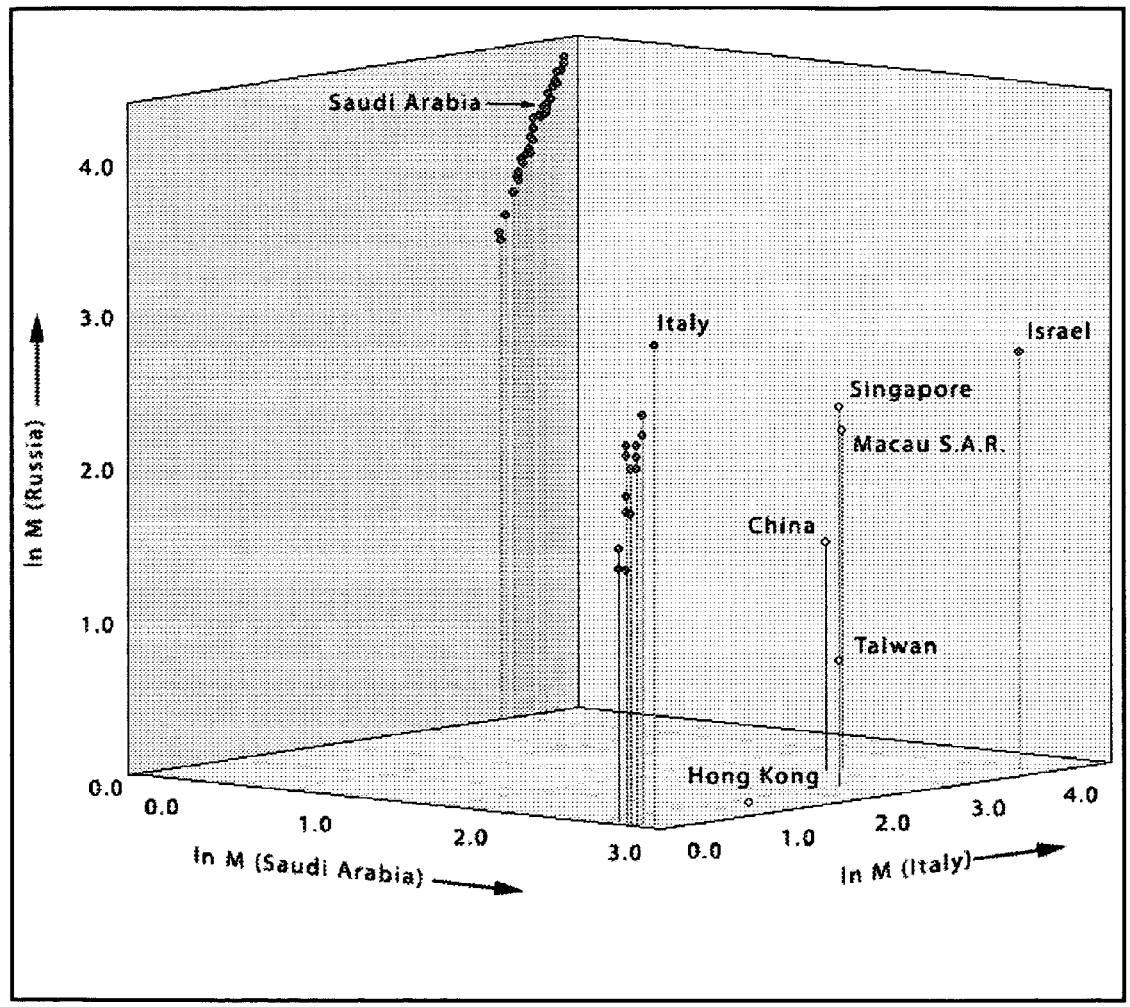
FIG. 12 is a 3D-diagram showing the grouping of 74 countries based on 51 demographic parameters. Analysis conditions are the same as in the example illustrated by FIG. 11, except that the list of countries under analysis excluded groups B and E and included 5 other countries with predominantly Chinese populations.

The fact that ethical and social relationships, hence demographic variables, in populations of different countries are greatly influenced by a dominating religion is by and large a common knowledge. What this example technically demonstrates is that the HyGV-method, having analyzed the proposed idea, produced an exceptionally clear-cut clustering result that would not be possible to obtain by any other heretofore available methods. The non-randomness of the obtained distribution is further supported, for example, by a compact grouping of the countries with mostly Chinese population, which is shown in FIG. 12 (where groups B, D, and E, shown in FIG. 11 above, are removed for simplification purpose). Even more distinct picture of the grouping of 5 states with predominantly Chinese populations is illustrated by FIG. 13. Here, the clustering by the ETMS-method using the R-metric was performed with the use of four different multiplication numbers as parameters; multiplication numbers were computed based on HyPa values of 2, 3, 5, and 12, using the above-described HyGV-ID-method (FIGS. 11, 12). This is the case when an idea (based on which the hypothesis-parameters were generated) was applied with the purpose of reducing 51 parameters to 4 parameters. This example demonstrates the possibility of concept fusion. Any large number of heterogenic parameters corresponding to a diverse set of objects' properties can be subdivided into more homogenous groups of parameters, each group joining together related categories of properties. Then, an HyPa is to be modeled for each of such groups, and multiplication numbers obtained based on each of hypothesis will represent a final set of parameters to be used in clustering of the objects under analysis. All three types of HyPa can be used in one analysis.

Thus, the foregoing demonstrates, on real-life data, all of the three techniques for HyPa generation and application: CC, GP, and ID. The first one can be used as a routine method for extraction of information from large datasets—or, what computer science referred to as "intelligent data understanding", "data mining", "knowledge discovery", etc. One of the strongest sides of the HyGV-CC method is its "natural intelligence": it requires neither training, nor supervision, nor a specially trained operator. This aspect of the method was displayed in the above-shown examples and will be further demonstrated in the following parts of this disclosure.

Among the three proposed methods for HyPA generation, the method based on construction and use of capsules of clones (HyGV-CC method) is the most efficient in automated unsupervised data processing. It provides the basis for the new, non-probabilistic statistics which, in fact, represents the essence of this invention. This new statistics provides conclusive decisions on similarities and dissimilarities even when there are only two objects under comparison; and not only may a number of parameters describing the objects under analysis be unlimited, but the fact is that however many parameters there may be involved, their number does not affect the computation cost. The clustering detector (information thyristor) that provides the main instrument in this new statistics is algorithmically simple, and the whole technology is implemented on a regular PC.

It may look as if the capsule of clones plays the same role a null hypothesis allowing for evaluation of an alternative hypothesis represented by target objects. However, in principle, this is not so. As is shown in the section "Background of this invention", the clustering detector provided by this invention represents in its essence a result of the process of data averaging, occurring in two opposite directions: putting together (objects in clusters) and division (of objects into clusters). Thus, data processing by ETSM-method, providing also for smoothing and averaging of random deviations, is by itself a statistical processing in the generally accepted meaning of statistics. The following example, illustrated by FIG. 14, demonstrates that differences in composition of a capsule of clones do not significantly affect a final result of data processing. This case study deals with data on 17 states with predominantly Muslim populations, described by 34 parameters based on population pyramids. Capsules of clones were constructed so that each next clone differed from a preceding one by a same value as the first clone differed from the reference object. The capsules of clones were made for Saudi Arabia; each capsule consisted of 10 clones, and each next clone differed from each preceding one by 0.4% and 1.6%, respectively (indicated by the open and dark dots, respectively, in FIG. 14)—hence, the last clones in each capsule differed from the respective reference objects by 4% and 16%, respectively. For clustering purposes, five clones with order numbers 1, 2, 5, 9, and 10 were selected in each capsule, and the clustering with the use of R-metric produced trees of the C3(2) format (cf. FIG. 2A) HyPa was digitalized as follows: a (clones 9, 10)=10, ba (clone 5)=2, and bb (clones (1, 2)=1. Multiplication number for 17 states was computed in two ways: HyPa value for each of the objects under analysis being: 2, in which case, multiplication number is denoted as M(2); and 3, respectively, with multiplication number of M(3).

Figure 14:
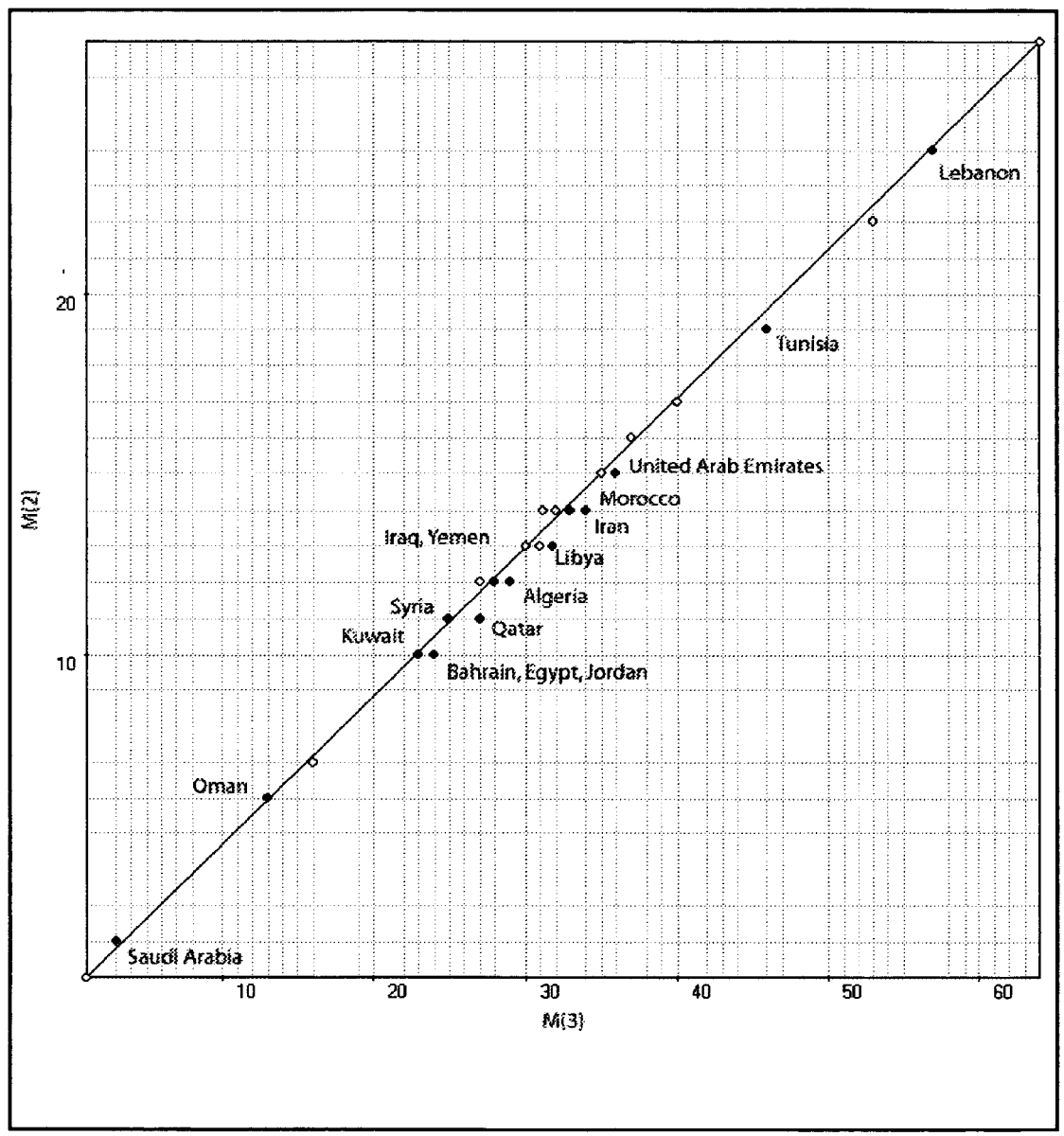
FIG. 14 shows the relationship between multiplication numbers M(2) and M(3) computed for 17 countries described by 34 parameters based on respective population pyramids. Hypothesis generation was performed by the HyGV-CC method. Two different capsules of clones were created, the reference object being Saudi Arabia; each capsule consisted of 10 clones, and each clone was different from the preceding one by 0.4% and 1.6%, respectively (shown as open and dark dots, respectively, in the plot). HyPa was digitalized as follows: a (clones 9, 10)=10, ba (clone 5)=2, and bb (clones 1, 2)=1. HyPa values for each of the objects under analysis were: 2, in which case, the multiplication number was denoted as M(2), and 3, respectively, with the multiplication number of M(3).

FIG. 14 shows the relationships between M(2) and M(3) for all 17 states. As is seen, neither the four-fold broadening of the capsule "width" (i.e. the difference between parameter values of the reference objects and their tenth clones), nor the values assigned to the object in the HyPA affect the appearance of the linear relationship. The construction of a capsule of clones being so simple, it is obvious that this process can be standardized and automated, even more so that in many cases, even for large databases comprehensive analysis, it suffices to create a capsule clone for one or a few reference objects. Even if different analysts use different capsules of clones based on randomly chosen parameter values for one and the same set of objects, their results will show a good correlation.

Figures 15A, 15B:
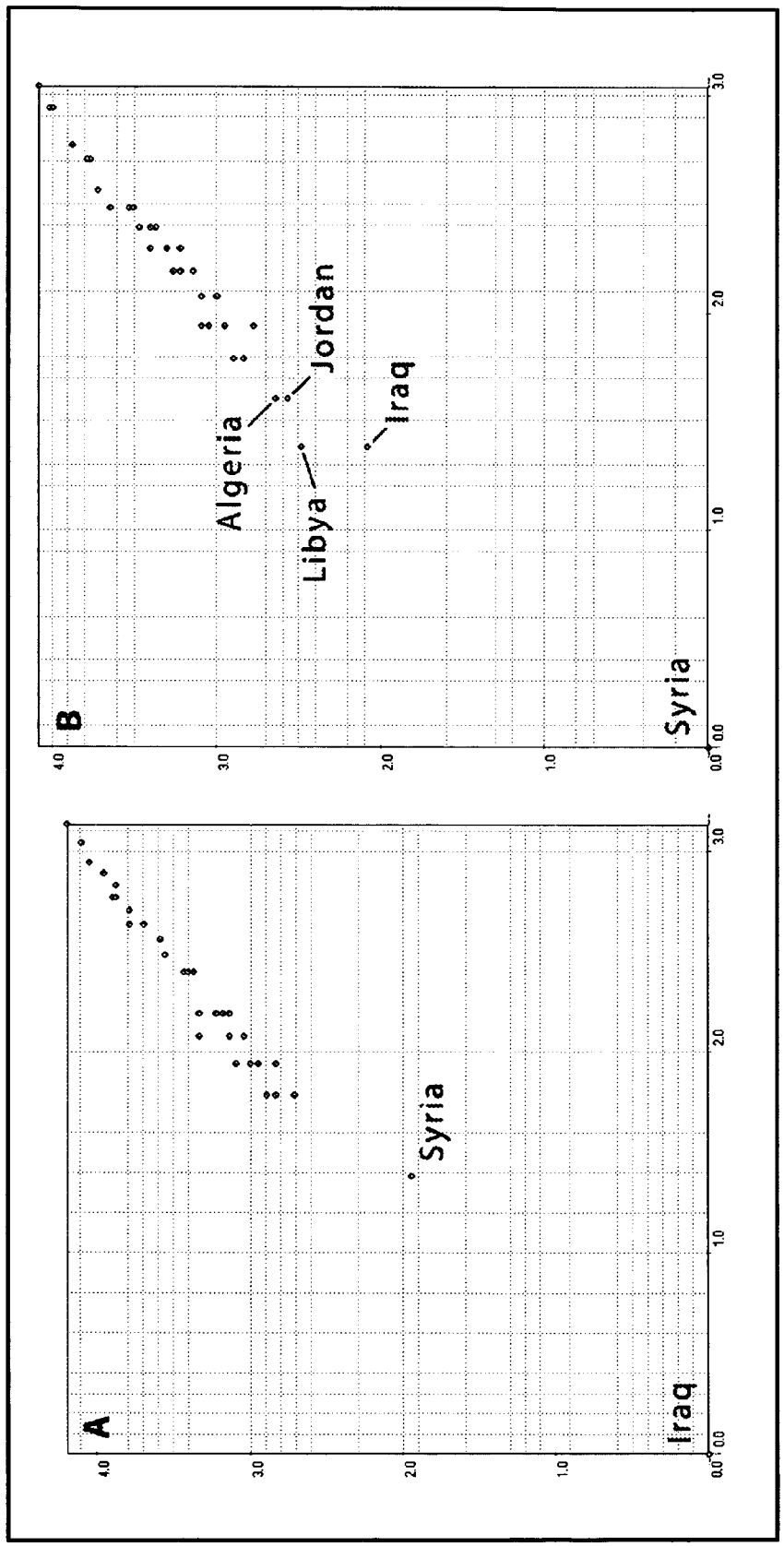
FIGS. 15A–15F illustrate searches for closest analogs of 6 countries being query (reference) objects (shown at the coordinates' points of origin; implausibility numbers=0). The implausibility numbers were computed by the HyGV-CC method, for 41 countries with predominantly Muslim populations described by 34 parameters of population pyramids.
Figures 15C, 15D:
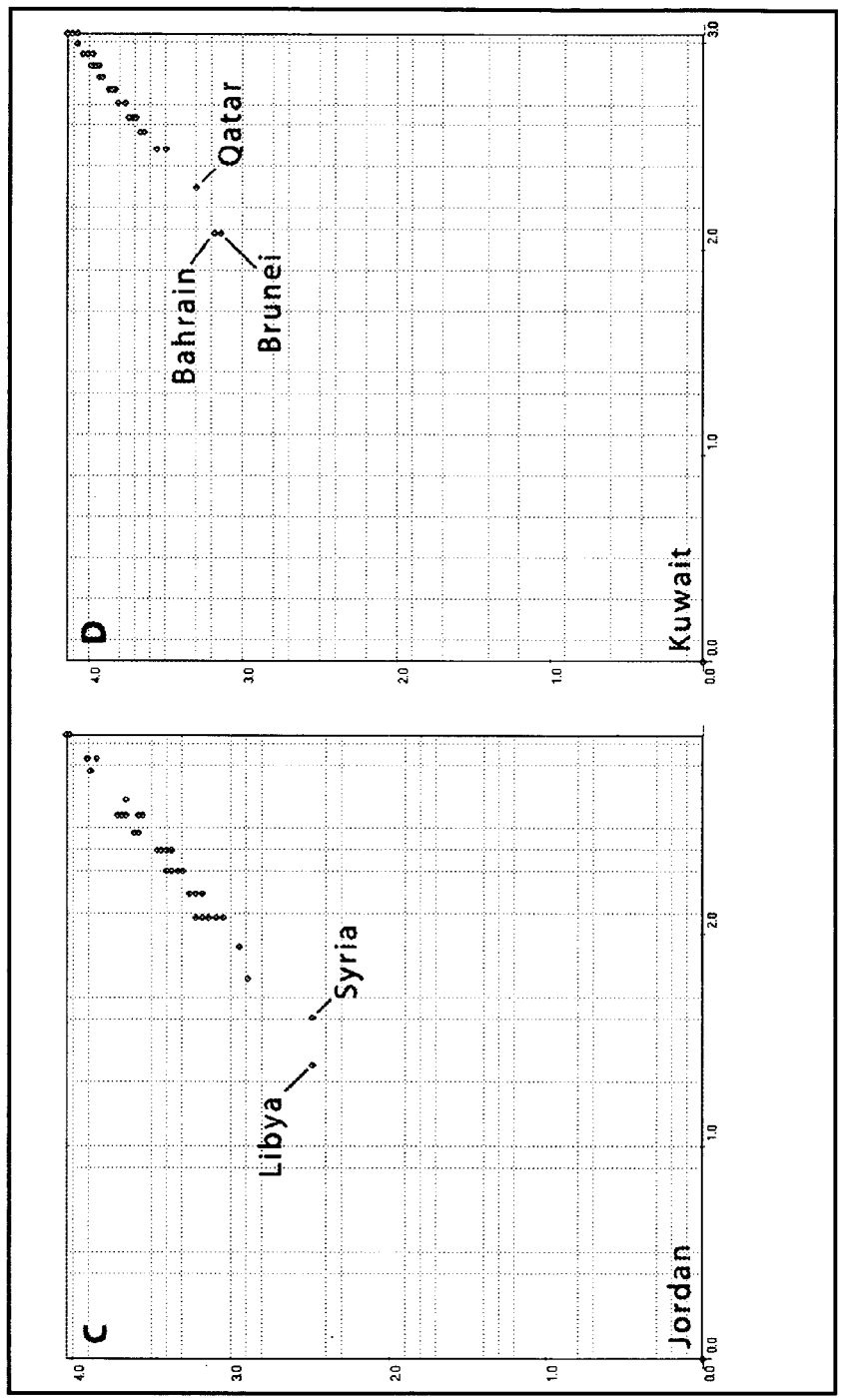
Figures 15E, 15F:
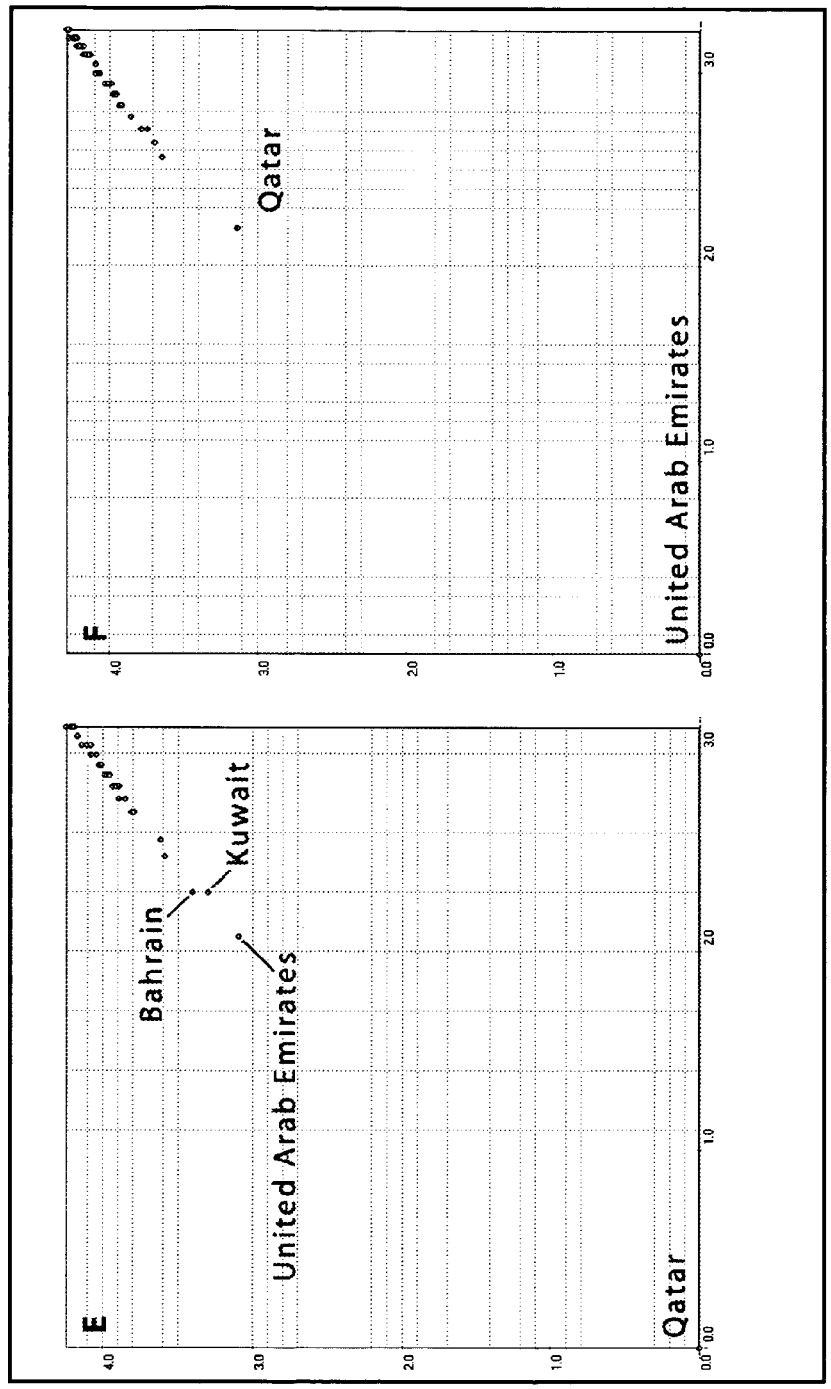

The most valuable feature of the HyGV-method is non-linear, non-planar logic that underlies analysis and decisions. A space of similarities between complex objects (i.e. objects described by numerous features/parameters) represents a vector space. For instance, A is very similar to B, B is very similar to C, C is very similar to D, but D has nothing in common with A. That is the way things are in the real world. FIGS. 15S–15F illustrates several simple examples demonstrating that the HyGV-CC method displays by far more complex logic than the logic based on simple arithmetic (details of construction of the capsule of clones are provided in Brief Description to the Drawings). For instance, in response to a query on analogs of Iraq, the HyGV-system selects the neighboring Syria, out of all other 40 countries with predominantly Muslim populations (FIG. 15A). A query on closest analogs of Syria provides, along with Iraq, the neighboring Jordan, as well as Libya and Algeria (FIG. 15B). A query on Jordan's analogs gives the neighboring Syria and Libya, but not Iraq. A similar situation is observed in the next example: a query on Kuwait's analogs gives 20' Bahrain, Brunei, and Qatar (FIG. 15D); a query on Qatar's analogs gives United Arab Emirates, Bahrain, and Kuwait (FIG. 15E); but as for United Arab Emirates (FIG. 15F), its analogs include neither Brunei, nor Kuwait or Bahrain.

Figure 16:
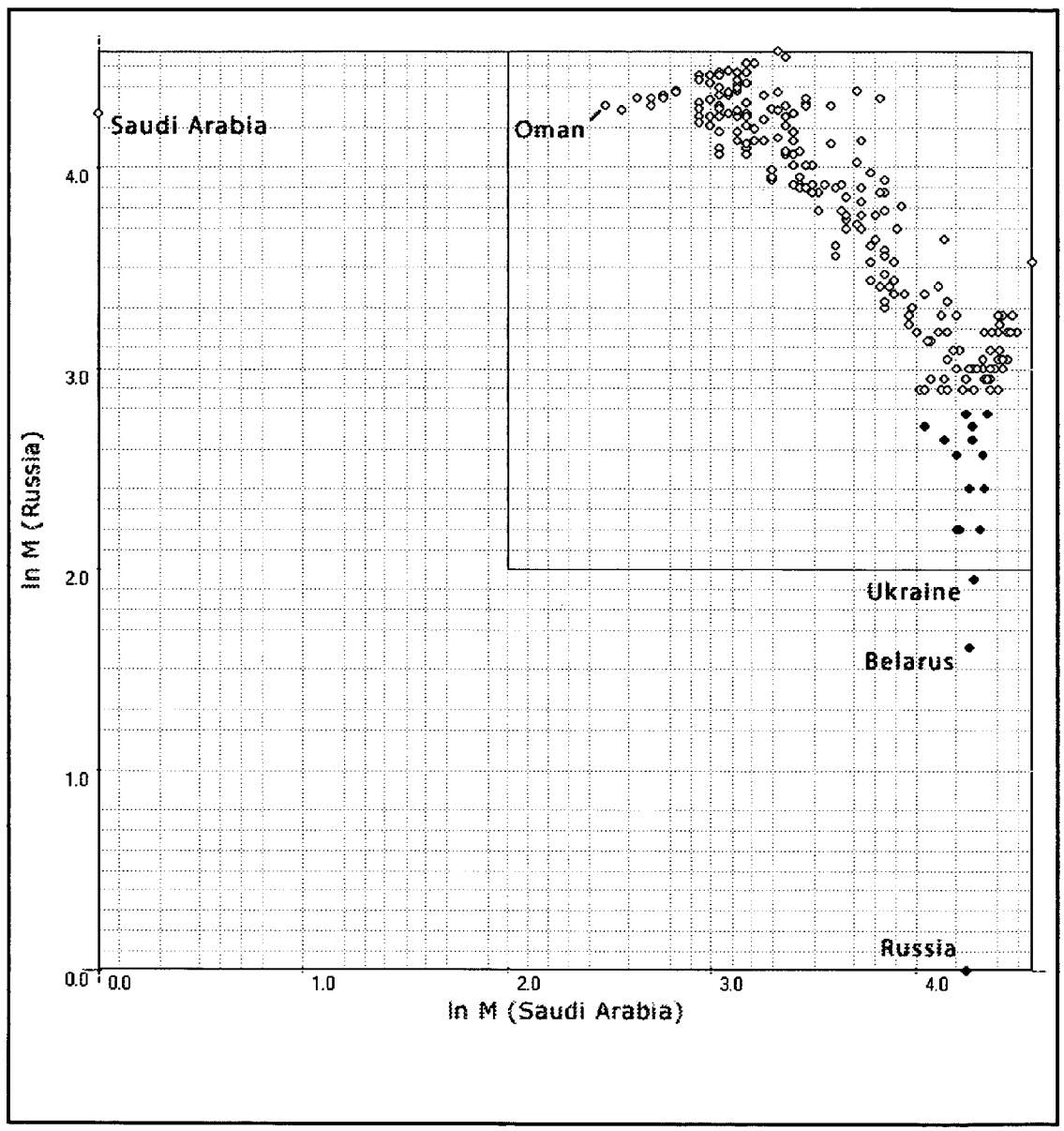
FIG. 16 is a plot-map of 220 countries, based on 34 parameters of population pyramids using Russia and Saudi Arabia as reference objects. Implausibility numbers were computed by the HyGV-CC method. Dark dots correspond to Russia and 13 countries of the former Soviet bloc showing the closest proximity to it.

Summing up the demonstration of the performance of HyGV-method in demographics analysis, we would like to point to the intelligent and non-mechanical approach to the data under analysis, as shown in the example illustrated by FIGS. 15A–15F. The same exceptionally high selectivity in information extraction was demonstrated in all cases of data processing by the HyGV-method. FIG. 16, further demonstrating the above-stated, shows a 2D-plot of ln M values, obtained in case of query on Russia's analogs, as a function of ln M values in a query on Saudi Arabia. The database for analysis included 220 countries, each described by 34 parameters based on respective population pyramids. As is seen, for Saudi Arabia the closest, although not ideally close analog, selected out of the 220 countries, is the neighboring Oman. In case of query on Russia, the search for analogs gave Belarus and Ukraine, both of which are former republics of the USSR and therefore, as well as for many other reasons, including historical, ethnical, religious, and other factors, have much in common in terms of demographics. On the plot shown in FIG. 16, all 13 countries located close to Russia (the dark dots) are either former USSR republics or countries of the former Soviet bloc.

7. HyGV-Method in Image Recognition

The practical application potential of HyGV-CC method, representing a search engine that allows, along with query processing, finding analogs of a query object, is relevant for a lot of different areas—due to simplicity of both technical implementation of the method and its task-specific modifications. In this and the following sub-section, we will present the examples demonstrating the use of HyGV-CC method in image recognition: one of them dealing with identification of human poses; and another one, with gait recognition. Both of these applications are extremely important issues of computer vision, and, particularly, robotic vision.

Figure 17:
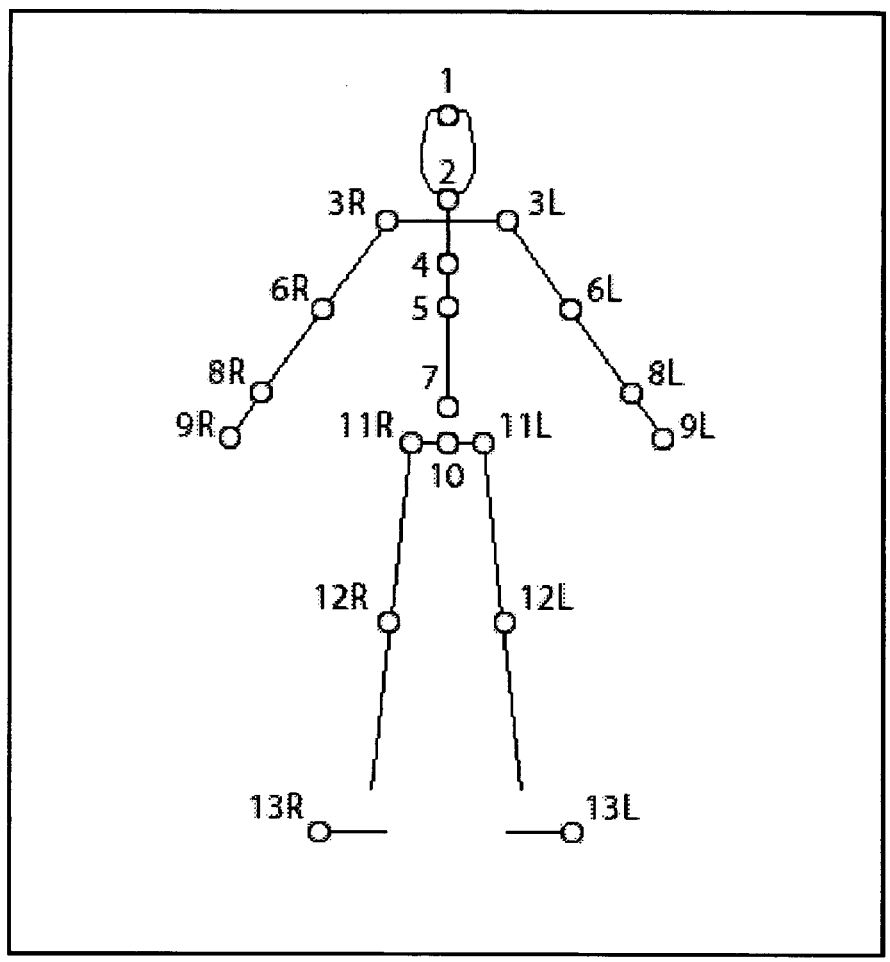
FIG. 17 is a schematic image of a human body, referred to, further in this specification, in the examples of the application of the HyGV-method in image and gait recognition. The parameters, describing the image, were computed as vertical distances from the skull top point (1) to: mandible (2), right and left clavicle (3R and 3L), sternum center (4), sternum bottom (5), right and left elbow (6R and 6L), lumbar vertebra (7), right and left wrist (8R and 8L), right and left hand finger tips (9R and 9L), sacrum (10), right and left hip (11R and 11L), right and left knee (12R and 12L), right and left toe (13R and 13L).

In image recognition tasks, the achievement of an analysis objective is closely connected with an object parametrization problem. The latter may be approached from various positions, including generalized technologies for object contour parametrization, and the overview of those methods is not relevant in the context of this disclosure. In the presented example (FIG. 17), we have used one of simplest approaches: establishing the vertical distances between 18 deliberately selected body points and a head top, assumed as a zero point. Capsules of clones were constructed as C3(2) and digitalized as follows: a(1)=1, aa(2)=5, ab(2)=10. The XR-metric (B=1.50) was applied.

Figure 18:
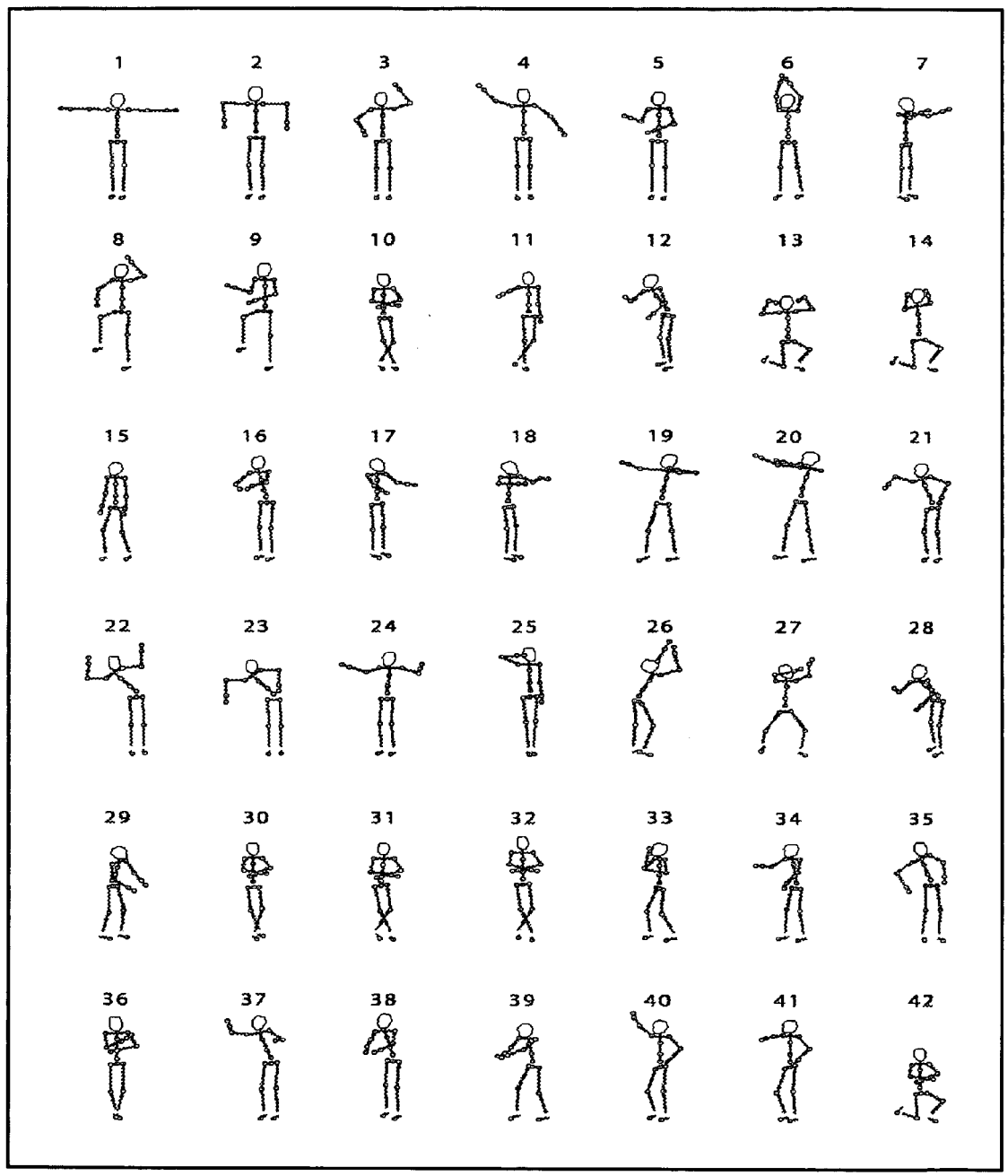
FIG. 18 shows 42 out of 75 artificially generated images of human body poses used in the example of the application of the HyGV-method in image recognition. The rest of the images are shown in FIGS. 19–24 and 43.
Figure 19:
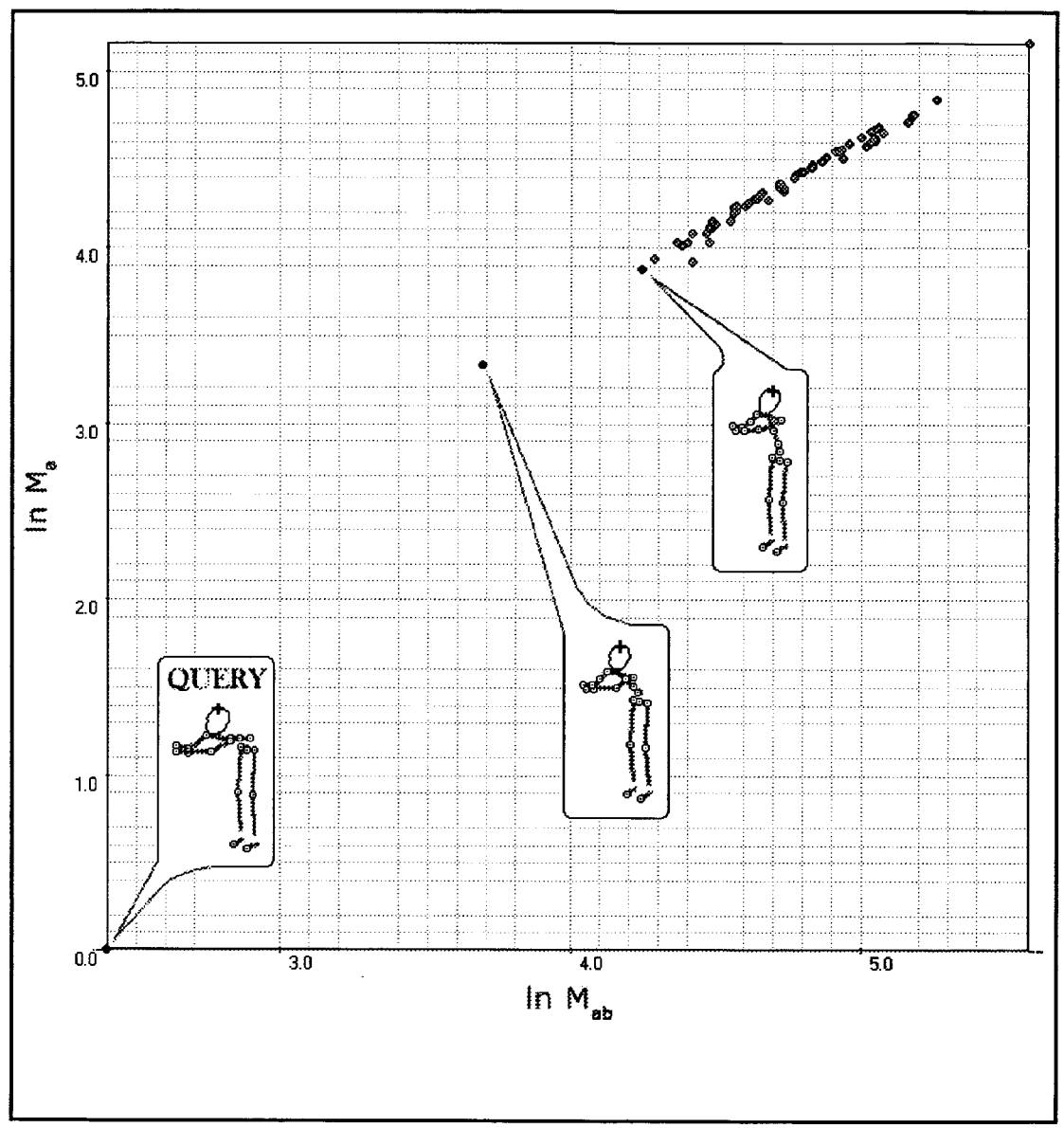
FIG. 19 shows the result of search for closest analogs of images of human body poses in a database of 75 images, by the HyGV-CC method. Capsules of clones were constructed as C3(2) (see FIG. 2A) and digitalized as follows: a (1)=1, aa (2)=5, ab (2)=10 (numbers of clones in capsules are indicated in brackets). The XR-metric (B=1.50) (see equation 5 in the specification) was applied. The reference object (query) was an image of a human figure with its upper body bent forward almost at the right angle, hands stretched forward, and both legs straight.
Figure 20:
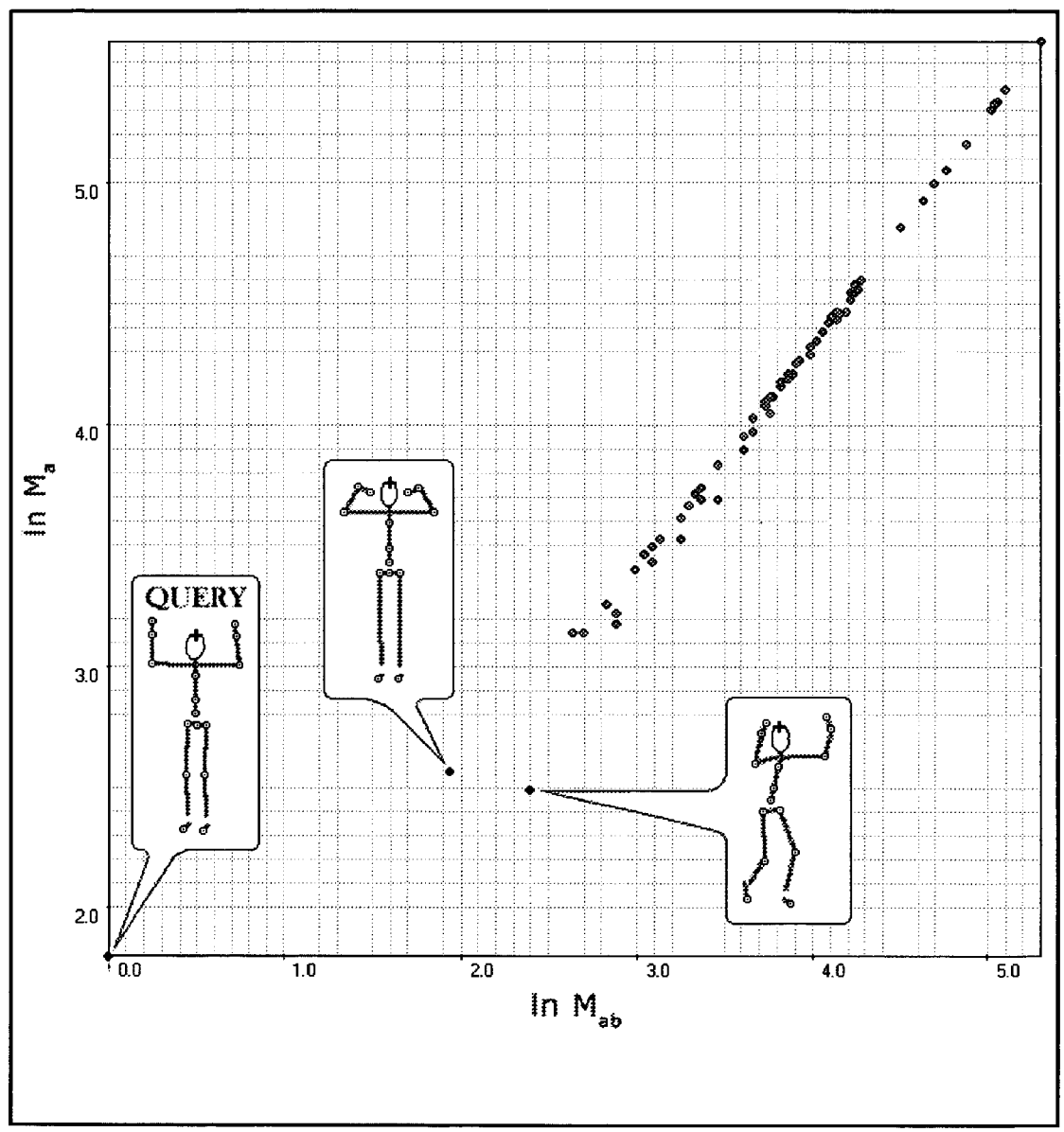
FIG. 20 shows the result of search (among 75 images) for closest analogs of a human body pose with hands up and legs straight. All other conditions are the same as in the search illustrated by FIG. 19.

The image database analyzed in this example contained 75 artificially generated images of human body poses. The images that are not shown in FIGS. 19—24, are illustrated above in FIG. 18. The 75 images cover a wide range of human poses, including: lying face down, lying supine, sitting, squatting, bent, poses with various positions of limbs, etc.

Figure 21:
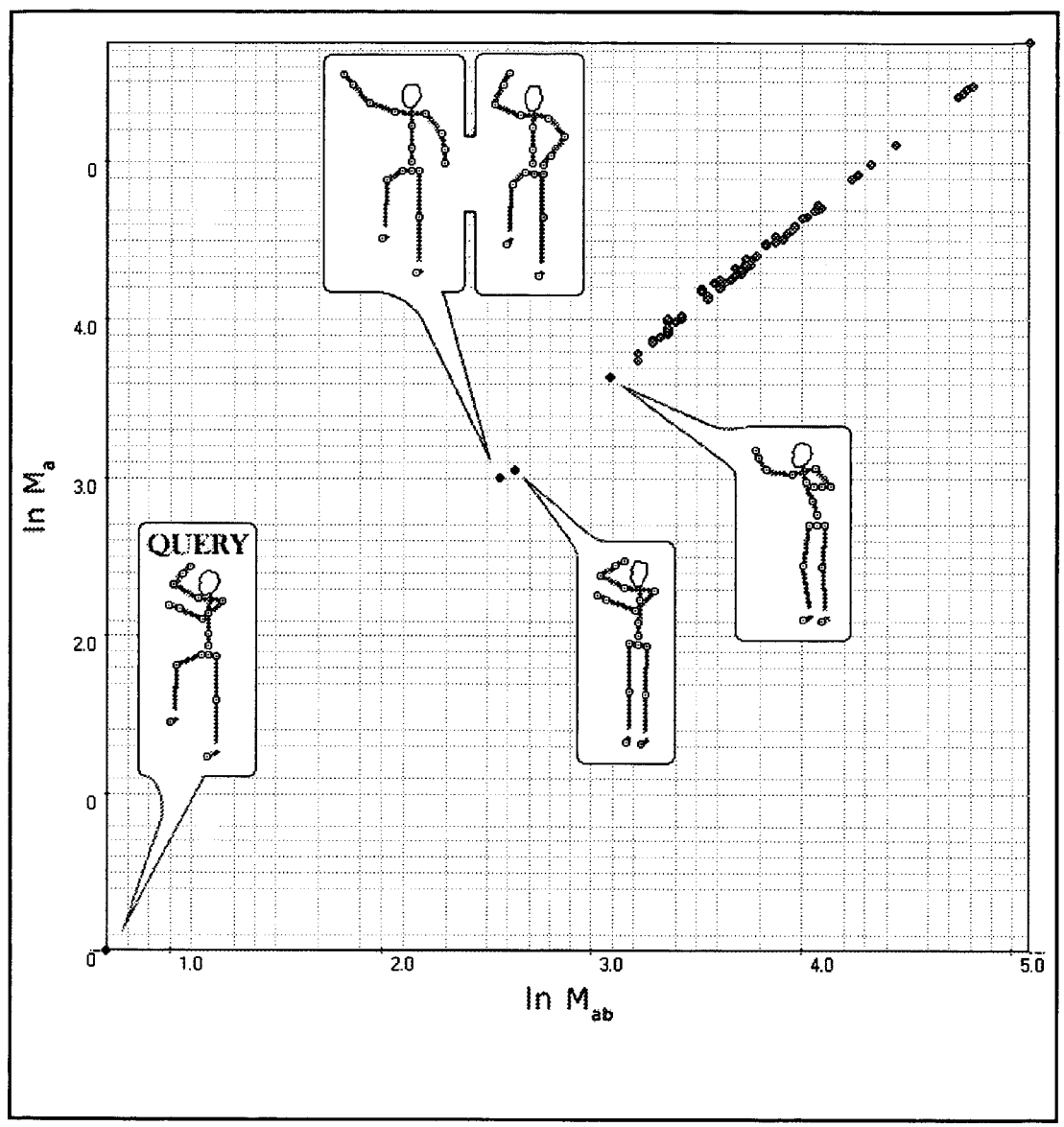
FIG. 21 shows the result of search (among 75 images) for closest analogs of a human body pose with the right leg and right hand raised. All other conditions are the same as in the search illustrated by FIG. 19.
Figure 22:
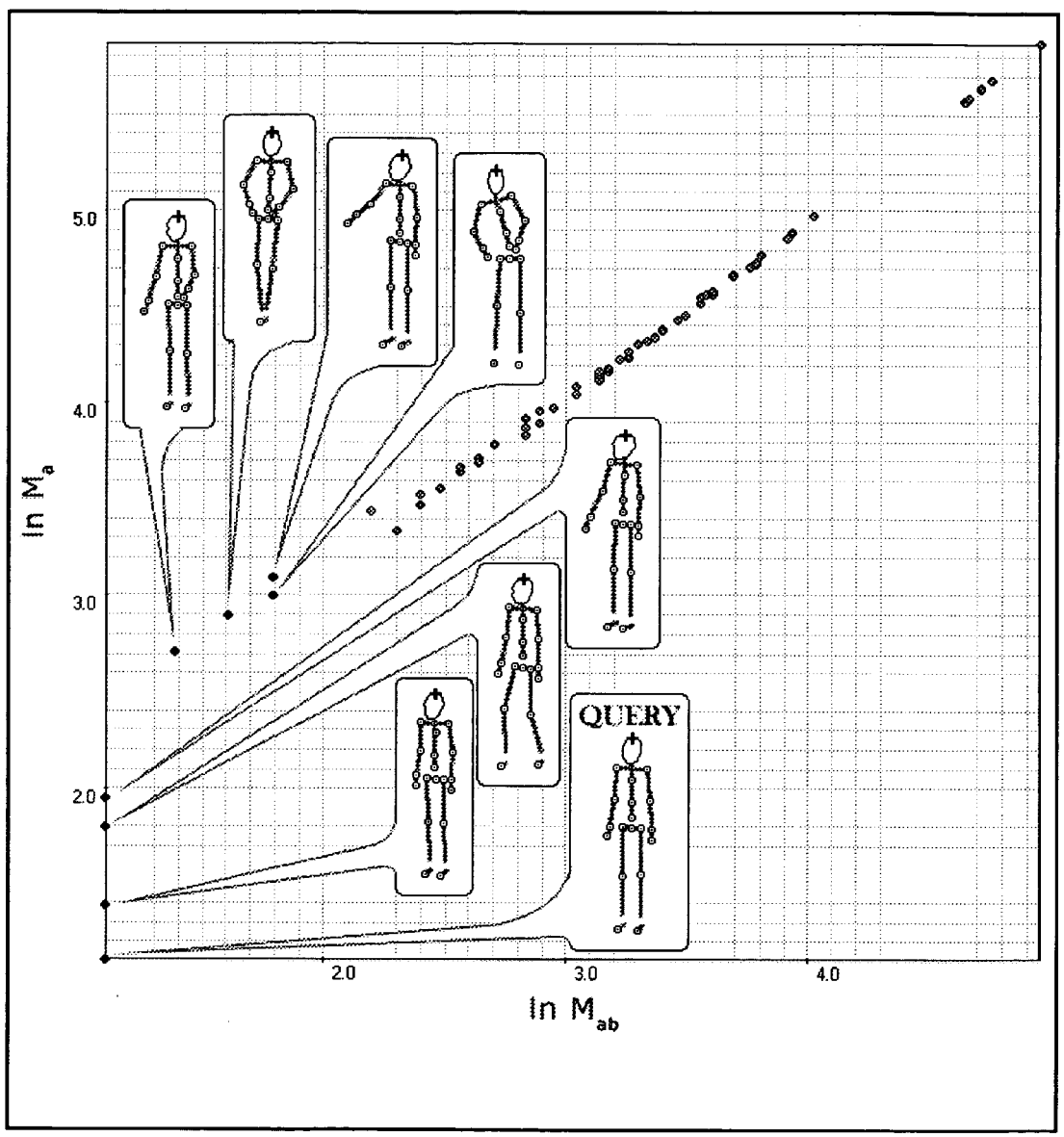
FIG. 22 shows the result of search (among 75 images) for closest analogs of a human body pose with hands down and legs straight. All other conditions are the same as in the search illustrated by FIG. 19.
Figure 23:
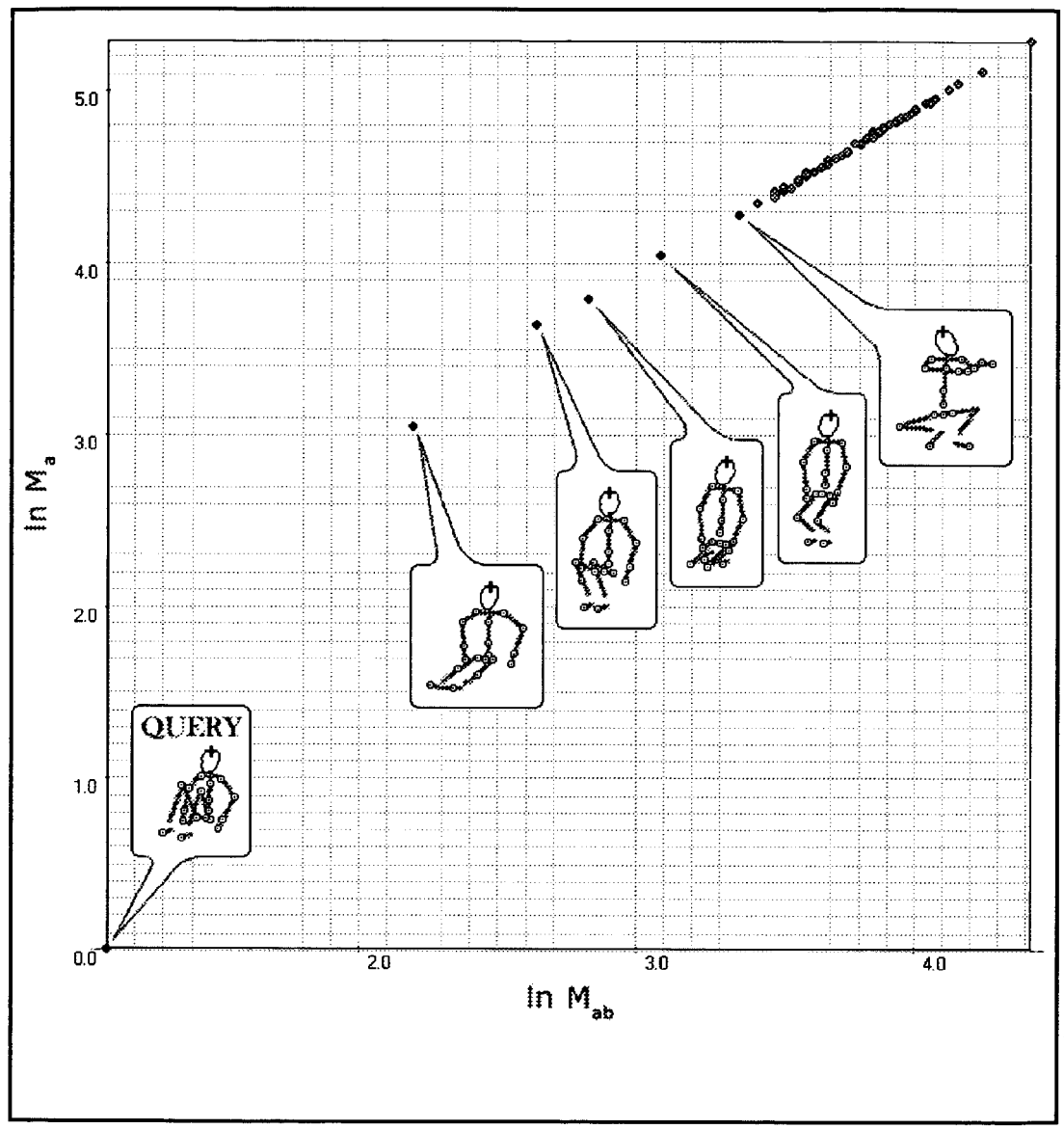
FIG. 23 shows the result of search (among 75 images) for closest analogs of a human body in a sitting position. All other conditions are the same as in the search illustrated by FIG. 19.
Figure 24:
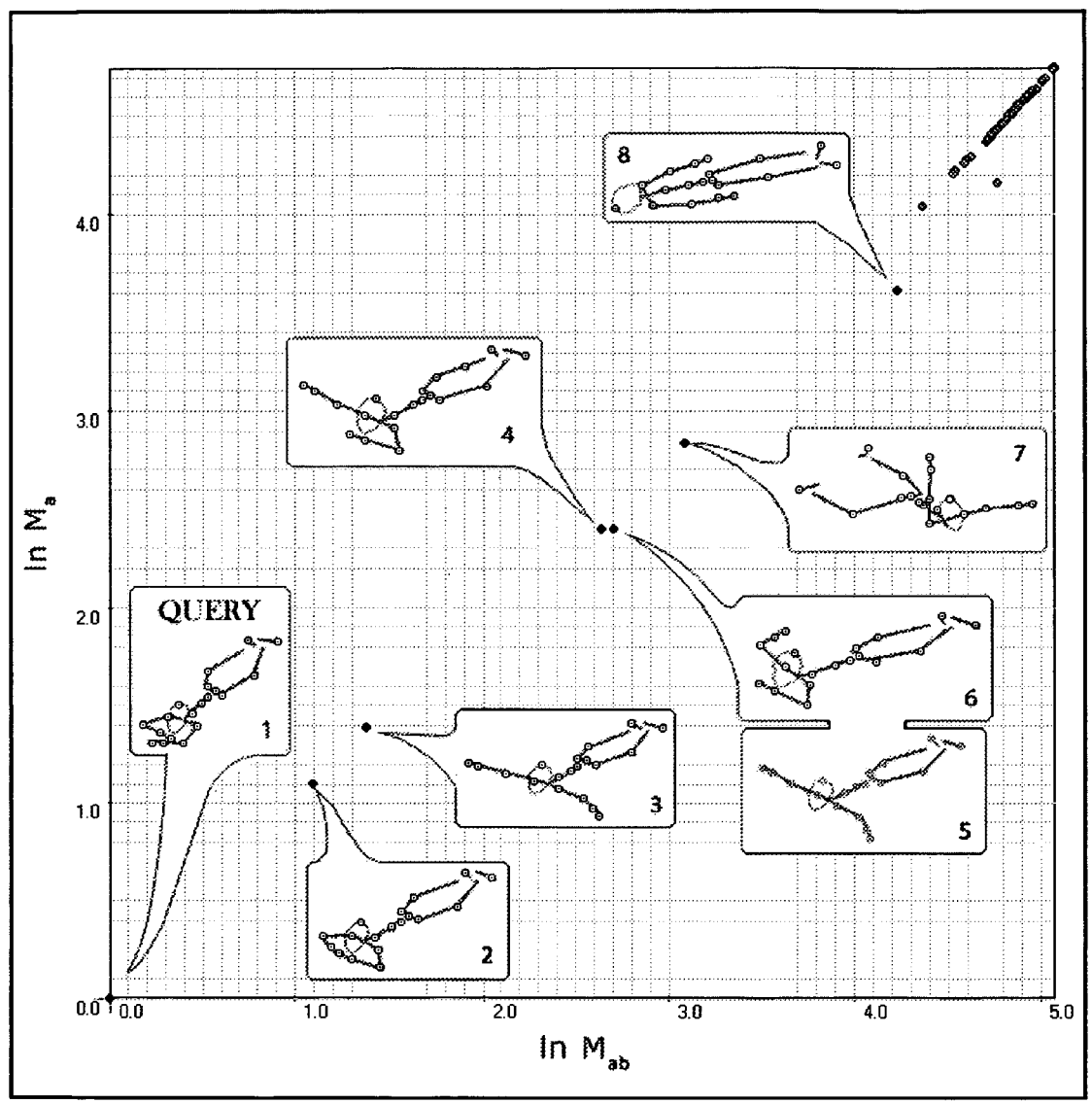
FIG. 24 shows the result of search (among 75 images) for closest analogs of a human body lying on the stomach. All other conditions are the same as in the search illustrated by FIG. 19.

FIGS. 19–24 illustrate the plots of ln Mb vs. ln Maa, each of them displaying data points corresponding to each of the 75 images. The plots demonstrate how accurately the closest analogs of query images were identified. For instance, the search illustrated in FIG. 19 was aimed at locating the closest analogs of a query image depicting a human figure with its back bent forward at almost right angle and with arms stretched forward, with palms touching each other. The result of the search shown in FIG. 20 further demonstrates high sensibility of the HyGV-CC method: it detects changes in position of hands. FIG. 21 shows that the method allows for differentiation of figures in similar stances but with arms or legs stretched or bent at different angles. In the search illustrated by FIG. 22, the query was a figure with legs straight and hands down: as is seen the search for analogs has provided several images that are similar to the query image. FIG. 23 shows a search for a figure in a sitting posture. FIG. 24 illustrates a search for analogs of the image of a human figure lying on its stomach, hands under its chin: the obtained result points to several figures as close analogs, and an image of a figure lying on its back as most remotely similar. As was noted above, the search for analogs was performed within one and the same database of 75 images of human figures in different poses.

Figure 25:
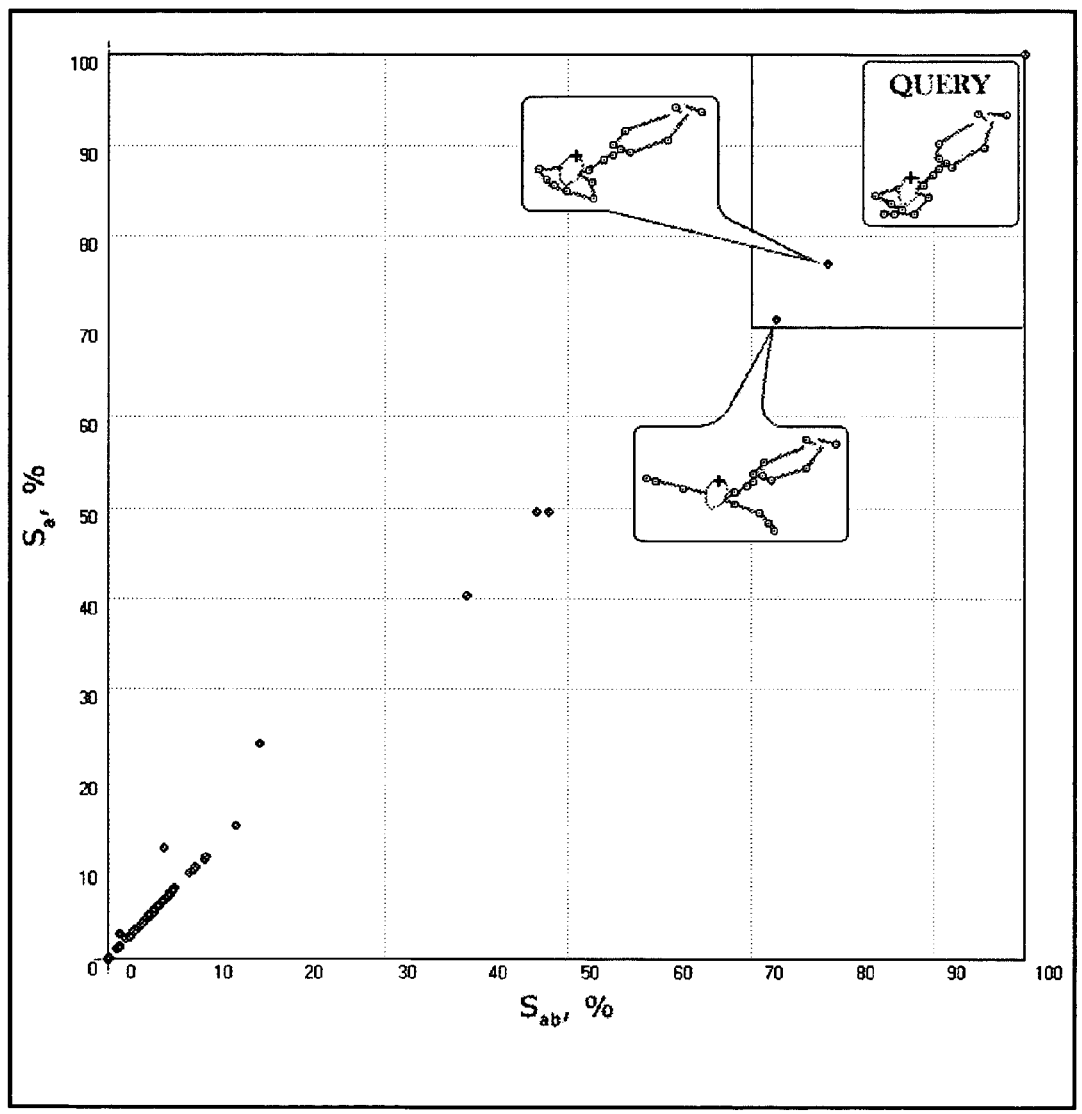
FIG. 25 shows the relationship between similarity coefficients $S_a$ and $S_{ab}$ computed by equation 6 for the human body pose shown as a query object in FIG. 24. The internal standard was the pose shown in FIG. 22 as a query.

As is seen from the above examples, the HyGV-CC method provides for image recognition with exceptionally high selectivity. It does not require the "system training" by compiling analog files, etc. Metaphorically speaking, this is a "sniff search"—all that the search system needs to "know" is characteristics of a query object, and it does not need "how to" instructions and commands. Database extraction of reference object analogs based on similarity degrees can also be done by using a criterion that is more demonstrative than the implausibility number—namely, with the help of a so-called internal standard represented by an object maximally different from a query object, or an object that embodies the limits of acceptable dissimilarities. In the first case, similarity degrees will vary within a range from 0 to 100%, whereas in the second case, similarity degrees may have both positive and negative values. Similarity coefficient $S_i$ is computed by a simple equation:

$$S_i = \frac{\ln M_{st} - \ln M_i}{\ln M_{st}}, \%, \qquad (6)$$

where $\ln M_{st}$ and $\ln M_i$ are implausibility numbers of an internal standard and of i-object, respectively. A plot in FIG. 25 shows the relationship between $S_{b(i)}$ and $S_{aa(i)}$ similarity coefficients, wherein an internal standard was represented by a query figure in the search shown in FIG. 22. This is both highly illustrative and conventional way of visualization of HyGV analysis results. For instance, FIG. 25 illustrates the selection of query analogs with no less than 70% similarity. The use of internal standards allows for normalization of the search for reference objects so that when new objects that may strongly differ from a reference object are added into a database, the positive section of the plot will not change. In this context, it is important to note that the use of the XR-metric (the shape-metric), explained in the Background of the Invention, provides for exceptionally high scalability in image recognition according to the method of this invention, and, therefore, analysis of objects whose measurements are taken in real-life conditions at various distances from an object will provide absolutely same results.

As was previously mentioned, the multiformity of human body poses, being a challenge for image recognition, is a good test of practical usability of any method for image recognition. The methodology for recognition of various poses of human-like figures with four limbs and the trunk, presented in this disclosure, can be used as the basis for autonomous machine-learning. Assume that we have created a system of files on various human body poses, where each file contains an image of a certain pose, labeled accordingly (expert assessment) and provided with a detailed description of a respective pose. By setting limit values of Implausibility Number or of a similarity degree, we can use automated screening of databases to find new analogs of poses labeled and stored in the created file system. (The fact that such a screening will not let through random objects has been proven by the examples illustrated by FIGS. 19–24. The identification was intentionally done with the use of just one coordinate—to demonstrate the screening accuracy.) If the limits are set to a higher level, the number of analogs added to individual files will increase, and certain analog images may get attributed to more than one file, which is however not a problem, especially since data extraction from files also can be regulated by setting required similarity level. Assume that thus compiled and organized a database is used in identification of human body poses. It may appear that a certain experimentally measured image does not have any match in an existing database, in which case a new file is automatically created, however without a label and image description. Such files are then labeled by a human operator according to their contents. Thus organized semi-automated system of machine self-learning will provide for search for images, whose analogs within the required limits of similarity are not present in the system's reference library, as well as for expanding the latter by creating new image files, which are separated from theretofore existing, familiar to the system, files.

The proposed methodology of image recognition has certain peculiarities that make it promising as a platform for development of fully automated machine self-learning. The said-peculiarities result from the additivity of parameter multiplication. HyPa multiplication numbers strictly depend on certain factors. First of all, a number of multiplications required for a whole set of parameters is a sum of multiplications numbers for individual parameters. (This is totally valid, at least, upon the use of the XR-metric.) Individual parameter multiplication number can be established in two ways: either based on a single parameter, or based on difference between a number of multiplications for a whole set of parameters and that for a whole set with a target parameter removed. Both ways of computation give same results (as in the above examples multiplication numbers are computed with accuracy to nearest whole number, the differences may be in the range of ±1). The above said is demonstrated in FIG. 26 in the form of a table of data on the first 14 human body poses illustrated in FIG. 18 (a capsule of clones was computed for the image used as a query in the example illustrated in FIG. 21). Out of 18 points, used as parameters (see FIG. 17) of the artificially generated human-body images, 7 referred to the left half of the body, 7 to the right half, and 4 to the torso center. As is seen from the table, numbers of multiplications computed for whole body parameters are practically the same as the totals of multiplication numbers for the parameters corresponding to the left and right halves and the torso center.

The additivity of parameter multiplication numbers provides very important opportunities in the problem of computer self-learning. It can be used for determining whether or not an image is symmetrical, for "configuring" an image, for instance, by combining different parts of different images, etc. Based on additivity, simple algorithms can provide for detailed list of differences between a given image and reference images in a database.

Machine self-learning in recognition of a human-being's or human-like robot's poses will be beneficial for a multitude of practical applications. For instance, U.S. Pat. No. 6,493,606 "Articulated robot and method of controlling the motion of the same" by Saijo et al. describes a legged mobile robot that communicates by moving its limbs and/or the trunk "so that even a robot or a human being which does not possess the same motion language database can determine the meaning . . . "; such a robot may be used, for instance, for sending messages on the condition of a dangerous working area. Our invention can significantly enhance the mobile robot technologies, especially in the part of motion recognition and remote control of robots by robots. It also opens new opportunities in the technology of robot pets—in both controlling a robot-pet by a human-being, and training a robot-pet to recognize the motion language of a human-being. The aforementioned examples cover only a very small part of the opportunities in practical applications of the image recognition based on the HyGV-CC method.

8. HyGV-method in Gait Recognition

As demonstrated in the foregoing sub-section of this disclosure, the method of this invention has unlimited potentials in pattern/image recognition, especially taking into consideration the high scalability and additivity of the total signal (number of hypothesis-parameter multiplications) that represents the total of signals contributed by individual parameters. All of the above and especially the latter make the HyGV-method a very promising solution for various areas of identity verification covered by the notion of "biometrics" (see e.g. Nanavati, S., Thieme, M., and Nanavati, R. (2002) Biometrics. Identity Verification in a Networked World. John Wiley & Sons, Inc. New York; Mark S. Nixon, John N. Carter, Michael G. Grant, Layla Gordon and James B. Hayfron-Acquah, Automatic recognition by gait: progress and prospects. Sensor Review, vol. 23, No. 4, 2003, pp. 323–331). Biometric technologies—both well elaborated and widely available (for instance, dactyloscopy), and those currently under development—carry a lot of commercial potential. One of the many new directions in biometric technologies is "gait recognition", i.e. recognition of rhythmic patterns associated with walking stride. Below we will demonstrate the use of the HyGV-method in gait recognition.

Figure 27:
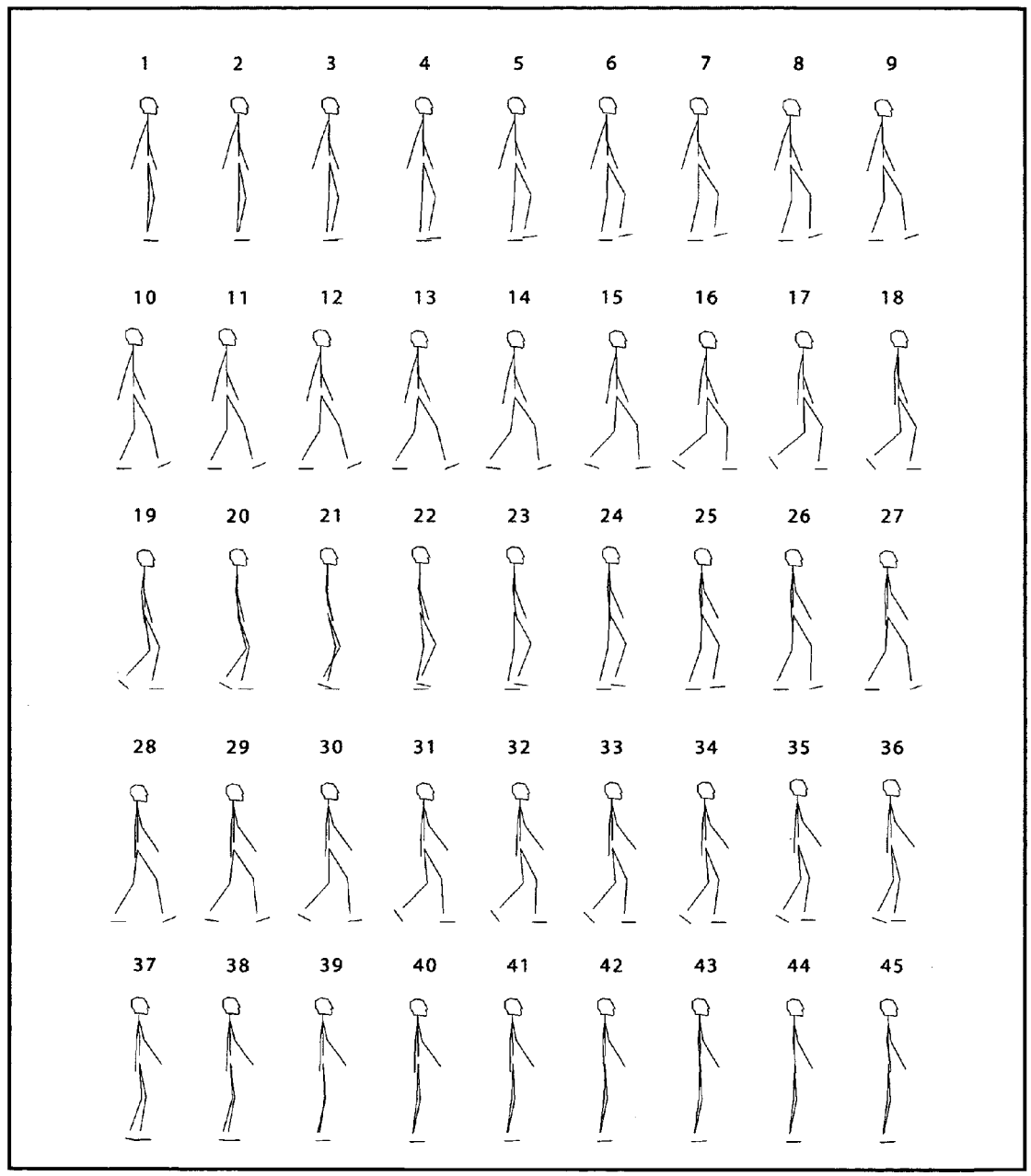
FIG. 27 shows 45 artificially generated schematic images ("flames") of a human figure captured at various moments of the process of walking, used for demonstration of application of the HyGV-method in gait recognition.
Figure 28:
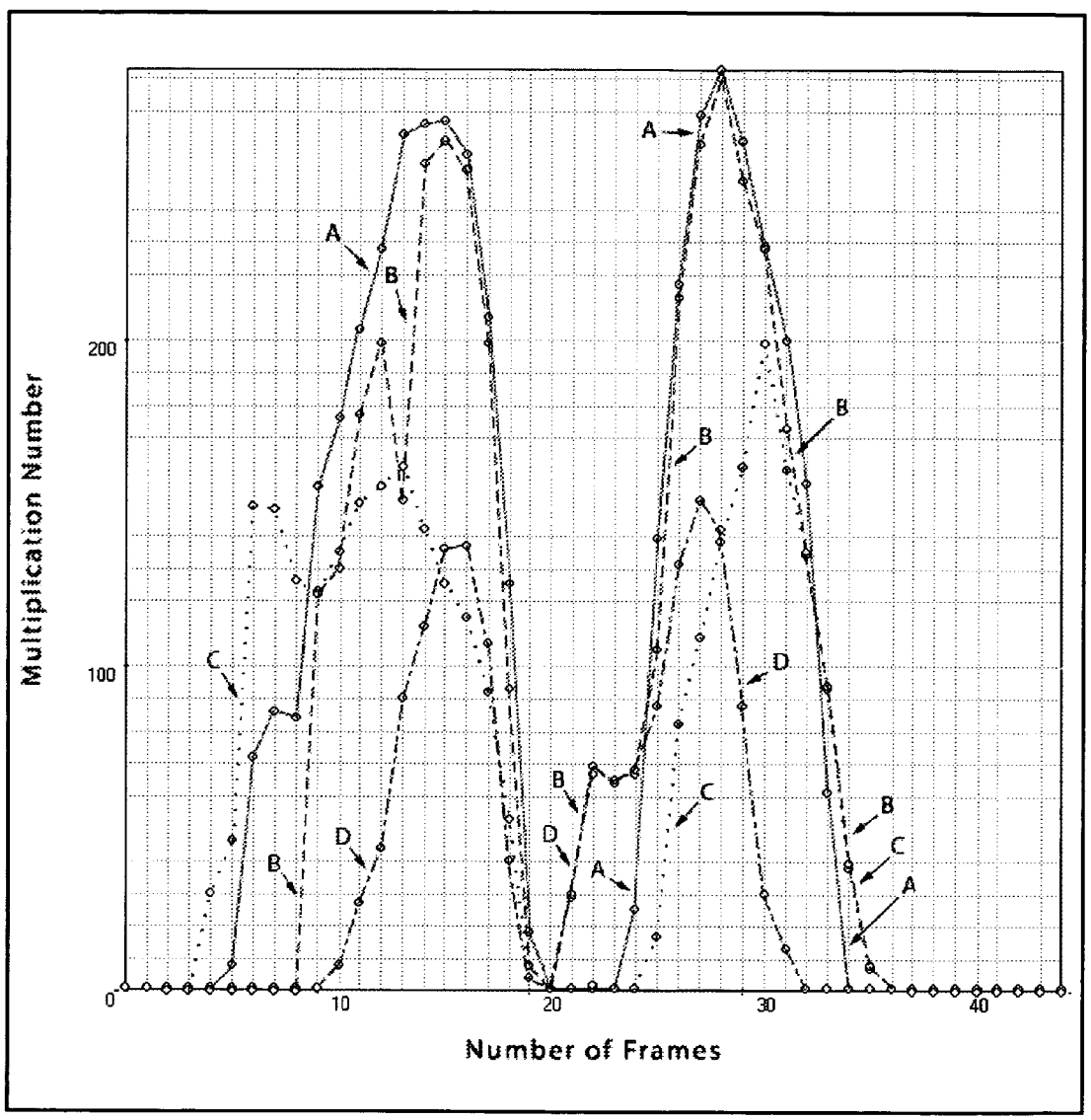
FIG. 28 is a plot showing how the multiplication number (M) values change in accordance with the walking motion frames shown in FIG. 17. The reference object was the first flame in FIG. 27. 15 parameters (vertical distances from the skull top, as a zero point, to each of the points shown in FIG. 27, except for points 4, 5, and 7) were used in the analysis. Curve A reflects the M values established based on all 15 parameters; curve B shows the M values computed for respective totals of each right and left measurements—7 parameters corresponding to each half of the body, and point 4 (see FIG. 17); and curves C and D reflect the M values corresponding, respectively, to the left and right halves of the body.

FIG. 27 shows 45 artificially generated schematic images ("frames") of a human figure captured at various moments of the process of walking. The first frame was used as an object for computation of the capsule of clones with the purpose of identification of other frames. FIG. 28 illustrates the motion dynamics determined by the HyGV-CC method. Parameter measurements were based on vertical distances from the head top (assumed as 0) to 15 different points of the body. Body points were the same as in the example of image recognition discussed in the above sub-section, except for the three spine points. The capsule format was C3(2) (FIG. 2A); $a(2)=30$, $ba(2)=0.10$, $bb(2)=0.01$. The motion dynamics computed based on all the parameters of 15 points is presented by the two peaks of curve A in FIG. 28. Motion dynamics computed individually for the left and right sides of the body, based on 7 points of a respective side plus the torso top, represent two curves, each with two peaks, however, with different peak maximums (see FIG. 28 curves C and D, respectively, for the left and right halves of the body). Curve B is the total of curves C and D and is practically identical to the curve based on all 15 points, thus once again providing the evidence of the additivity of the HyPa multiplication number.

As is seen from FIG. 28, even a very small fragment of a walking stride can be used as a reference object for comparison and it is enough for the HyGV-method to establish a gait signature. Although the present example is based on artificially generated sequence of images of the walking motion, it demonstrates the principle and the capabilities of the proposed method to be applied to the real-life human gait recognition. The described approach offers also new opportunities in establishing gait specifics. In the copending patent application "High-dimensional data clustering with the use of hybrid similarity matrices", we described a technique for parameter multiplication in the process of hybridization of monomer similarity matrices. The parameter multiplication technique allows for adding, to a set of monomer similarity matrices, any number of monomer similarity matrices corresponding to any parameter, which, in the context of gait analysis, can be used to establish which of the points of the body are responsible for the specifics of particular elements of gait dynamics.

Figure 29:
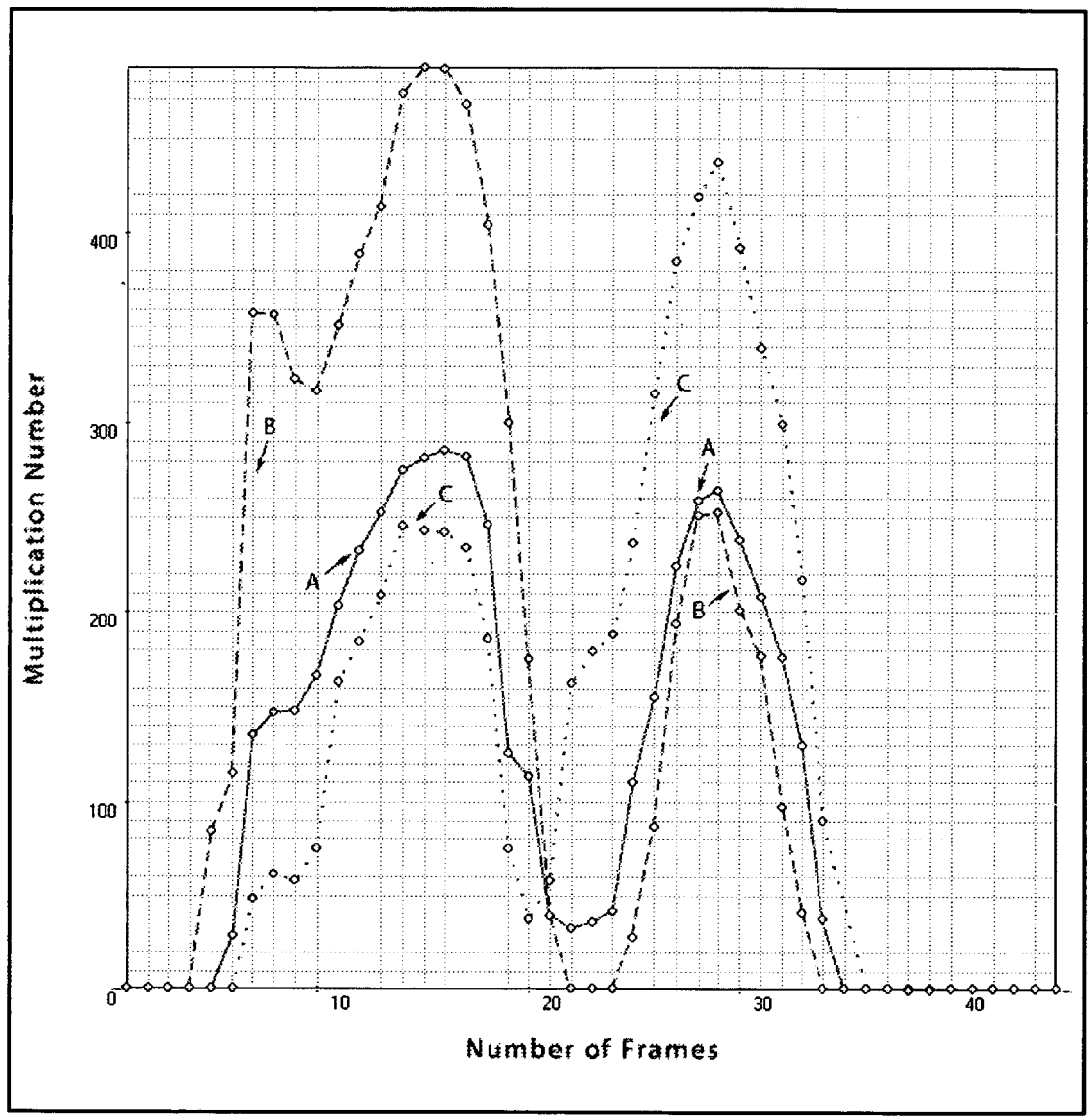
FIG. 29 is a plot showing how the multiplication number (M) values change in accordance with the walking motion frames shown in FIG. 17. The reference object was frame 1 in FIG. 27. Curve A is based on 9 parameters corresponding to the distances from the skull top to points 11 through 13 (see FIG. 17). Curve B reflects the walk dynamics computed with the use of 4 extra copies of the left knee parameter. Curve C was obtained after the addition of 4 extra copies of the right knee parameter.

FIG. 29 shows the walking motion dynamics established by using 9 parameters based on the locations of 9 points of the body lower part (curve A). Curve B reflects the dynamics computed with the use of additional 4 copies of the parameter based on the left calf. As is seen, the height of the first peak of curve B has increased 1.5 times as compared to the first peak of curve A, whereas its second peak has not changed—which means that the first peak corresponds to the motion of the left side of the body, while the second peak reflects the motion of the right side of the body. This is further confirmed by the shape of curve C (FIG. 29) that was obtained after the addition of 4 copies of the parameter based on the right calf. In this case, in contrast to the result of the left calf parameter multiplication, the height of the second peak increased as compared to the second peak of curve A. In the same way, by applying the parameter multiplication technique in real-time, the gait-relevant specifics of the motion of any part of the body can be established. After a general analysis and classification of motion dynamics of various parts of the body during walking measured by radar or video systems, individual parameter multiplication upon re-processing of the resulting data will provide further detailed subgrouping of parameters and point to fine specifics of a gait signature under analysis.

9. HyGV-method in Sequence Recognition

Sequence recognition is involved in solution of many practically important problems, starting with document processing technologies, biopolymer analysis, and up to search for specific sections of spectra in engineering and biomedical research and applications. Below we will demonstrate that the method of this invention allows for recognition of any kinds of sequences and ensures exceptional accuracy as well as reproducibility, while being, unlike the neural network approach, very simple and fully operational on a regular PC.

Assume that a certain sequence of elements from 1 to "n" with varied signal values and containing an f-length string from "k" to "k+f−1" needs to be located. The query string can be presented as an object described by k-parameters. ("reference object") as is shown in the Table in FIG. 30. Parameters 1 through f shown in the Table reflect the signal values for each element of the sequence from the first to the n-th. A capsule of clones (CC) created for the query string ("k" through "k+f−1") will serve as a screening frame whose width covers "f" elements, and, while moving along the entire sequence, will be compared to each object emerging on its way, thus leading to identification of a query string. At each new step of the screening frame, there emerges a new object to compare with the capsule of clones of the reference object—with the same (f) number of parameters (i.e. same frame size) as the reference object, but of different values. Each object exposed to the screening frame is examined for the Implausibility Number. An object whose Implausibility Number is found to be zero is the reference object.

Figure 31:
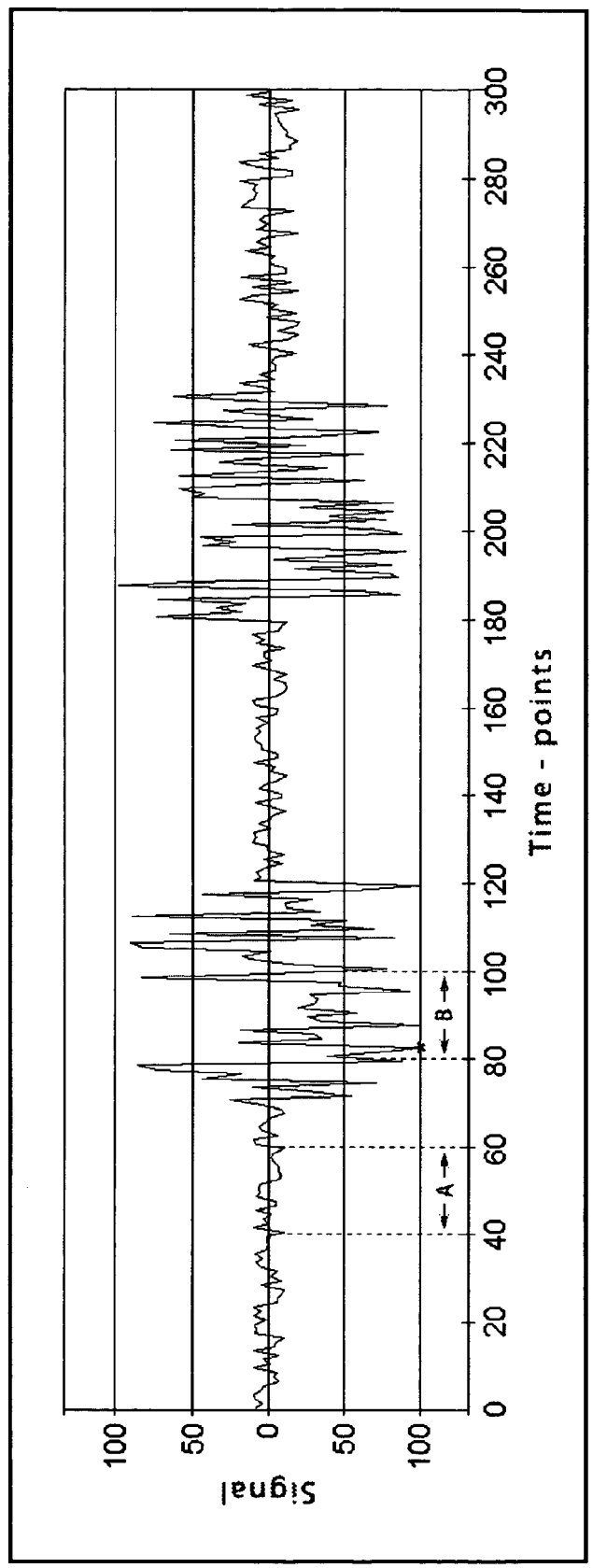
FIG. 31 is an illustration of an artificially generated signal pattern. Sections A (40–59) and B (80–99) are target objects for sequence recognition.
Figure 32:
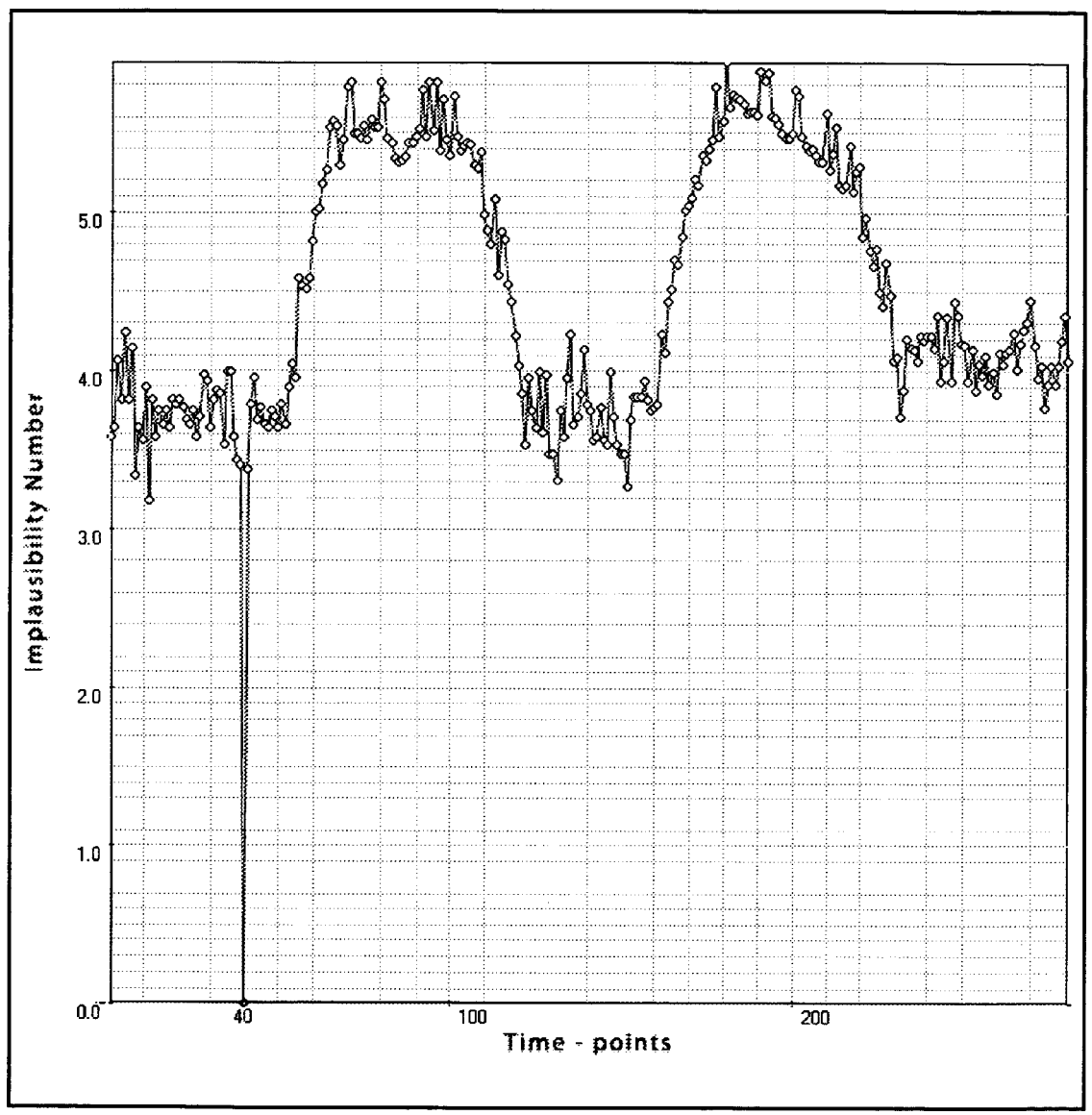
FIG. 32 illustrates the result of sequence A (see FIG. 31) recognition by the method of this invention. The ln M value drop to 0 indicates that the target sequence has been located.
Figure 33:
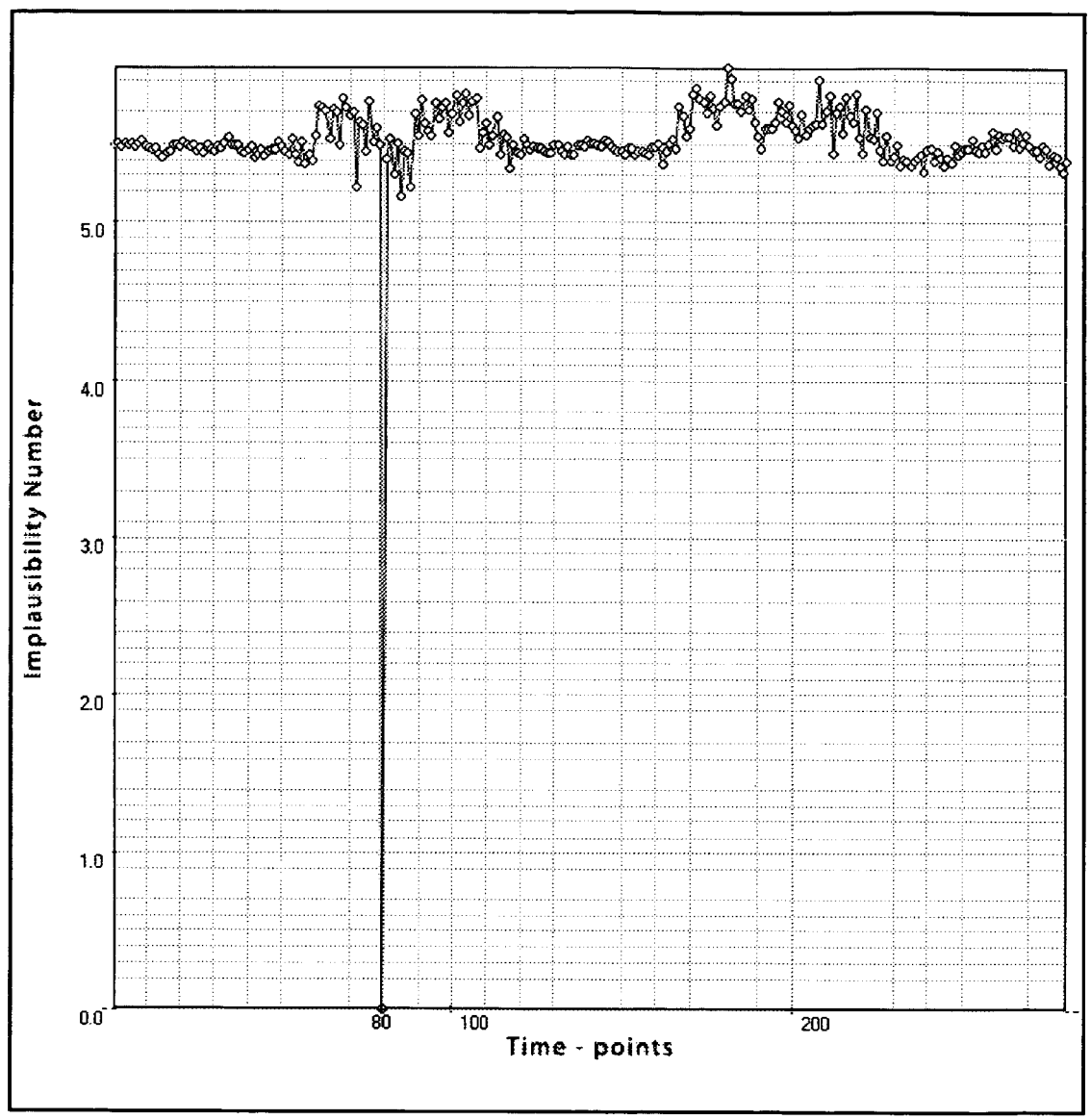
FIG. 33 illustrates the result of sequence B (see FIG. 31) recognition by the method of this invention. The ln M value drop to 0 indicates that a target sequence has been located.

The following example is to demonstrate the efficiency of the HyGV-CC method in sequence recognition. An artificially generated pattern consisting of 300 time-points (FIG. 31) with the signal varying within a range of +100 to −100 units was used for analysis. Reference objects were two 20-units sequences: 40 to 59 and 80 to 99 time-points, respectively (k=40 and 80; f=20). Capsule of clones format: C3(2), a(1)=10, ba(1)=5, bb(2)=1. Objects were compared against cluster ba. Sequence 40–59 appeared to be the imitation of "white noise", whereas sequence 80–99 was a distinct block of signals, different from background noise. FIGS. 32 and 33 illustrate the detection of the query sequences at the points where the signal (the ln M value) slumps to zero indicating that a reference and a target sequences coincide.

Figure 34:
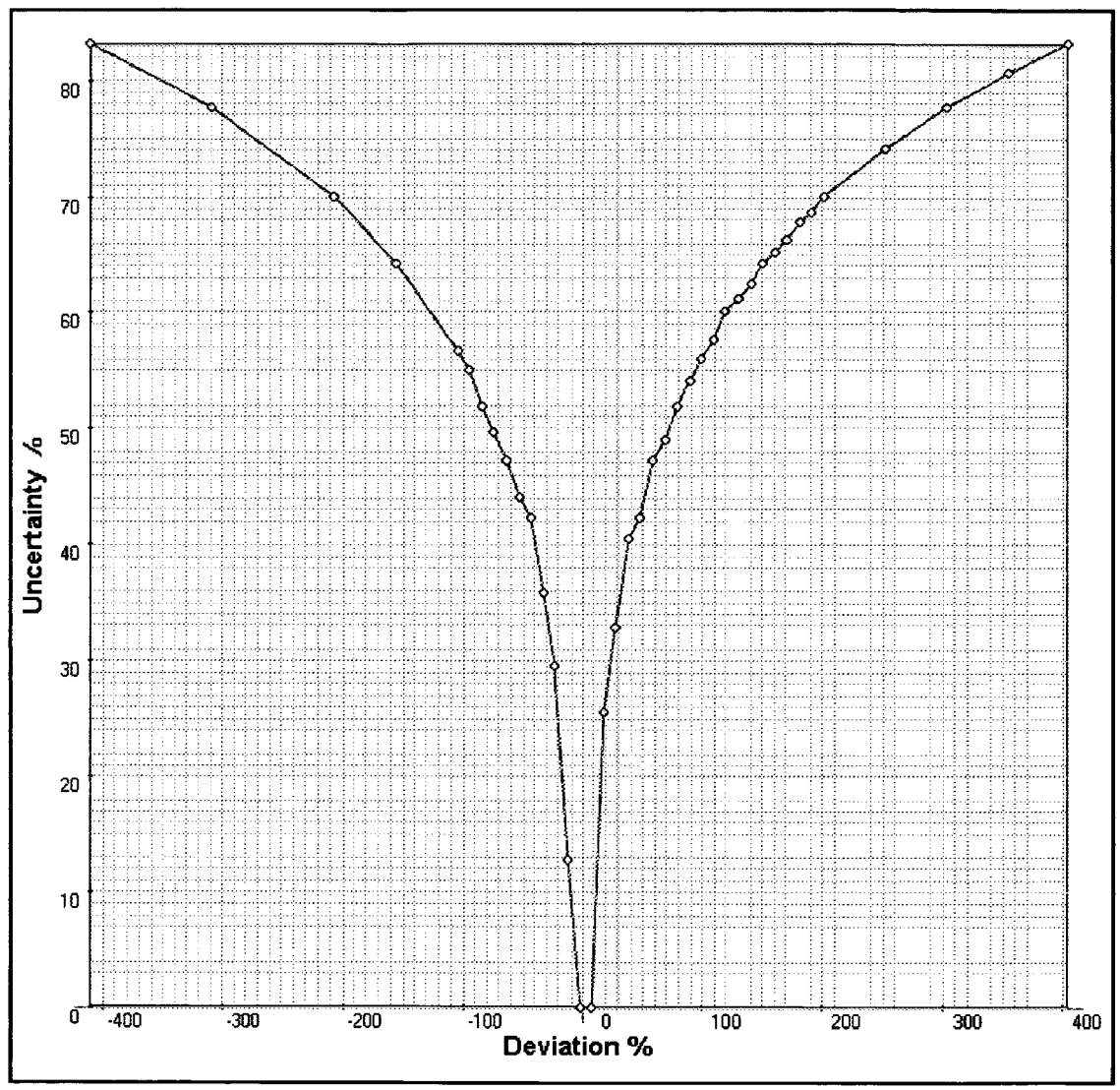
FIG. 34 shows the relationship between the identification uncertainty computed for sequence B (see FIG. 31) by equation (7) of this specification and the deviation from the value of the signal at time-point 83 (the asterisked point in FIG. 31).

As is seen in FIGS. 32 and 33, there is a certain background signal that is characteristic for both the query sequences and the whole pattern. We will designate it as ln $M_0(j)$, where i is a query sequence. For the above-referred query sequences, its values will be: ln $M_{0(40-59)}$=4.0±0.5 and ln $M_{0(80-99)}$=5.5±0.2. Based on the background signal value, the effect of uncertainty in respect of individual parameters upon the accuracy of locating a whole query sequence can be calculated. If uncertainty (U) is represented as follows:

$$U_i = \ln M_i / \ln M_0, \%  \qquad (7),$$

then it is easy to assess how the uncertainty in regard of some of the elements of a query sequence may affect the accuracy of its detection. The above thesis is illustrated in FIG. 34 showing how the uncertainty of locating the sequence 80–99 changes due to fluctuations of the signal for element 83' as is seen, with the element 83 signal changing by ±100%, $U_{(80-99)}$ does not exceed 50%. This technique for estimation of sequence detection accuracy depending on reliability of available information on a given sequence can be used in analysis of any kinds of sequences.

The proposed approach to sequence analysis by applying the HyGV-CC method provides a universal solution for a variety of tasks involving sequence and pattern recognition. The foregoing description of the proposed methodology shows that the longer is a query sequence, the higher is the accuracy of its recognition. Another important-advantage of this method as a sequence (pattern) recognition technology is in its integrative function. Along with locating a reference section of a pattern, the HyGV-method provides an integral response when it compares a reference section with an entire pattern. This is well seen in FIG. 32 where the reference object is a part of the spectrum (FIG. 31), very much looking like a "white noise". The two broadened peaks extending above the signal's centerline (FIG. 32) are the integral form of representation of the analyzed spectrum's sections that distinctly differ from the noise signal.

The above-described application of the HyGV-method enables one to easily locate, for instance, lengthy excerpts of texts in voluminous databases of documents, by applying a set of approaches: for instance, by establishing the number of words between two words that start with a certain letter, or the number of words in a certain fragment, or the number of words between two closest positions of a definite article, and many others. Non-linearity of the signal changes depending on proximity to a reference sequence—i.e. significant variations in the signal occurring at even slightest deviations from a reference sequence—is provided by the use of the implausibility number, which is a logarithm of an HyPa multiplication number.

10. HyGV-method in Locating Particular Strings in Binary Sequences

In certain cases, it may be useful to apply an HyPa multiplication number rather than implausibility/plausibility number, as the former represents an additive value. This can be demonstrated by the example of binary sequence identification by the HyGV-method, as shown below. Binary sequences are extensively used in information transmission of signals in hardware-independent data formats, and the HyGV-method offers a new solution to the problem.

Figure 37:
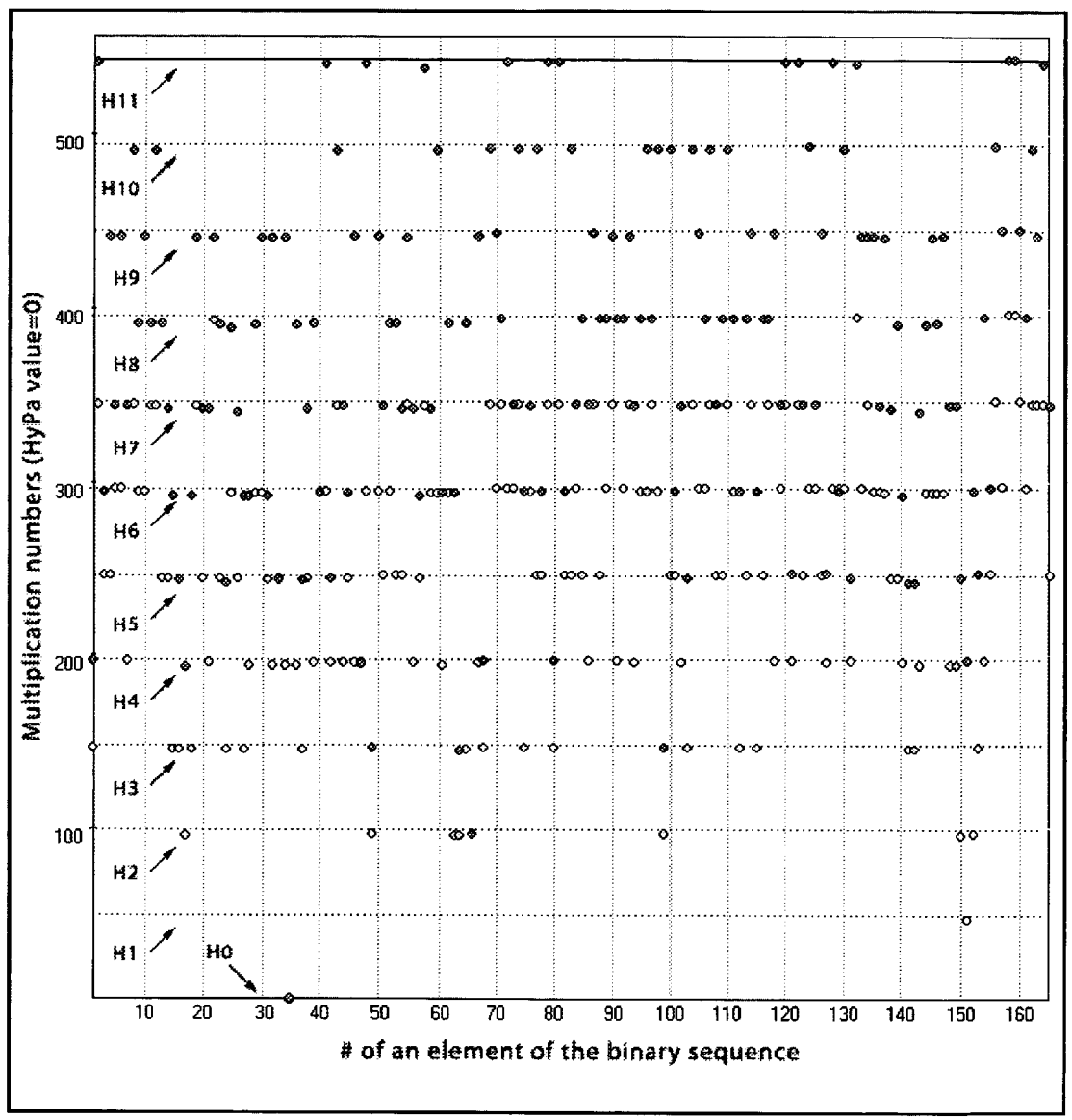
FIG. 37 is a plot showing the changes in multiplication numbers as the screening frame in the form of the binary string (see FIG. 36) is moving along the binary sequence shown in FIG. 35. Dark dots correspond to multiplication numbers for the 15-bit binary string screening frame (k=35, f=15); open dots, to 10-bit screening frame (k=35, f=10). H0–H11 are Hamming distances showing the number of disagreeing bits between two binary vectors.
Figures 38A, 38B:
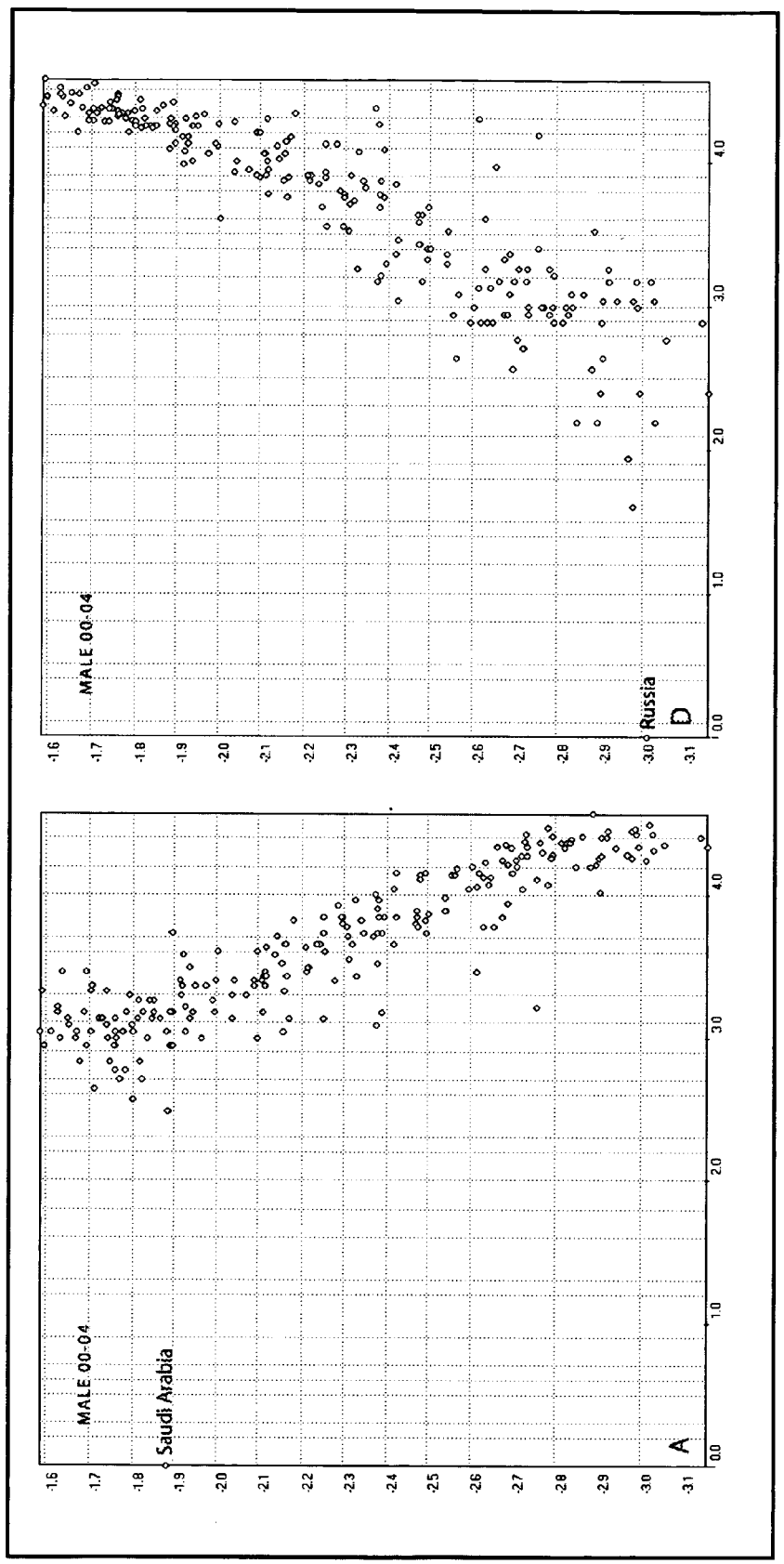
FIGS. 38A–38F are plots showing the correlation between implausibility numbers and demographic parameters of 220 countries under analysis.
Figures 38C, 38D:
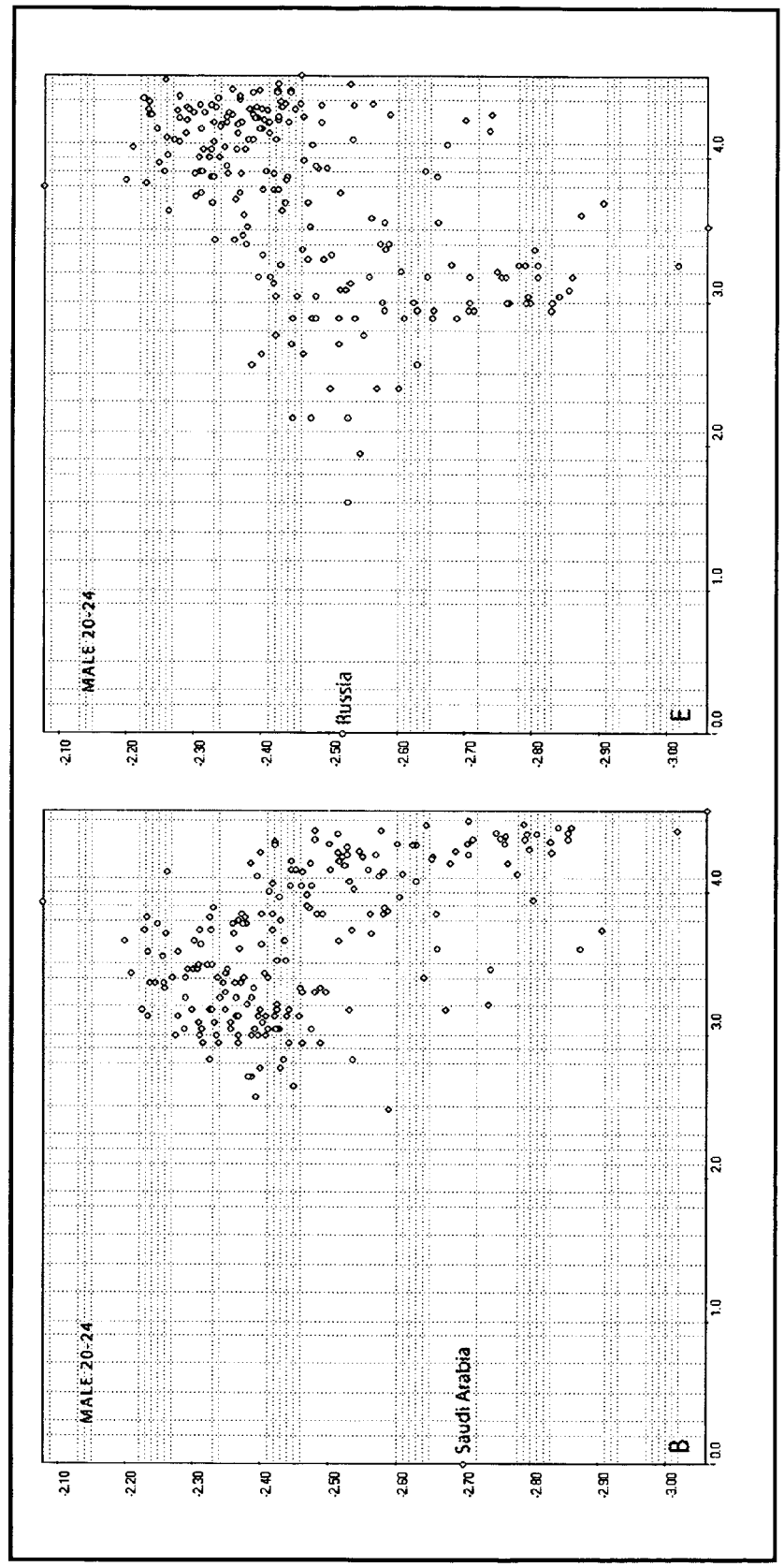
Figures 38E, 38F:
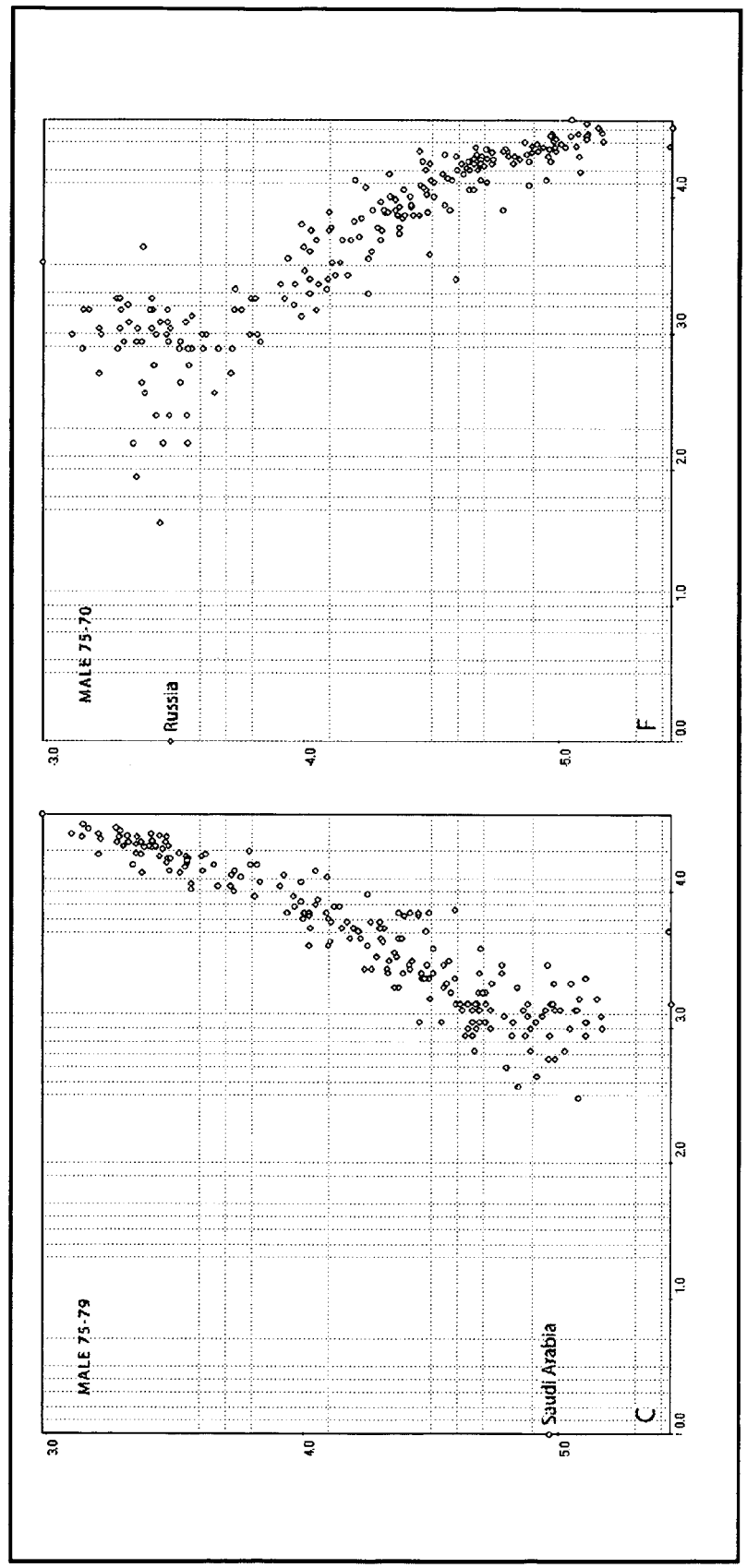

FIG. 35 shows a binary sequence of 180 bits (here, n—see subsection 8 above—is the number of bits). Assume that the search target is the set of 15 bits, from 35 through 49 (i.e. k=35, f=15), of the given sequence. An example of-construction of a capsule of clones for bit string identification is illustrated in FIG. 36. (In reality, there may be a variety of versions of a capsule of clones, with different multiplication numbers for the HyPa and producing non-contradictory results.) FIG. 30 gives an example of constructing a table to compute a hybrid similarity matrix and establish the "M" values corresponding to each move of the screening frame along a binary sequence under analysis. FIG. 37 shows how the M value changes as the reference frame (k=35, f=15) is moving along the entire sequence until it locates the reference binary string. For comparison purposes, the diagram also shows the signal (M) in response to the surfing of the 10-bit screening frame (k=35, f=10). The dark dots correspond to f=15; and the open dots, to f=10.

If, instead of M values, we plot the implausibility numbers (ln M) against the ordinate axis, the result will be the same as shown in FIGS. 32 and 33—i.e. the M value drops to 0 at the moment when the reference sequence gets located. Thus, the HyGV-method can be successfully used for identification of any binary strings. As matrix hybridization (as per copending application titled "High-dimensional data clustering with the use of hybrid similarity matrices", by Leonid Andreev) involves minimal relevant computational resources, the identification of a binary sequence of any length (i.e. number of frames), within a given binary sequence, is determined by only a distance between a reference string and a beginning of a sequence of bits.

In case of the use of M value (FIG. 37), 12 levels of signal values, differing from each other by a same value, are produced. The 12 levels correspond to a metric known as and widely used in the technology of information transmission as the Hamming distance (H) which equals the number of disagreeing bits between two binary vectors. Thus, when the frame 3549 moves along the binary string-shown in FIG. 35, the Hamming distance equals 11 (FIG. 37).

11. HyGV-Method and Mathematical Statistics

By the foregoing examples, illustrating various applications of the method of this invention, we have demonstrated that this invention provides a universal method for data processing that can be easily customized in accordance with any highly-specific data processing task. Multiplication numbers, employed in the method of this invention, play the role of additive quantitative criteria allowing for a description of objects characterized by large sets of parameters. This makes the present invention especially valuable for biological sciences.

Understanding the processes responsible for living beings functioning and, especially, cognition is pursued by many different sciences, among which computer science plays a special and consolidating role due to its potentials in modeling of highly complex processes. On the one hand, computer science provides the necessary tools for researchers in biology, but, on the other hand, it is obvious-computer-science itself is under-strong influence of biological knowledge and ideas. Such a type of alliance between sciences is quite common: for example, mathematics and biology, biology and engineering (bionics), biology and physics (biophysics). All of the said interscience relationships have one thing in common: on the one side, it is one of the sciences with traditionally extensive use of deductive approaches, and on the other side, biology, where induction dominates as a method of cognition. Hence, the strong interest in biology-relevant theoretical modeling and the tendency in computer science to overusing too fundamentally-looking terms from the areas of biological level complexity with respect to theoretically and technically simple models.

For many decades, mathematical statistics has been the venue where physico-mathematical sciences meet with the sciences of biological level of complexity, including not only biology but also ecology, sociology, medicine, etc. This is not accidental, for mathematical statistics is the science that leans on the law that may be the only universal law adequately describing processes at the population level—the law of probability distribution. The equations describing the probability distribution at the population level (e.g. Gauss', Poisson's), overgrown with countless auxiliary techniques, have become a powerful instrument of mathematical analysis and, for many decades by now, have been forced onto biology as the only criterion of validity of quantitative measurements and scientific conclusions. Thus, a long path of problem-solving—from coin flipping to most complex issues of biological sciences—has been cleared by mathematical statistics by artificially removing the major limitation of probabilistic approaches consisting in the necessity to meet the requirement for equal probability of events, which is nearly impossible for biology. It is not accidental that the harsh criticism of the main paradigm of mathematical statistics, voiced in the above-cited work by Anderson et al. (Anderson, D. R., Burnham, K. P., and Thompson, W. L. (2000) Null hypothesis testing: problems, prevalence, and an alternative. Journal of Wildlife Management 64(4): 912–923), comes from specialists in ecology, one of the most complex areas of biology, who wrote: "The fundamental problem with the null hypothesis testing paradigm is not that it is wrong (it is not), but that it is uninformative in most cases, and of relative little use in model or variable selection. Statistical tests of null hypotheses are logically poor (e.g., the arbitrary declaration of significance)". Hallahan further opines that "rather than blindly assuming all data to fit NHST's (null hypothesis significance testing) underlying assumptions, researchers should explicitly try to model the phenomena under investigation" (Hallahan, Mark. The hazard of mechanical hypothesis testing. Psycoloquy, 1999, 10, #1 Social Bias 13. Italics in the above quote are by L. Andreev and D. Andreev). The life science research community is getting increasingly disappointed with mathematical statistics, finding it primitive and helpless in application to complex biological problems. The limitations of mathematical statistics in life sciences have become especially apparent due to advances in computer programming: a plenitude of software tools for mathematical statistics, produced within the past decade, have exhaustively covered all that has ever been conceived in this field and thus made it ultimately clear that mathematical statistics, despite its wealth of methods and techniques, has extremely limited potentials as a research tool for biological sciences.

This invention, formally a method for non-probabilistic statistical processing, is capable of taking a role in cooperation between exact and biological sciences. Figuratively speaking, it is in the tag line of the research work underlying this invention: non-biological intelligence (cf. the materials published on http://www.matrixreasoning.com). The method of this invention offers that missing link without which no smooth transition from biological sciences to exact sciences is possible. The two examples below provide illustrations to the above-stated.

FIGS. 38A–38F illustrate correlations, presented in bi-logarithmic coordinates, between multiplication numbers and the shares of male population of age groups of 00–04, 20–24, and 75–79, the reference objects being Saudi Arabia and Russia. Here, multiplication numbers serve as generalized criteria for each of the 220 objects (states) covering 34 parameters of population pyramids; thus each individual parameter can be correlated to such a generalized criterion. The data presented in FIGS. 38A–38F allow for the following conclusions. For instance, there is an obvious correlation between multiplication numbers and percentages of 0–4 and 75–79 age groups in population of the world in general, whereas no such correlation exists for the 20–24 years age group; which may be explained by the fact that the former two groups represent a so-called immobile part of population, while the latter is represented by a mobile group. Or, for example, another apparent fact is that analyses of population pyramid data groups of countries in respect of their similarities with two different countries as reference objects—(a) Saudi Arabia and (b) Russia—produce opposite results; etc.

It goes without saying that a population pyramid of any country is a complex cooperative system, and that none of its parameters should be treated as an independent one, and that even though the total of percentages of different age groups is normalized to 100%, their actual total does not bear any scientific meaning—it would be senseless to sum up percentages of individual age groups as, in reality, the relationship between them is governed by much more complex operations than simple addition and subtraction operations. In this respect, multiplication numbers used in the method of this invention are indispensable in processing of data of this type, as they have the property of additivity and are equal to the sums of values of individual parameters. They represent the vector that, as was mentioned above, furnishes information that allows for establishing correlations between various features of complex biological systems; and, as is seen from the graphs shown in FIGS. 38A–38F, now that this part of analysis is done, classical mathematical statistics can be meaningfully applied.

Figure 39:
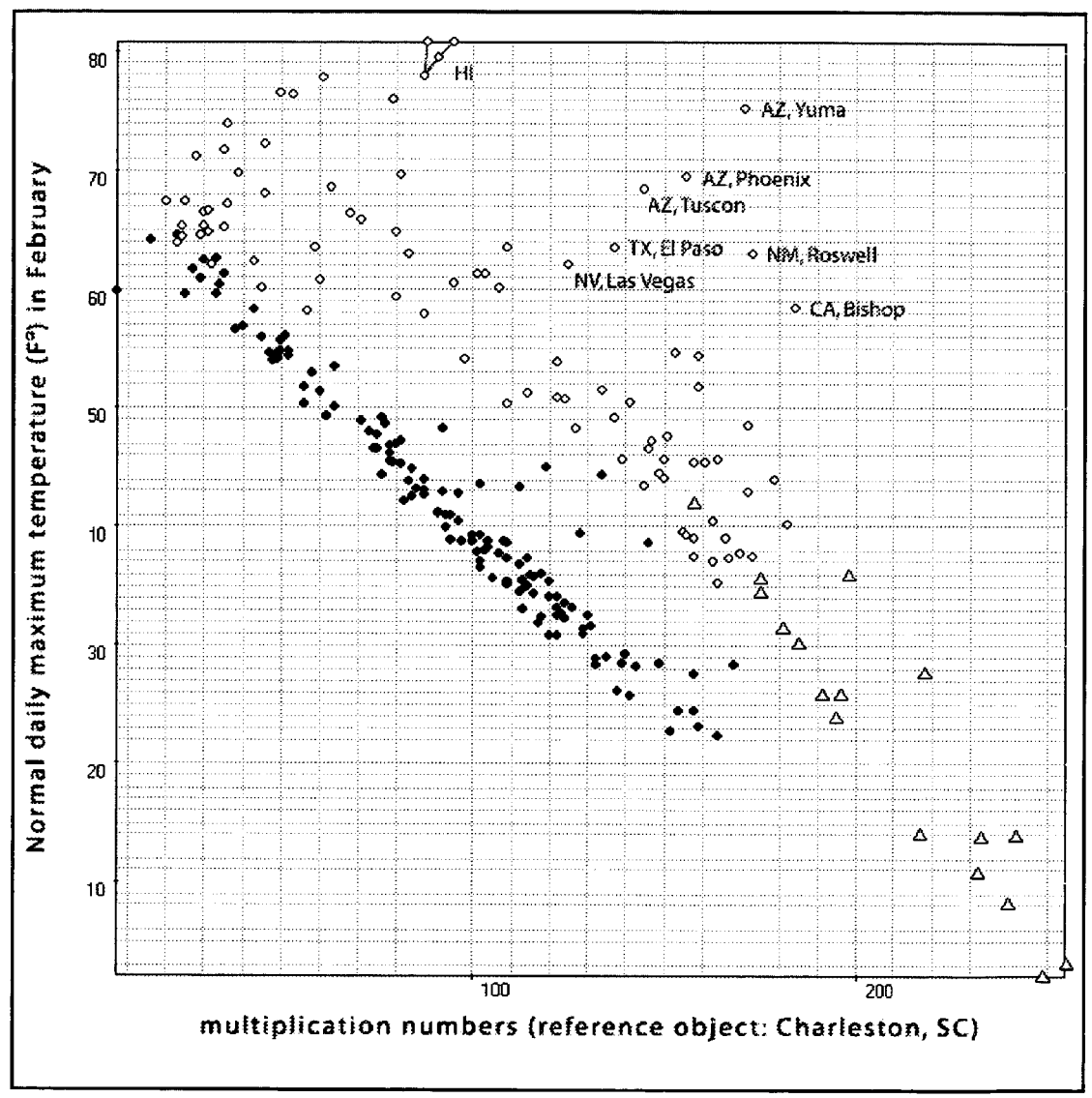
FIG. 39 illustrates the climatic data analysis by the HyGV-method and shows the relationship between the values of February normal daily maximum temperatures (F°) and multiplication numbers computed for 245 cities and locations of 50 states the U.S.A., with Charleston, S.C., as a reference object. Dark dots correspond to 33 central, east coast and some of southeast states: AL, AR, CT, D.C., CA, IA, IL, IN, KS, KY, MA, MD, ME, MI, MN, MO, NC, ND, NE, NH, NJ, NY, OH, PA, RI, SC, CD, TN, VA, VT, WI, and WV.

Another example to further explain about the correlations between multiplication numbers and analyzed objects' properties is based on climatic data analysis dealing with a set of objects, each of them described by 108 parameters (see FIGS. 8 and 9). FIG. 39 shows, as an example, the relationship between normal daily maximum temperatures (F°) in February and multiplication numbers obtained for a database of 245 U.S. locations described by 108 parameters and using Charleston, S.C., as a reference object. As is seen, there is a distinct correlation between the said parameter values for February and the multiplication numbers that reflect the totality of other 107 parameter values for the cities of a number of states (indicated by black dots in the graph). This correlation is valid for 33 central, east coast, and some of the southeast states: AL, AR, CT, D.C., GA, IA, IL, IN, KS, KY, MA, MD, ME, MI, MN, MO, MS, NC, ND, NE, NH, NJ, NY, OH, PA, RI, SC, SD, TN, VA, VT, WI, and WV. Thus, both of the above examples show that classical mathematical statistics can have a perfect field of operation as soon as the data have been processed by the method of this invention without which the establishing of correlations between any given individual parameters and a whole complex body of climatic parameters would be impossible.

12. The Interrelation Between HyGV and ETSM Methods

In all of the examples presented in this disclosure, the obtained results, produced by the HyGV system that does not undergo any training, display a remarkable agreement with the human logic. (For self-explanatory reasons, in this disclosure, we have limited the number of examples and illustrations that can prove the above-said.) The fact of this remarkable agreement with the human logic is the more so important as the HyGV-method, based on the set of algorithms referred to in the section "Background of this invention", acts as an independent expert with its own strongly individual (however, manageable) style and, therefore, represents a promising system for development of the thinking computer. The individuality of the HyGV-method is provided by the hypothesis-parameter module which constitutes its "ego", or "personality".

In the context of the above statement, it is important to explain how the two methods—evolutionary transformation of similarity matrices, which is used as an engine in the HyGV-method, and the hypothesis generation and verification method itself, being the subject of this invention—cooperate in data processing. When the ETSM-method is applied to a certain database, it produces a system of subclusters that reflects a hierarchy in strictly a given set of objects as it analyzes individual relationships in a given set of objects taking into account the whole extent of diversity inherent in that particular community of objects and treating a given dataset as a whole. It registers all nuances in similarities and dissimilarities between properties of analyzed objects, and even a slight change within the structure of a system under analysis may result in major changes in clustering, either giving additional subclusters or, contrarily, merging some of the clusters. For example, assume that the ETSM-analysis reveals the existence of a certain subcluster "a" whose elements have a high degree of affinity to each other. In fact, it may appear that the elements in the said subcluster have significant differences in values of parameter $V_i$ but those differences may stay unnoticed due to wide fluctuations in the values of other parameters. If we add, to the analyzed system of objects, a few objects with, for instance, low $V_i$, while leaving the distribution of all other parameters unchanged, it may lead to the subdivision of subcluster "a" into two sub-subclusters—"$a_{ihigh}$" and "$a_{ilow}$"—according to their values of parameter $V_i$. In the same way, subclusters merge when appropriate.

In contrast to the ETSM-method that supplies objective but relative (in terms of being related to a concrete dataset under processing) information, the HyGV-method provides subjective information evaluated by its "ego", an HyPa. Although that information is subjective, it has an absolute value—i.e. neither the addition of new objects to a database under analysis, nor removal of any of its objects has any impact on the M value; and even if all but one object belonging to a distinctly shaped cluster are removed, the remaining object will be allocated strictly to where it belongs. We will now explain it in more detail. The HyGV-method analyzes each object in a given set of objects from the point of view of its similarity with a reference object—or, in a broader sense, with a hypothesis-parameter. For instance, in the above-discussed example, the countries of the world are analyzed from the position of their similarity-dissimilarity with Saudi Arabia, or with Russia. At the same time, the results of HyGV-analysis represent absolute values—of course, in the context of a given underlying concept or a given reference object. Thus, these two methods—ETSM and HyGV—employ different principles of data processing. The ETSM-method can be used both as a clustering detector (information thyristor) and as a source of background information about the grouping in a set of objects under analysis, providing a clue for finding the most optimal concept to be used as a hypothesis-parameter in the HyGV-analysis.

Hypothesis generation and verification are inseparable from the routine cognitive activity of a human-being and take a very important place in human intelligence. The mimicking of human intelligence and the implementation of the resulting models in the form of software cannot be done based on just one of the aspects of brain activity. None of the numerous models of cognitive processes proposed since the onset of the AI research was able to demonstrate the ability to combine reasoning with intuition, which are both engaged in the human mind, just as two lungs are both engaged in respiration. Despite the centuries-long history of research (mostly at the speculative level) into relationship between intuition and reasoning, the issue still remains very little explained, which is quite understandable as this is a problem of a fundamental level of complexity. Since the ancient times, intuition has been in the focus of philosophic studies and, particularly, of doctrinaires of all religious schools. Buddhism philosophy maintains that intuition, not reasoning, is a direct perception of Truth. Similar views on intuition are shared by some of the modern philosophies, such as intuitivism, neothomism, and others. It is also known that many a flash of scientific inspiration came from sheer "illogical" thinking, i.e. intuition. Thus, the issue of the relationship between reasoning and intuition cannot be ignored in tackling the modeling of the human brain work.

Figure 40:
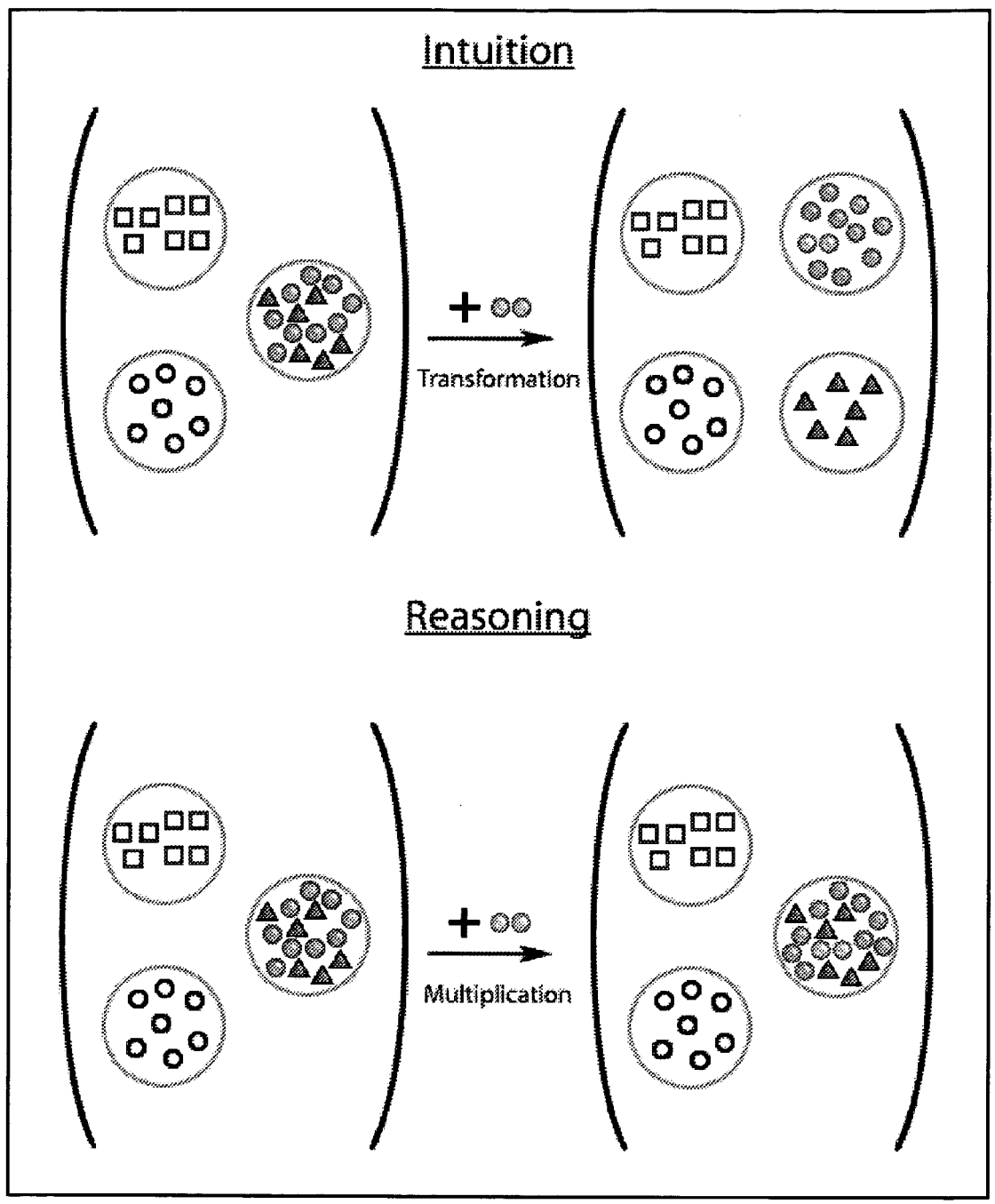
FIG. 40 is a flow diagram explaining the differences between intuition and reasoning.

The combination of two data processing methods invented by us—the evolutionary transformation of similarity matrices, based on organic combination of deduction and induction, and hypothesis generation and verification, involving the formation of the artificial "ego" and based on the information thyristor principle—is a good model of the similarities and differences between intuition and reasoning, as is illustrated in FIG. 40. In data analysis, the ETSM-method is the counterpart of intuition, and the HyGV-method does the reasoning part. The schematic diagram in FIG. 40 is the first concrete model illustrating the comparative characteristics of intuition and reasoning. Reasoning is consistently subjective as long as the involved "ego" remains unchanged and it would be true to say the same about the reasoning performed by the HyGV-system according to this invention. A person's "ego" can change and evolve as a result of enforced learning, a goal-seeking activity, and in the course of one's gaining experience and knowledge throughout one's lifespan. In the HyGV-method, the "ego" is a hypothesis-parameter, and it also may change—either as a result of an operator's command, or in the course of certain endogenous evolutionary processes. For instance, if we duplicate one of the components of a hypothesis-parameter, the HyPa's clustering configuration will change, and, accordingly, multiplication numbers for the components will change. However, if a hypothesis-parameter remains unchanged for a given set of objects, multiplication numbers will remain exactly same, no matter how many extra copies of objects are added to the database under analysis.

Figure 41:
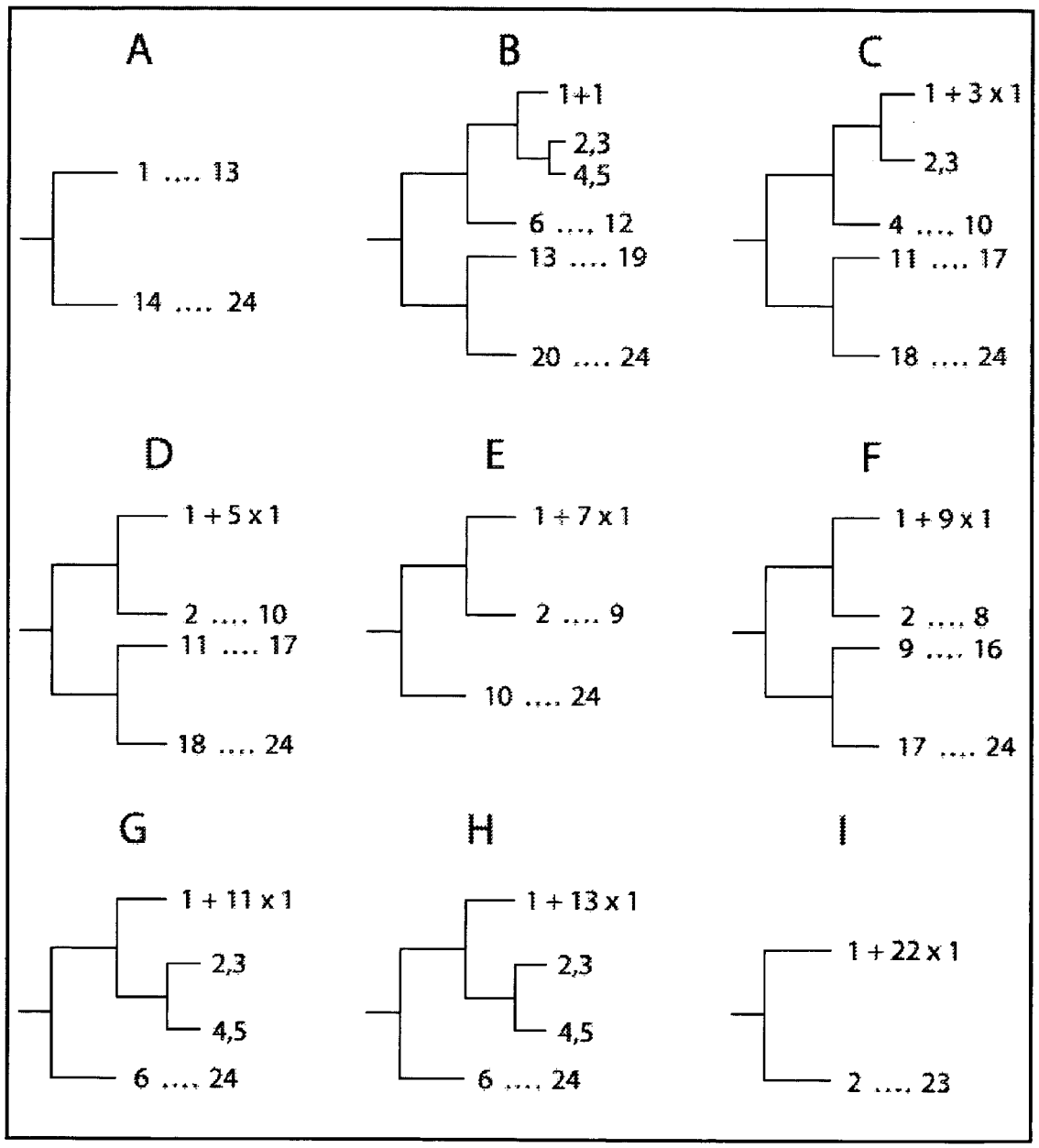
FIG. 41 is an illustration of cluster trees showing the changes in the way of clustering that occur upon the addition of 1's to a natural sequence of numbers from 1 to 24.

We will now consider how the ETSM-method reacts to changes in a database under analysis—for instance, the appearance of extra copies of some of the objects of the database. We will let the ETSM-system solve the problem—quite a complex one—of clustering of a natural series of numbers from 1 through 24. A human mind, given the same problem, would most probably think of either subdividing the set into equal parts, such as 1–12 and 13–24, or of separating even and odd numbers. The decision made by the ETSM-system (XR-metric, B=1.50) is non-trivial and intelligent: it subdivides the dataset into two unequal subclusters: (1) numbers from 1 through 13; and (2) from 14 through 24 (see FIG. 41A). Subdivision into equal size groups (1–12 and 13–24) would produce two equal clusters, and the clustering tree would not bear any sense. Now, if we add one additional "1" to the series of numbers (see FIG. 41B), the clustering picture drastically changes. While the first round of division, just like in case of the original set of data, produces clusters by dividing the set of objects almost by half, it is, however, followed by three additional subdivisions, thus making the number of subclusters 6 instead of 2. FIGS. 41C–41H illustrate the changes occurring to the clustering tree due to the addition of new units. Then, finally, all of the numerals (objects) again split into two clusters, one of which consists all the "1"'s, while the other contains all other numbers (FIG. 41I).

When considering all 9 variants (selectively presented in FIG. 41) of the clustering occurring in the process of adding "1"'s to the series of natural numbers from 1 to 24, it is apparent that all of the variants are logical in their own way. If the number of added "1" s is unknown, then it looks as if the set of produced decisions is equivalent to illogical thinking, as classical logic simply cannot accept such a variety of logical decisions. If the "ego" (i.e. a hypothesis-parameter) is disengaged, the whole totality of information available for a given analysis process is processed holistically—the way it is done by the ETSM-method. Focusing on a certain portion of the available information (for instance, under the influence of the emotional factor) will lead to a series of analogies through redistribution of associations (relationships between clusters), thus jumpstarting the creativity. This is exactly what intuition is. As was mentioned above, intuition is believed to be primary as compared to reasoning. The same kind of relationship is between the ETSM-method, with its cooperative and holistic approach, and the HyGV-method, with its "ego" (in the form of a hypothesis-parameter) and its way of dealing with information by processing it through the channel of subjectivity.

The above-formulated model of the interrelation between intuition and reasoning may serve not only the purpose of development of the thinking computer but also of the elaboration of practical approaches to machine learning based on manipulating of the two constituents of consciousness—intuition and reasoning.

13. Machine Self-Learning

Ability to learn is one of the most remarkable and mysterious properties of the intelligence. As was discussed above, the computation and application of implausibility number, ln M (i.e. the dissimilarity criterion), provides for analogs ranking in accordance with the exponential change depending on the decrease of similarity between an analog and a reference object. This opens a concrete and clear way for selective extraction of objects from databases. The method of this invention can provide not only passive sorting of information but it can also be used for information retrieval based on certain preferences. The latter function may be implemented based on a hypothesis-parameter's self-evolution, which represents a purely technical problem in accordance with a self-learning stimulus, which may vary in every a given task, as well as the technical implementations may do—one of them being, for instance, adding duplicates—one after another—of objects from a database under analysis to a relevant hypothesis, followed by the selection of such a hypothesis that provides the best solution to a given problem. In HyGV-method, a hypothesis-parameter, which is the central platform of the non-biological reasoning system according to this invention, easily undergoes modifications, either endogenously or exogenously—i.e. resulting from the operator's commands. This makes the hypothesis-parameter technique a very promising tool in the investigation of various aspects of theoretical and practical analysis.

Figure 42A:
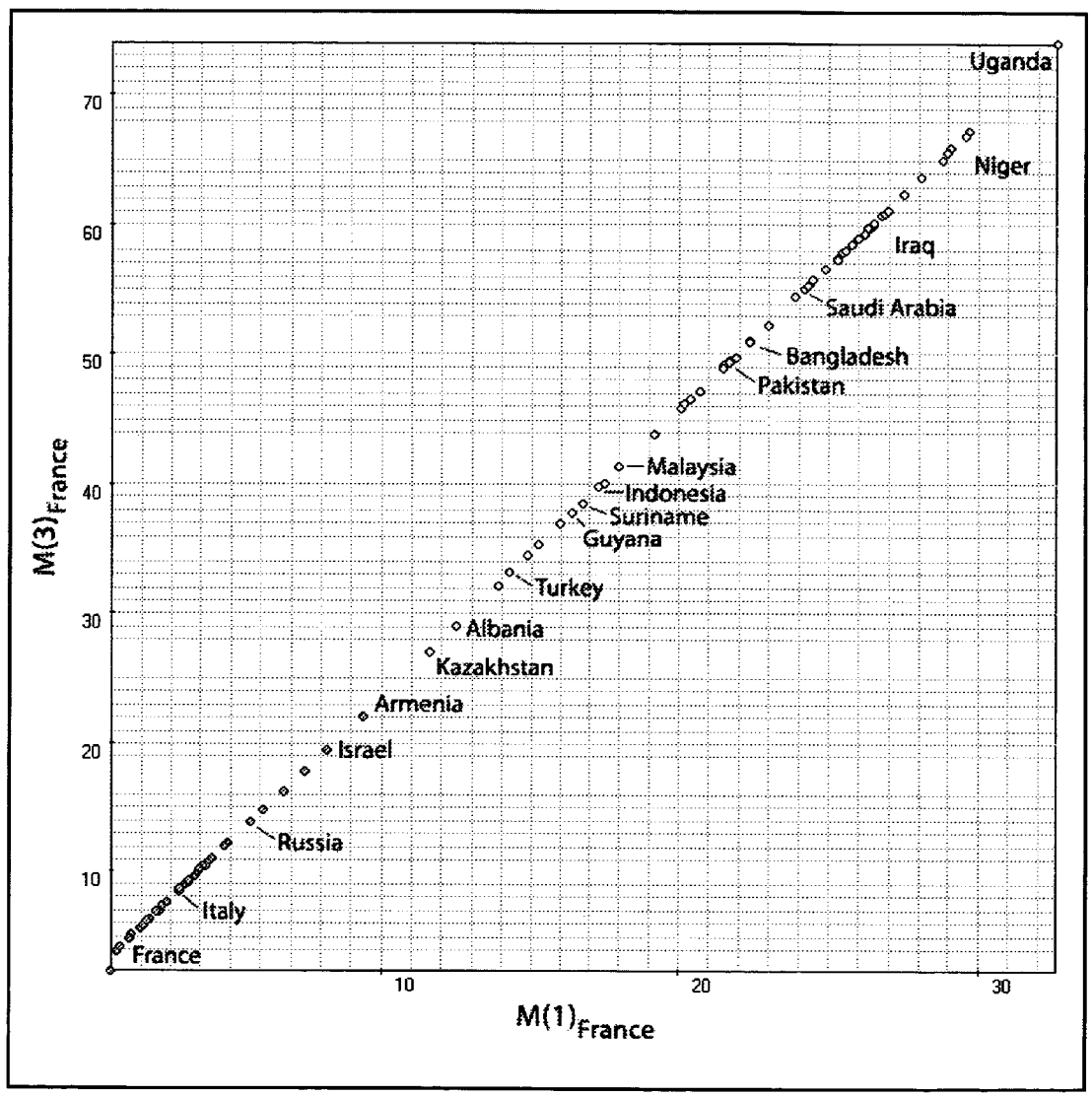
FIGS. 42A–42F are illustrations of HyPa self-evolution induced by consecutive addition of duplicates of analyzed objects to the capsule of clones. The plots in FIGS. 42A–42F show the results of analysis of population pyramids (34 demographic parameters) of 94 countries, including 57 member-states of the Organization of Islamic Conference (indicated by open dots), 36 European countries with predominantly Christian populations, as well as Israel, with predominantly Judaic population, (dark dots). The capsule of clones was constructed using France as a reference object. In all cases, the HyPa value was set to equal 1 [M(1)], except that in the analysis illustrated by FIG. 42A, the multiplication numbers, plotted on the ordinate, were computed at HyPa value of 3 [M(3)]. In the analysis illustrated by FIG. 42A, all of the objects (countries) were compared with the capsule of clones constructed for object "France".
Figure 42B:
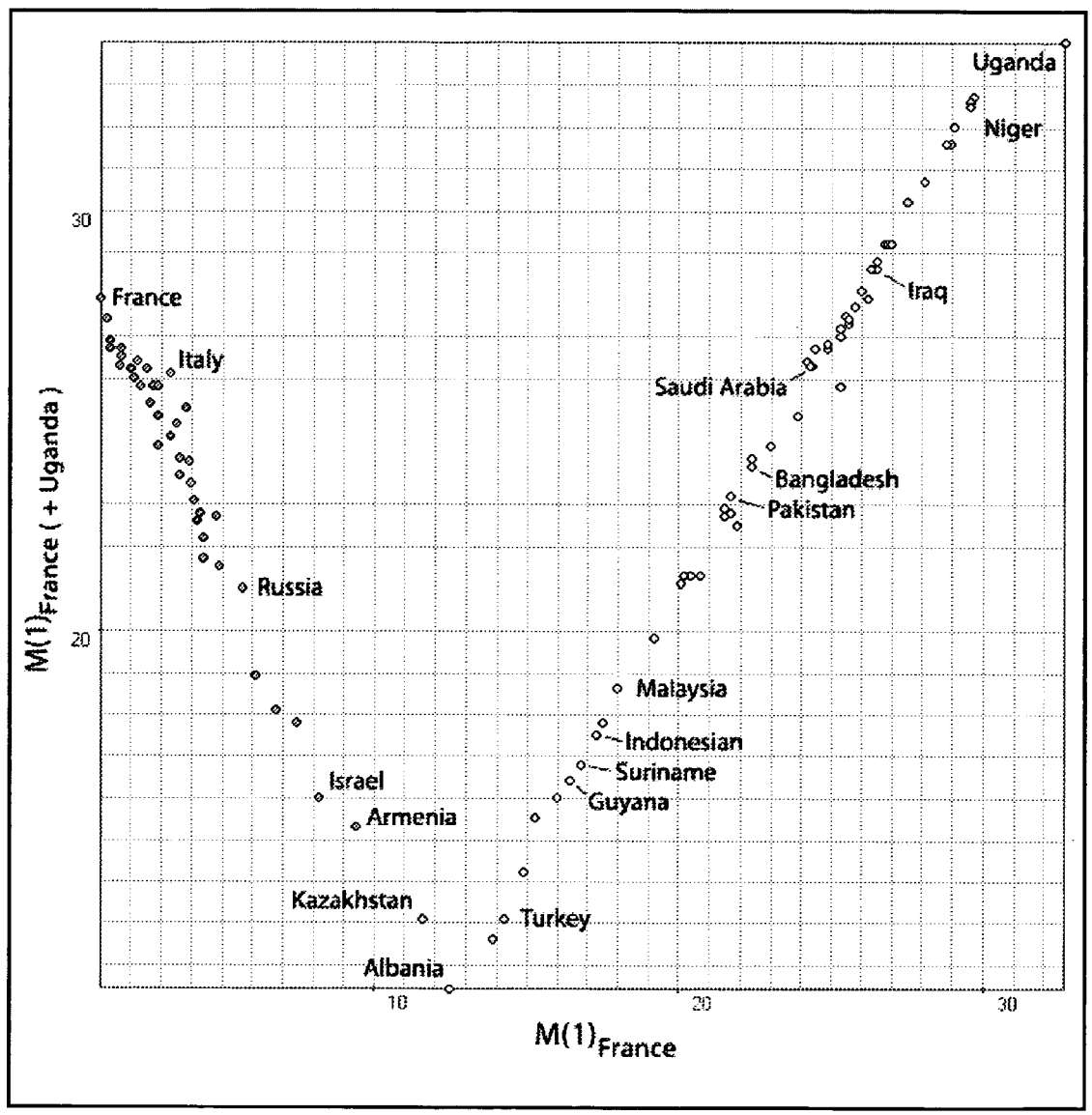
Figure 42C:
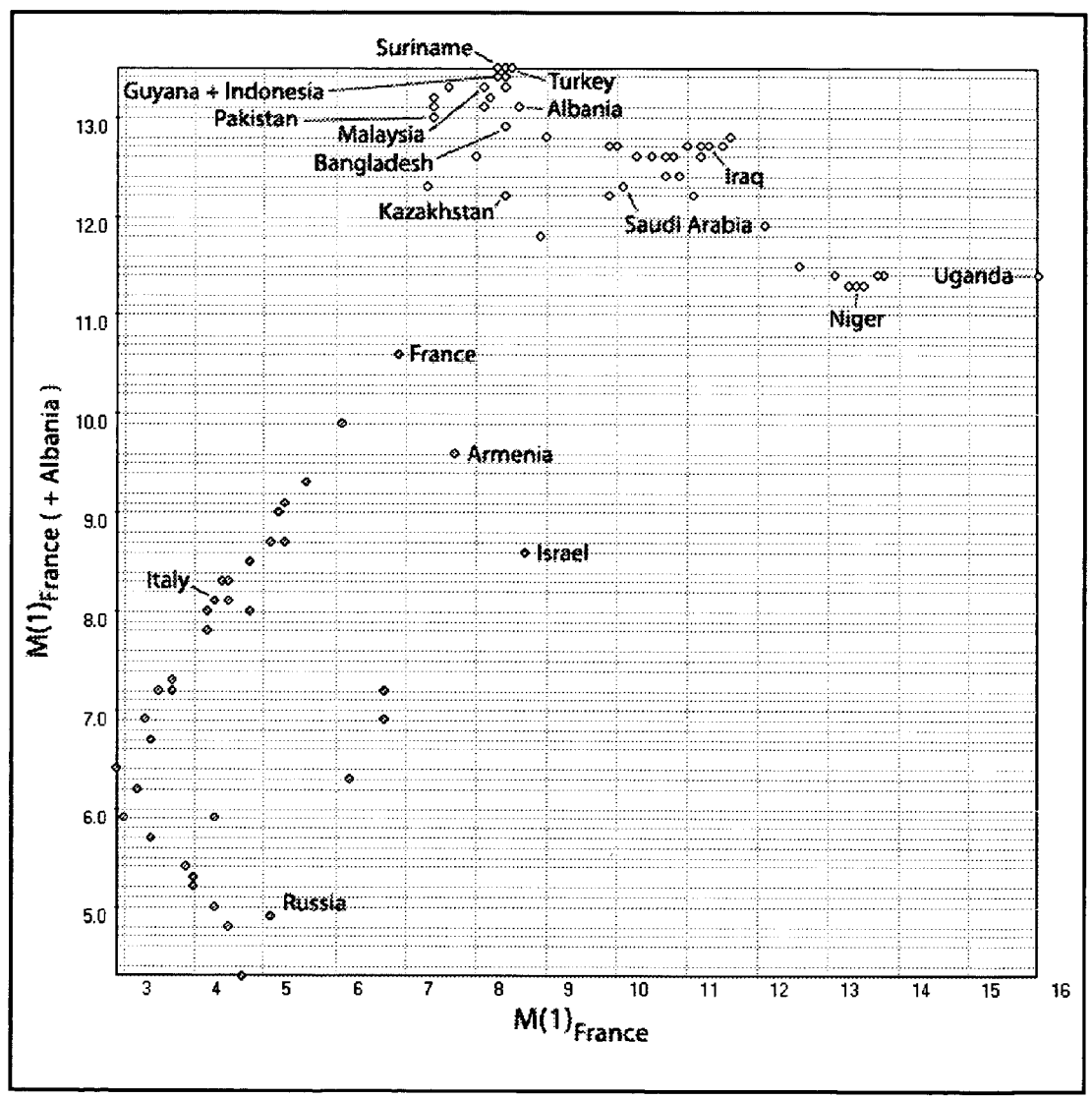
Figure 42D:
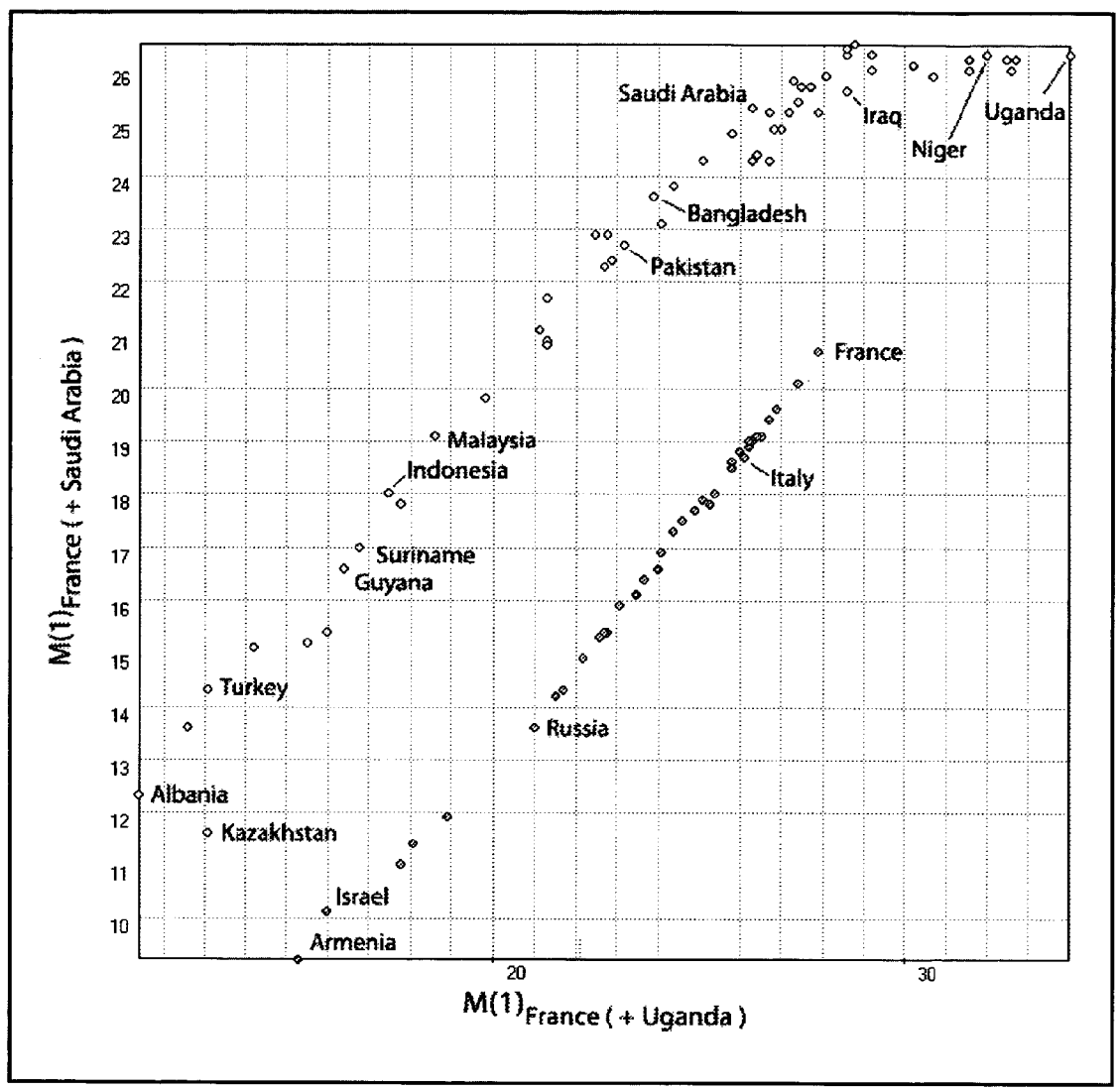
Figure 42E:
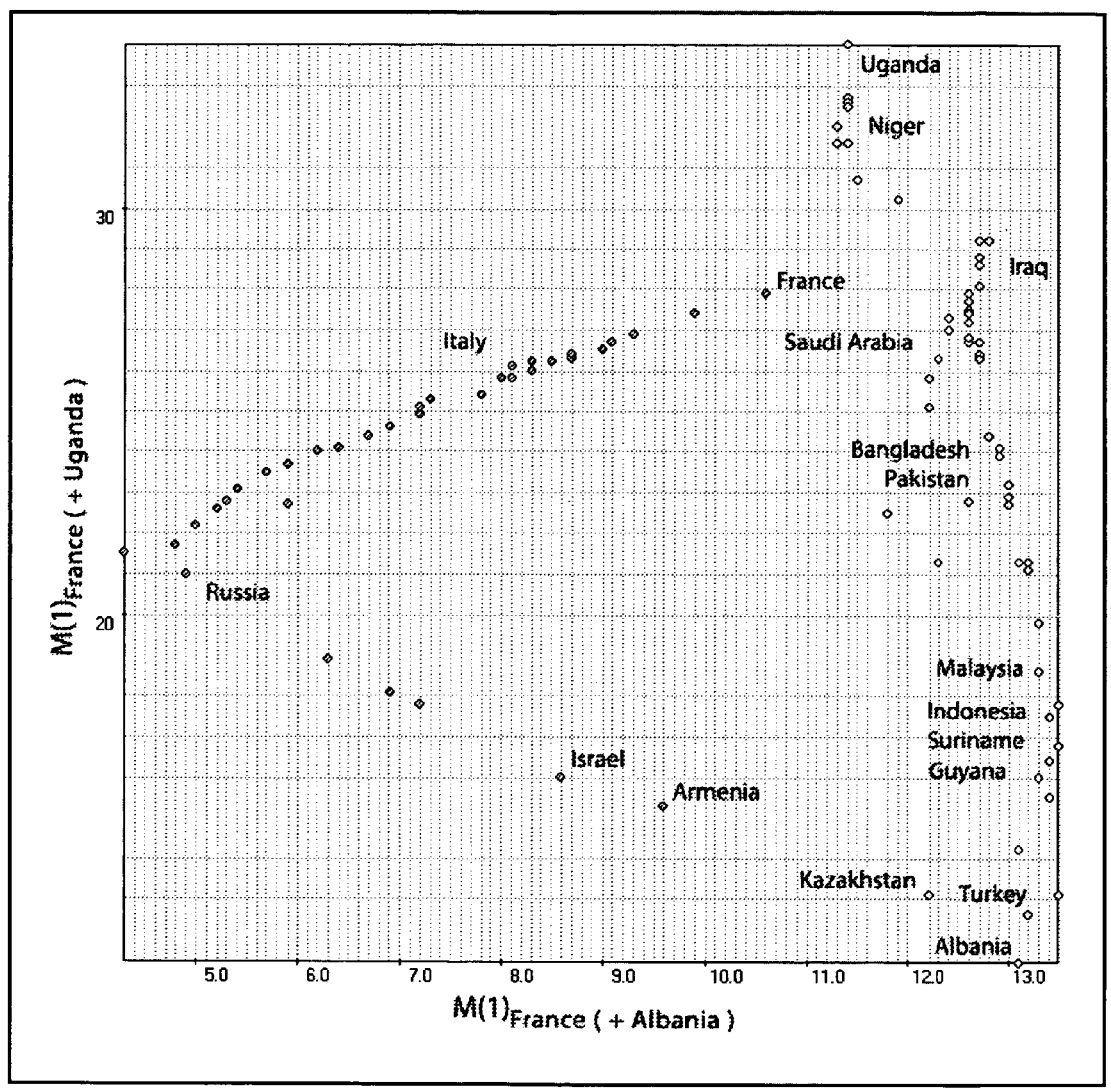
Figure 42F:
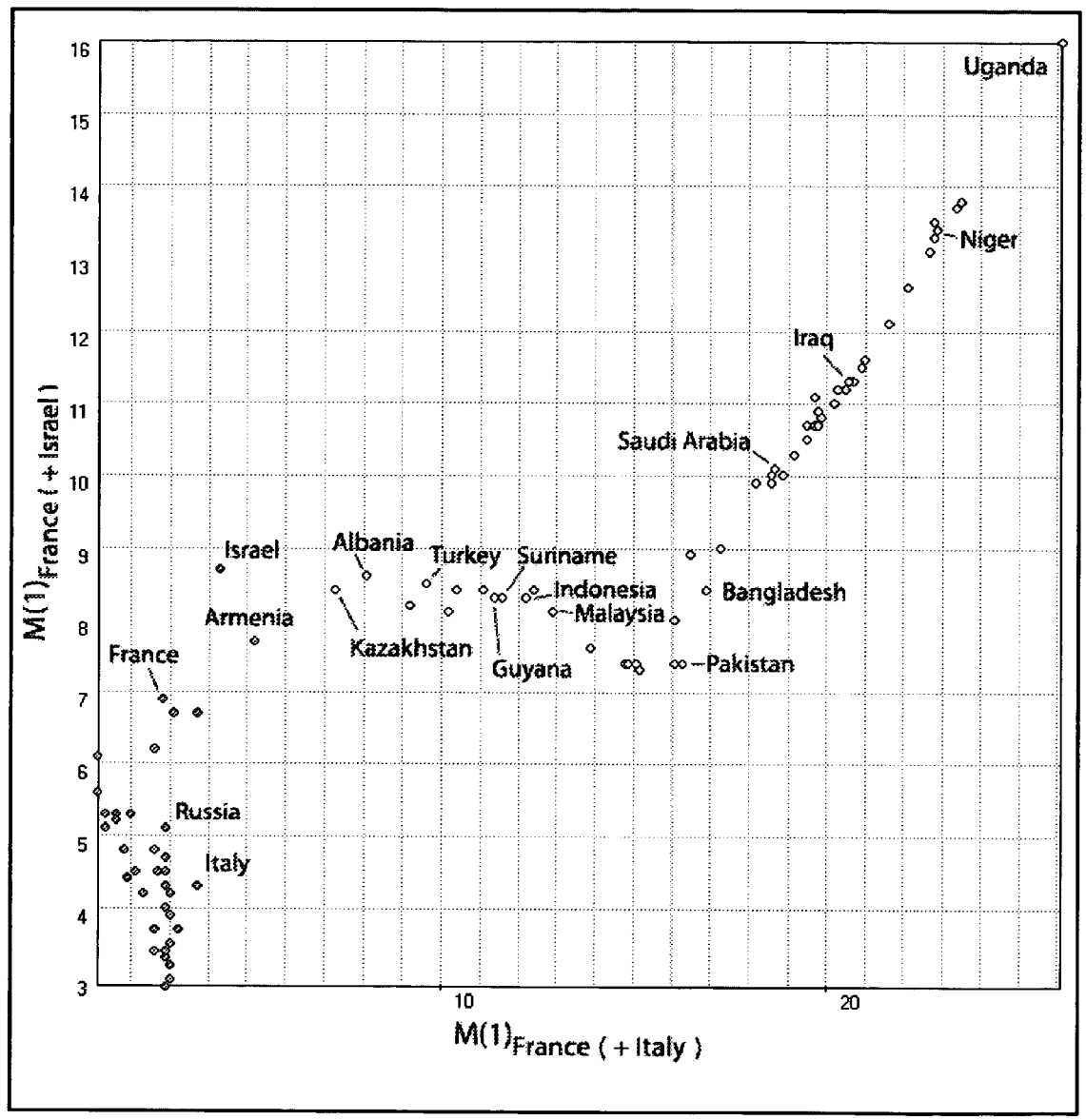

The above-said is demonstrated by the examples illustrated in FIGS. 42A–42F. In this case, demographic data based on population pyramids (34 parameters) were analyzed to reveal similarities and dissimilarities between 37 European countries with predominantly Christian populations, Israel with predominantly Judaic population (marked with dark dots), and 57 member-states of the Organization of Islamic Conference (accordingly, countries with predominantly Muslim populations) (open dots). FIG. 42A shows the relationship between multiplication numbers for the case when France is a reference object. Multiplication number values, in this case, correspond to HyPa values of 3 and 1, respectively. As is seen, the countries with predominantly Christian populations are quite distinctly differentiated from the member-states of the Organization of Islamic Conference. Now, we will be adding, one by one, the duplicates of objects (countries) to the capsule of clones (CC) created for object "France". FIG. 42B illustrates a new grouping: after the addition of object "Uganda" to the CC. As is seen, the grouping of objects has considerably changed in this case. This fact supports the previously stated thesis about the possibility for the HyPa to self-evolve, and the above-demonstrated example of its self-evolution is the technically simplest way, consisting in a one-by-one addition of duplicates of each object of a data set to the HyPa Thus, in a quite uncomplicated way, a database can be optimized and structured. However, results of such optimization must always be treated with a clear realization of hierarchy of priorities in such self-evolution. For instance, with the database referred to in the above-discussed example, an objective of the analysis (i.e. an assignment) may consist in the distinction between two major groups of countries based on their population pyramids. Priorities may be set differently: for instance, finding the simplest mathematical descriptions of the two groups of countries (see FIGS. 42A, B, and D), or demonstrating the biggest difference between the two groups (cf. FIGS. 42C and D), etc. The objective of the self-evolution and self-learning task may be the establishing of invariants in the relationship between the objects (countries). HyPa automated self-modification allows the system to solve this important problem most efficiently: it finds that two Muslim countries of the Western hemisphere—Guyana and Suriname—always appear close to each other, and that the same is true for some other groups of countries—e.g. Pakistan and Bangladesh, Malaysia and Indonesia, etc. It is apparent that the above-described HyPa self-evolution technique provides large opportunities in development of computer programs capable of reasoning operations.

The issue of self-learning stimuli for a hypothesis-parameter's self-evolution is beyond the scope of this invention; it is a whole different problem for which a lot of technical solutions may be found in accordance with concrete tasks. One of the simplest solutions consists in equipping a database with object samples provided with expert evaluation, in which case self-learning stimuli will be represented by coefficients of agreement between results produced by the autonomously "reasoning" software and the expert opinion.

Figure 43:
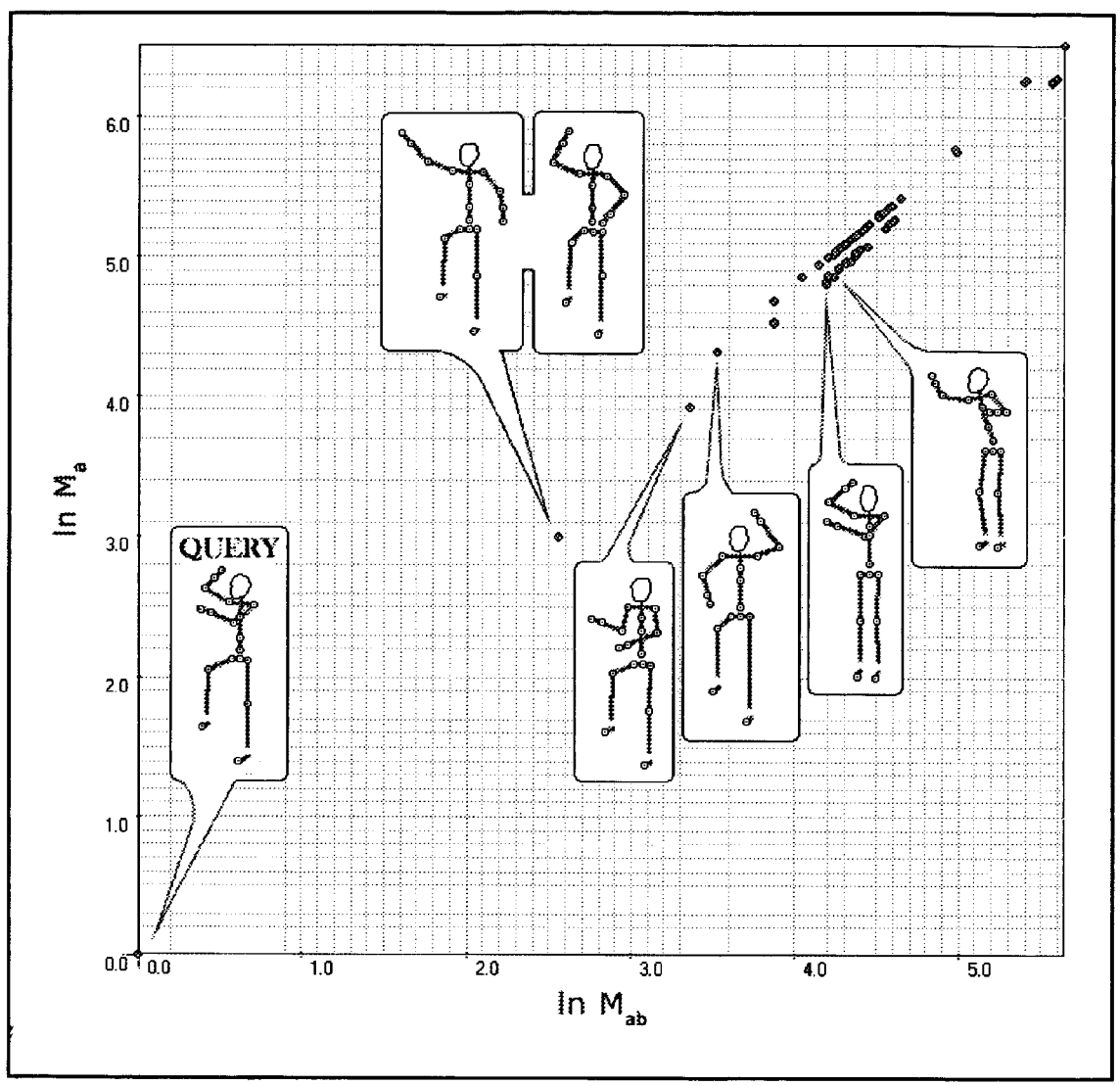
FIG. 43 is the illustration of the result of search for image analogs by emphasizing certain parameters and shows the locations of analogs of the query pose (see FIG. 21) after the "R-Toe" parameter was emphasized by a 10-fold increase.

The ETSM-method, which serves as an engine for the HyGV-method, works independently and autonomously, by definition (see "Background of this invention"), and provides the stability and reproducibility of data processing by the HyGV-method. The only factor of influence upon the information processing by the ETSM-method is multiplication of objects' parameters, according to copending application "High-dimensional data clustering with the use of hybrid similarity matrices", by Leonid Andreev (although, technically, it is input data which is influenced, rather than the way of processing). A hybrid similarity matrix may include any proportions of monomer similarity matrices, thus providing the means for regulating the multiplication numbers for a hypothesis-parameter, which also produces quite useful task-oriented effects. Above (see FIG. 21), we demonstrated selective extraction of an image of a certain pose of a human figure from the database of 75 images. The closest analogs of the reference object (query) were found to be four images of poses: two of them with the right leg bent in the knee and raised, in the same fashion as the query object; and two other poses with both legs positioned straight. FIG. 43 illustrates the result of processing of the same query as above and using the same hypothesis-parameter, the only difference being the value of parameter "R-Toe" increased 10 times, which resulted in the following: (a) the two images of poses with the right leg and right hand raised as in the query figure remain at the exactly same point; (b) the two images with both legs straight are no longer among the query's analogs; instead, (c) the search engine finds two other images with the right leg raised as in the query image. This example demonstrates how, using one and the same hypothesis-parameter, it is possible to increase the search selectivity by regulating the weights of various parameters. This preferred embodiment of the method of this invention allows for hypothesis-parameter's self-evolution, thus providing the most optimal approach to data processing It is important to emphasize that in case of a multi-dimensional description of objects, combinations of weighted parameters become increasingly numerous and resourceful.

Machine learning can occur in two ways: deductive (through sets of rules) and inductive (from sets of objects, e.g. through clustering similar objects together) (Michalski R. S., Inferential theory of learning and inductive database. Invited paper at the UQAM Summer Institute in Cognitive Science, Montreal, Canada, June 30–Jul. 11, 2003. Published electronically at: http://www.mli.gmu.edu/pubs.html). The combination of two methods, ETSM and HyGV, provides for machine self-learning in a fashion most closely mimicking human self-learning, i.e. combining intuition, deduction and induction. The above-described machine self-learning techniques are technically simple implications of the method of this invention as all three approaches to machine self-learning—intuitive, inductive and deductive—are provided by the same algorithmic base and, therefore, are functionally compatible.

14. Conclusions

Below we will formulate three important points that follow from the foregoing.

A. Computer as an "Independent Thinker"

As was emphasized in the Background of this invention, there is no chance that a computer may be a thinking one unless its software environment has its own individual "outlook" on the nature of objects and events—in other words, has its "ego". The method of this invention provides a computer program that is capable of selective perception of information, thus making a leap to creation of the non-biological intelligence. The hypothesis-parameter, being the simplest form of computer "ego", can be easily developed into a more complex system of individual perception based on "ego-intranet" wherein individual hypotheses-parameters, as carriers of subjective perception, not only can co-exist but also can interact and cooperate.

B. Comparison Between the HyGV-Method and Artificial Neural Network Method.

The numerous examples of the HyGV-method applications presented in the foregoing sections of this disclosure demonstrate that the method of this invention, based on rather a simple system of algorithms and implemented on a regular PC, allows the solving of highly complex data analysis problems without the necessity to apply the feature extraction process for reduction of data dimensionality. The latter, being crucially important for the ANN-method due to its technical limitations as far as memory and computation time are concerned, is also a source of subjectivism which makes automated data processing even more complicated. The ANN approach is based on assigning appropriate weights to different inputs. The said procedure, even if fully automated, does not relieve the ANN-method from a too high computational load. The HyGV-method, on the contrary, is reduced to the right choice of a hypothesis-parameter, after which weights of inputs are automatically established by the unsupervised clustering procedure. Thus, in the HyGV-method, computer training consists in mere memorization of an HyPa and parameters that describe objects or events under analysis. Even now, at this present stage of the HyGV-method development, it is clear that this method efficiently solves all and any of the problems heretofore tackled by the ANN-method. However, there is a significant difference between these two approaches. Even though the ANN-method refers to the multiple layers of simple processing as "neurons", nonetheless, the method remains to be an operator-dependent system, a section of computer programming and mathematics. Same problems, as the ANN-method is to solve, can be successfully solved by mathematical methods that have nothing to do with AI (e.g. Fourier transformation, gradient descent approaches, spline methods, etc.). The rapid development of the ANN concept and the growth of its popularity have been mostly due to the belief that an ANN system imitates the work of brain cells, which in truth is too big a stretch. The ANN-method is an utterly artificial system leading the non-biological intelligence research to a dead end, and it would be naive to hope that this artificial system can miraculously become animated simply due to increased doses of quasi-biological terminology, such as neurocontroller or alike (cf. e.g. Werbos, U.S. Pat. No. 6,581,048, Jun. 17, 2003).

As was demonstrated in the examples presented in the foregoing sections of this disclosure, unlike the ANN systems, the HyGV system displays immanent intelligence, and its decisions, in most cases, coincide with the human logic. This comes naturally due its organization that ensures the system's autonomous and cooperative work throughout the whole analysis process that involves an entire set of parameters describing objects under analysis and is free from artificial censuring and reduction of data. Most importantly, the HyGV system displays the ability of "individual perception" due to its "ego" embodied in the HyPa.

C. Information as a Processor of Information

There are two remarkable peculiarities displayed by the HyGV system in the process of multiplication number computation as described in the foregoing specification. The first one is connected with the fact that in none of the cases of data analysis by the HyGV-method there was observed the presence of any sort of interval of the M values covering a gradual transition of target objects into subclusters of reference objects. Instead of an expected S-shaped curve in the area of objects transition, shown in blocks 503 and 504 of FIG. 5, the rigid transition occurs by the "yes-no" principle. Thus, in this invention, the method for evolutionary transformation of similarity matrices acts as a valve with a very steep threshold of switching on/off, justifying thereby the term "information thyristor".

The second remarkable peculiarity of the method of this invention lies in the fact that the said switching is controlled by information itself. Whether the infothyristor "GATE" is open or shut off, all of the operations for construction of a hybrid similarity matrix and its further transformation are absolutely same. However, it appears that a certain amount of batches of qualitatively identical information causes the infothyristor turn on or off, thus creating new information that reveals a conventional complexity degree or a degree of dissimilarity between a target object and a reference object. Although not discussed in the foregoing description of this invention, other forms of informational imitation of electronic circuit elements, for instance, the information transistor, are definitely possible (for the information transistor, the ETSM-method alone is sufficient). Thus, both the infothyristor and infotransistor can function based on the engine described in the specification of this invention.

The discovery of the informational analogs of electronic circuit elements raises a reasonable question: Could it be that the information's ability to process information and thus generate new information underlies many of the mysterious aspects of the brain functioning? It seems that this question cannot be avoided, since the correct answer—be it positive or negative—should have an extremely far-going impact on science in general. For instance, for long time, it had been believed that intelligence was correlatable, although very roughly, with the brain size. Nowadays, arguments for 'brain size—intelligence' correlation based on, for instance, the fact that the skull of *A. afarensis*, an early predecessor of a human, was 3.5 times smaller than the modern human skull are no longer sufficient for stating that the larger is a brain, the higher is intelligence. Moreover, inferences from such a statement may be utterly absurd: are cats, whose brain is half of the size of that of dogs, twice less intelligence than dogs? The above-expressed assumption that information can produce information-generating structures that resemble electronic chips should transform the role of the brain into, hyperbolically speaking, the counterpart of computer hardware (without a CPU). If this is so, then the brain size is, to a certain extent, a derivative of a set of behavioral stereotypes that is sufficient for a given species to survive in its natural habitat. The opportunity that we discovered in principle for development of infochips may have important implications for computer science. Even purely theoretical discussions of this opportunity may lead to serious transformations in traditional views on the nature of information. The reasoning presented below may serve as theoretical substantiation of the possibility for existence of information infoprocessors in the brain.

It is apparent that contemporary physics has trouble with the explanation of what information is. A physicist's reply to the question "what is the physical essence of information?" typically consists in slogans of the type "There is no information without representation", or lengthy general discussions augmented by mathematical sophistry in order to smooth the shocking straightforwardness of the question. Even though the quantum computing idea has brought about some activation of research into physical principles of information, no significant progress in this area has been yet made. One of the few important contributions ever made into the problem of physics of information is the idea proposed by Rolf Landauer in 1961 (Landauer, R. 1961. IBM J. Res. Develop. 5, 183) and known as "Landauer's principle". As noted by M. B. Plenio and V. Vitelly (Plenio, M. B., and Vitelli, V. The physics of forgetting: Landauer's erasure principle and information theory. Contemporary Physics, 2001, volume 42, number 1, pp. 25–60), Landauer's principle "provides a bridge between information theory and physics". Of all the numerous aspects of the interpretation of Landauer's principle, in this context, we will focus on his statement that the erasure of information, unlike computation (i.e. information production/recording), is inevitably accompanied by the generation of heat, i.e. involves energy expenditure. While it is an undeniable fact that physical systems or media, such as CDs, electronic chips, DNA strands, and others are necessary for information recording (in other words, indeed, "there is no information without representation"), it is also clear beyond any doubt that, at least at the macro-level, the recording and erasure of information cannot occur simultaneously on a same medium. This axiom, corroborated by Landauer's principle, is the quintessence of the main distinguishing property of information as a physical phenomenon. When we speak about logical and physical reversibility of computation, it is understood that recording and erasure of same information is separated in time. It is impossible to both record and erase information at the same time on a same carrier by a same device; and that is what distinguishes physics of information from physics of living and non-living matter.

In living cells, there simultaneously occur two processes—anabolism and catabolism, whose combination makes what is referred to as metabolism, which constitutes the main distinguishing property of the alive. Anabolism provides for construction of complex molecules, and catabolism results in their breakdown. Molecular construction and destruction go on at the same time, thus releasing the energy for biochemical reactions. In living organisms, oxidation and reduction occur at the same time and are inseparable. When the anabolism rate equals the catabolism rate, an organism is in a steady state. A population of bacteria may undergo a continuous growth or may simply maintain a surviving state, and the ratio of anabolism versus catabolism may greatly vary; however, anabolism cannot occur without catabolism. In the non-living nature, there is a similar phenomenon: synthesis may prevail over degradation, or vice versa; but these processes always go together. Thus, information processes uniquely differ from those occurring in living and non-living matters: it is characteristic of information that its synthesis, or "anabolism" (i.e. recording) and destruction, or "catabolism" (i.e. erasure) cannot occur at the same time on a same medium.

The above-said obviously leads to the inference that in the brain, neurons are used only for information storage (memory) with the possibility for its retrieval; while information erasure can occur only through neuron death (which happens first of all to neurons that for long time remain unused for information retrieval). If information processing in the brain is carried out by neural cells alone, the latter, in order to function, have to renege on the general biological rule of the anabolism and catabolism co-occurrence. From that standpoint, it seems to be perfectly admissible to assume that there must exist a special kind of information fields, similar in design to electronic circuits and equipped with informational counterparts of the elements of electronic circuits. Such an infoprocessor system can receive information, process it, store it, retrieve it from long-term memory to create associative links, thus updating information, and send it back for storage along with the newly created associative links. If this is true, then an organism's intelligence power depends on performance characteristics of its information processing system, but not on a volume of information stored in neurons.

The foregoing also sheds light on the problem of the biological role of sleep. The assumptions that sleeping is required for maintenance of the metabolic system, to provide rest and repair of muscles and other tissues, replace aging or dead cells, lower energy consumption, etc. are unpersuasive for many reasons. All of those processes can and do occur in the awake state as well. Bacteria, for instance, can grow continuously and do not need a sleep; though, in the course of a population growth, cells both grow and die. Although sleepiness is associated with adenosine accumulation, high adenosine concentration is merely a signal of a need to sleep. Likewise, many other differences in biochemical processes related to the sleep and awake states have their explanations. In the meantime, from the standpoint of the existence of infoprocessors of information, the role of sleep should be understood as a natural state required for information erasure that cannot occur during information recording. The erasure of useless information accumulated in the field of infoprocessors of information occurs during REM sleep, and, since it involves energy expenditure, according to Landauer's principle, REM sleep duration is limited and, therefore, it occurs in several short spans. During non-REM sleep, energy is produced for the next erasure operation and for the necessary rearrangement of the information field structure.

In this context, we are not discussing the mechanism of generating, by the brain cells, of structured information fields. However, a thorough research into this problem may lead to a revision of the role of synapses, provide the explanation of the unusual morphology of neurons, and reveal a lot more. There is no doubt that the concept of infoprocessors of information as the main field of the processes providing for the cognitive function of the brain has a high application potential in medical research. For instance, in the view of the proposed theory, Alzheimer's disease should be understood as the lowering or loss of the brain cells ability to generate information fields. A psychiatric disorder manifested in schizophrenia symptoms may be due to breaches in the process of information transmission from infoprocessors to long-term memory, and so on. As for computer science, it can certainly benefit from the practical implementation of the infoprocessing concept due to its practically unlimited possibility to increase processing speed.

Although the description above contains many specifics, these should not be construed as limiting the scope of the invention but as merely providing illustrations of some of the presently preferred embodiments of this invention. Thus the scope of this invention should be determined by the appended claims and their legal equivalents.

What is claimed in this invention is:

1. A computer-operable method for data processing involved in but not limited to image, pattern and sequence recognition, decision-making and machine-learning, comprising the steps of:
   (a) generation of a hypothesis-parameter, in addition to parameters already existing in a database, both for a reference object (or reference objects) to be used as benchmark(s) in data processing, and for all other objects in a database that are subjects of a comparative analysis (hereunder referred to as target objects);
   (b) assigning of digital values to reference objects in a hypothesis-parameter, such digital values being a reflection of a certain hypothesis of a relationship between said reference objects—based on either an a priori existing idea or a result of a preliminary experimental study, including clustering, of objects covered by said hypothesis-parameter;
   (c) assigning of certain digital values to all target objects in a hypothesis-parameter;
   (d) using a hypothesis-parameter in clustering of objects, along with plurality of other parameters describing objects under clustering,
   (e) establishing a number of copies (hereunder referred to as multiplication number) of hypothesis-parameter required for compensation, during a clustering process, of effect of all other parameters describing a given object so that clustering based on thus established number of copies of a hypothesis-parameter along with the rest of parameters is identical to clustering produced upon use of a hypothesis-parameter as the only parameter,
   (f) consecutive addition of each target object to a reference object (or reference objects); and
   (g) using an established multiplication number for measurement of dissimilarity between reference object(s) and target objects, hence verification of validity of a hypothesis underlying a generated hypothesis-parameter.

2. The method of claim 1, wherein logarithm of hypothesis-parameter multiplication number (hereunder referred to as implausibility number) is used as a dissimilarity coefficient in a search for closest analogs of a reference object.

3. The method of claim 2, wherein, with the purpose of increasing the selectivity of a search for a reference object's closest analogs, an internal standard is employed, and a degree or coefficient of similarity between a reference object and an object compared to a reference object is computed as a ratio of: a difference between implausibility numbers of an internal standard and a compared object, and an internal standard's implausibility number.

4. The method of claim 1, wherein, in order to predict multiplication numbers for target objects on which no information is available, multiplication numbers for such objects are computed as a total of increments corresponding to individual parameters describing objects of a given database, which allows configuring a target object by combining different parts of different objects in a database.

5. The method of claim 1, wherein a hypothesis-parameter of a reference object (or reference objects) is developed for a variety of objects, artificially generated based on a reference object (or reference objects), whose totality represents a capsule of clones of said reference object(s) and is further used for determining the dissimilarities between reference object(s) and target object(s).

6. The method of claim 5, wherein a said capsule of clones is created in various ways, including a monotonous increase or decrease, or alternation of increase and decrease, of values of all or part of parameters that describe reference object(s).

7. The method of claim 5, wherein, for the purpose of sequence or pattern recognition, a hypothesis-parameter is created by cloning a reference object whose parameters represent input quantitative characteristics of elements of a sequence or pattern under analysis.

8. The method of claim 1, wherein a multiplication number of a hypothesis-parameter is established in an automated unsupervised mode by applying the algorithm for evolutionary transformation of similarity matrices, serving as an information thyristor and providing fusion between a target object and a reference object (or reference objects) when a certain number of multiple copies of a hypothesis-parameter is added to analyzed data.

9. The method of claim 8, wherein, in order to ensure the accuracy of computation of a hypothesis-parameter multiplication number required for turning on an information thyristor and stopping a subjective and inefficient process of feature extraction for reduction of data dimensionality, similarity matrices are computed by hybridization of monomer similarity matrices, which, in their turn, are computed individually based on each parameter, including a hypothesis-parameter.

10. The method of claim 9, wherein, in order to assess a weight of an individual parameter in a multiplication number, extra copies of an individual parameter describing a target object are added, in the form of a monomer similarity matrix, to a hybrid similarity matrix.

11. The method of claim 1, wherein, to provide for non-probabilistic statistical processing of data, a multiplication number is used as a quantitative criterion of conventional complexity.

12. The method of claim 1, wherein, to provide for machine self-learning, a hypothesis-parameter is designed to be able to self-evolve through various means, such as, for instance, a consecutive addition of target objects' duplicates, which, upon the use of appropriate stimuli, provides for self-improvement of a hypothesis-parameter playing the role of the non-biological intelligence "ego".

13. The method of 8, wherein, in order to create artificial, or non-biological, intelligence, information processing is performed by processors of the information thyristor type wherein information serves as an information valve.

14. The method of claim 13, wherein, to provide an actual prototype of artificial brain, the method for evolutionary transformation of similarity matrices is used in intuition mode, when applied as is, and in reasoning mode, when applied in combination with a hypothesis-parameter (artificial intelligence "ego").

* * * * *